US012620205B2

(12) United States Patent
Lotti et al.

(10) Patent No.: US 12,620,205 B2
(45) Date of Patent: May 5, 2026

(54) USING TWO-DIMENSIONAL IMAGES AND MACHINE LEARNING TO IDENTIFY INFORMATION PERTAINING TO FACIAL FEATURES

(71) Applicant: Brilliance of Beauty, Inc., New York, NY (US)

(72) Inventors: Sahara Lotti, North Hollywood, CA (US); Jesse Chang, Palo Alto, CA (US)

(73) Assignee: Brilliance of Beauty, Inc., North Hollywood, CA (US)

( * ) Notice: Subject to any disclaimer, the term of this patent is extended or adjusted under 35 U.S.C. 154(b) by 0 days.

(21) Appl. No.: 18/632,073

(22) Filed: Apr. 10, 2024

(65) Prior Publication Data

US 2025/0322648 A1     Oct. 16, 2025

(51) Int. Cl.
*G06V 10/774*     (2022.01)
*G06T 17/00*     (2006.01)
*G06V 10/75*     (2022.01)
*G06V 10/776*     (2022.01)
*G06V 40/16*     (2022.01)

(52) U.S. Cl.
CPC ............ *G06V 10/774* (2022.01); *G06T 17/00* (2013.01); *G06V 10/751* (2022.01); *G06V 10/776* (2022.01); *G06V 40/171* (2022.01)

(58) Field of Classification Search
None
See application file for complete search history.

(56) References Cited

U.S. PATENT DOCUMENTS

| 11,222,466 | B1 * | 1/2022 | Naruniec | ............... G06N 3/088 |
| 2019/0294866 | A9 | 9/2019 | Qiu et al. | |
| 2019/0311301 | A1 * | 10/2019 | Pyati | ..................... G06F 16/901 |
| 2019/0377409 | A1 | 12/2019 | Lemley et al. | |
| 2020/0250497 | A1 | 8/2020 | Peng et al. | |

(Continued)

FOREIGN PATENT DOCUMENTS

WO     WO-2017177259 A1 * 10/2017

OTHER PUBLICATIONS

Heo J and Sawides M., "Rapid D Face Modeling Using a Frontal Face and a Profile Face for Accurate D Pose Synthesis," 2011 IEEE International Conference on Automatic Face & Gesture Recognition (FG), 2011, pp. 632-638.

(Continued)

*Primary Examiner* — Aaron M Richer
(74) *Attorney, Agent, or Firm* — Lowenstein Sandler LLP

(57)          ABSTRACT
A method for training a machine learning model using information pertaining to a human face, the method includes generating training data for the machine learning model. Generating the training data includes generating a training input, the training input including information representing 2D images of human faces corresponding to a beauty target, and generating a target output for the training input. The target output identifies, for each of the 2D images of human faces corresponding to the beauty target, information identifying one or more facial features represented in the respective 2D image of human faces corresponding to the beauty target. The method further includes providing the training data to train the machine learning model on (i) a set of training inputs including the training input, and (ii) a set of target outputs including the target output.

24 Claims, 17 Drawing Sheets

(56)                    References Cited

U.S. PATENT DOCUMENTS

| | | | |
|---|---|---|---|
| 2021/0182625 A1* | 6/2021 | Arar ....................... | G06V 10/82 |
| 2021/0406996 A1 | 12/2021 | Yu et al. | |
| 2022/0366568 A1 | 11/2022 | Arar et al. | |
| 2023/0036366 A1 | 2/2023 | Sun et al. | |
| 2023/0169669 A1 | 6/2023 | Kamijo et al. | |
| 2023/0277089 A1 | 9/2023 | Morin et al. | |
| 2024/0164640 A1* | 5/2024 | Schler .................. | A61B 5/7282 |
| 2024/0220850 A1* | 7/2024 | Ooi ........................ | G06N 20/00 |

OTHER PUBLICATIONS

Ren Y., et al., "Semantics Characterization For Eye Shapes Based On Directional Triangle-Area Curve Clustering," Multimedia Tools and Applications, May 2019, vol. 78, pp. 25373-25406.

\* cited by examiner

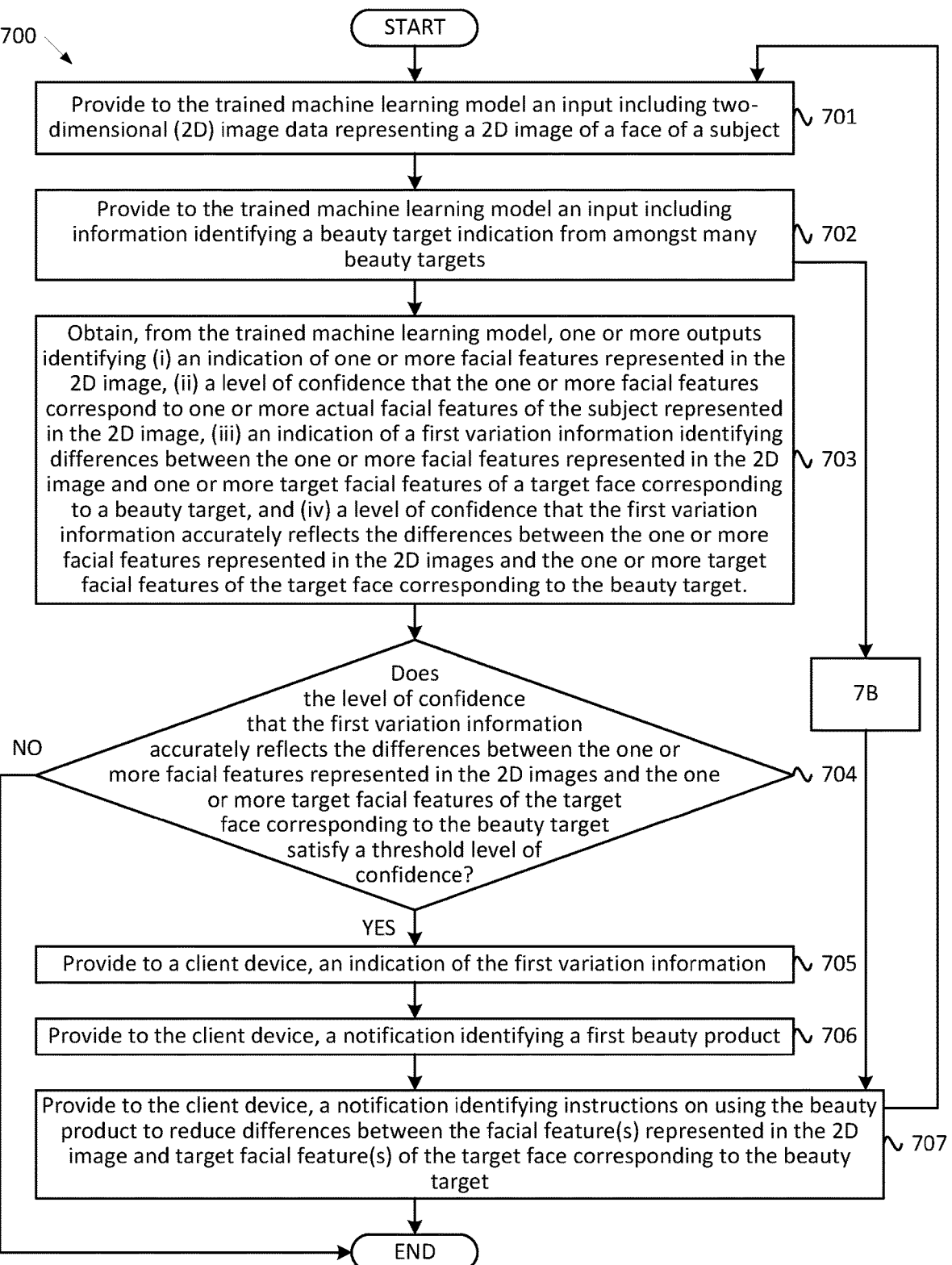

700

START

Provide to the trained machine learning model an input including two-dimensional (2D) image data representing a 2D image of a face of a subject ∿ 701

Provide to the trained machine learning model an input including information identifying a beauty target indication from amongst many beauty targets ∿ 702

Obtain, from the trained machine learning model, one or more outputs identifying (i) an indication of one or more facial features represented in the 2D image, (ii) a level of confidence that the one or more facial features correspond to one or more actual facial features of the subject represented in the 2D image, (iii) an indication of a first variation information identifying differences between the one or more facial features represented in the 2D image and one or more target facial features of a target face corresponding to a beauty target, and (iv) a level of confidence that the first variation information accurately reflects the differences between the one or more facial features represented in the 2D images and the one or more target facial features of the target face corresponding to the beauty target. ∿ 703

Does the level of confidence that the first variation information accurately reflects the differences between the one or more facial features represented in the 2D images and the one or more target facial features of the target face corresponding to the beauty target satisfy a threshold level of confidence? ∿ 704

NO

7B

YES

Provide to a client device, an indication of the first variation information ∿ 705

Provide to the client device, a notification identifying a first beauty product ∿ 706

Provide to the client device, a notification identifying instructions on using the beauty product to reduce differences between the facial feature(s) represented in the 2D image and target facial feature(s) of the target face corresponding to the beauty target ∿ 707

END

FIG. 7A

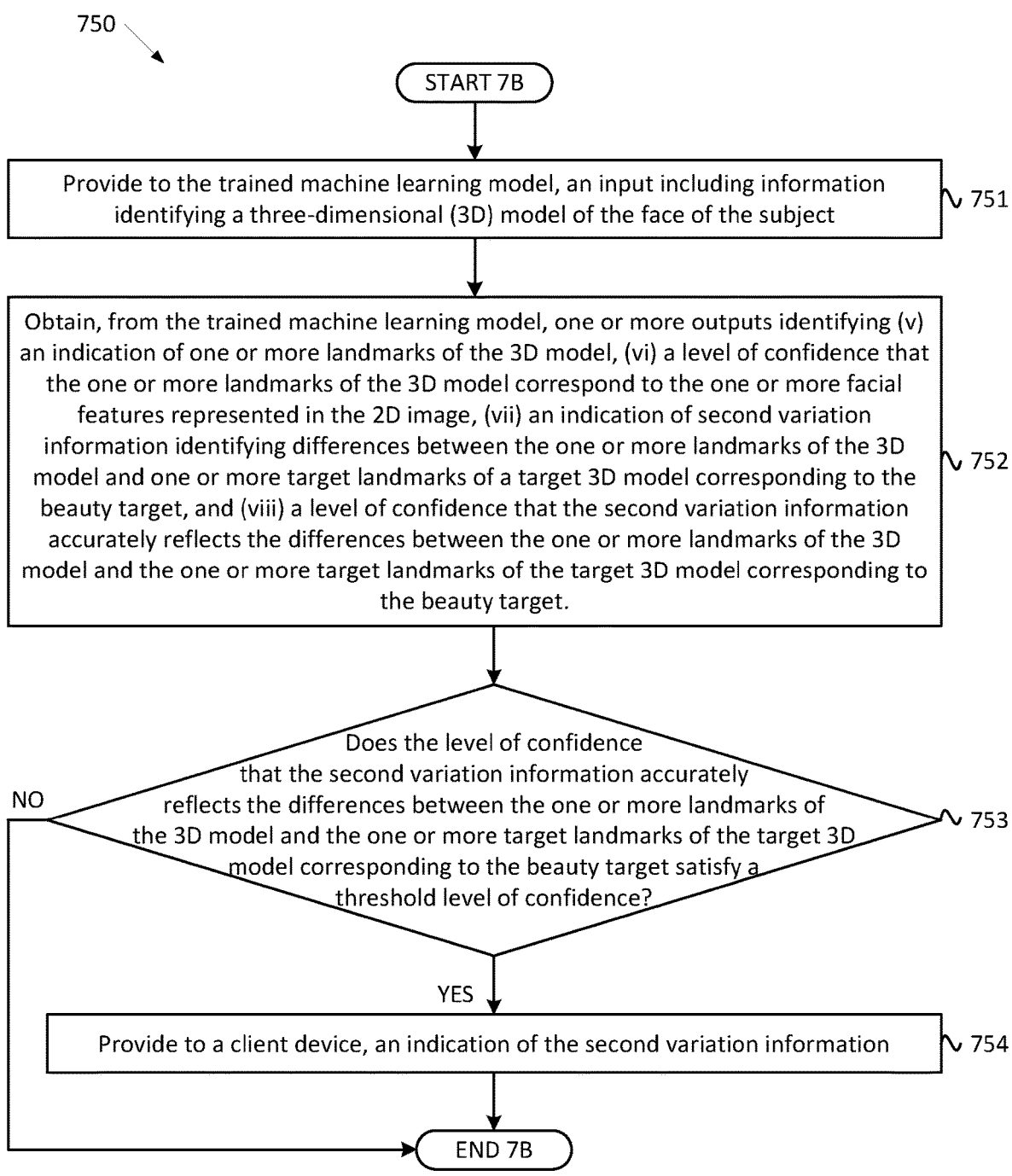

750

START 7B

Provide to the trained machine learning model, an input including information identifying a three-dimensional (3D) model of the face of the subject — 751

Obtain, from the trained machine learning model, one or more outputs identifying (v) an indication of one or more landmarks of the 3D model, (vi) a level of confidence that the one or more landmarks of the 3D model correspond to the one or more facial features represented in the 2D image, (vii) an indication of second variation information identifying differences between the one or more landmarks of the 3D model and one or more target landmarks of a target 3D model corresponding to the beauty target, and (viii) a level of confidence that the second variation information accurately reflects the differences between the one or more landmarks of the 3D model and the one or more target landmarks of the target 3D model corresponding to the beauty target. — 752

Does the level of confidence that the second variation information accurately reflects the differences between the one or more landmarks of the 3D model and the one or more target landmarks of the target 3D model corresponding to the beauty target satisfy a threshold level of confidence? — 753

NO

YES

Provide to a client device, an indication of the second variation information — 754

END 7B

FIG. 7B

LANDMARK 1002A

LANDMARK 1002B

LANDMARK 1002C

LANDMARK 1002D

LANDMARK 1002F

LANDMARK 1002H

LANDMARK 1002J

LANDMARK 1002N

LANDMARK 1002E

LANDMARK 1002G

LANDMARK 1002I

1000

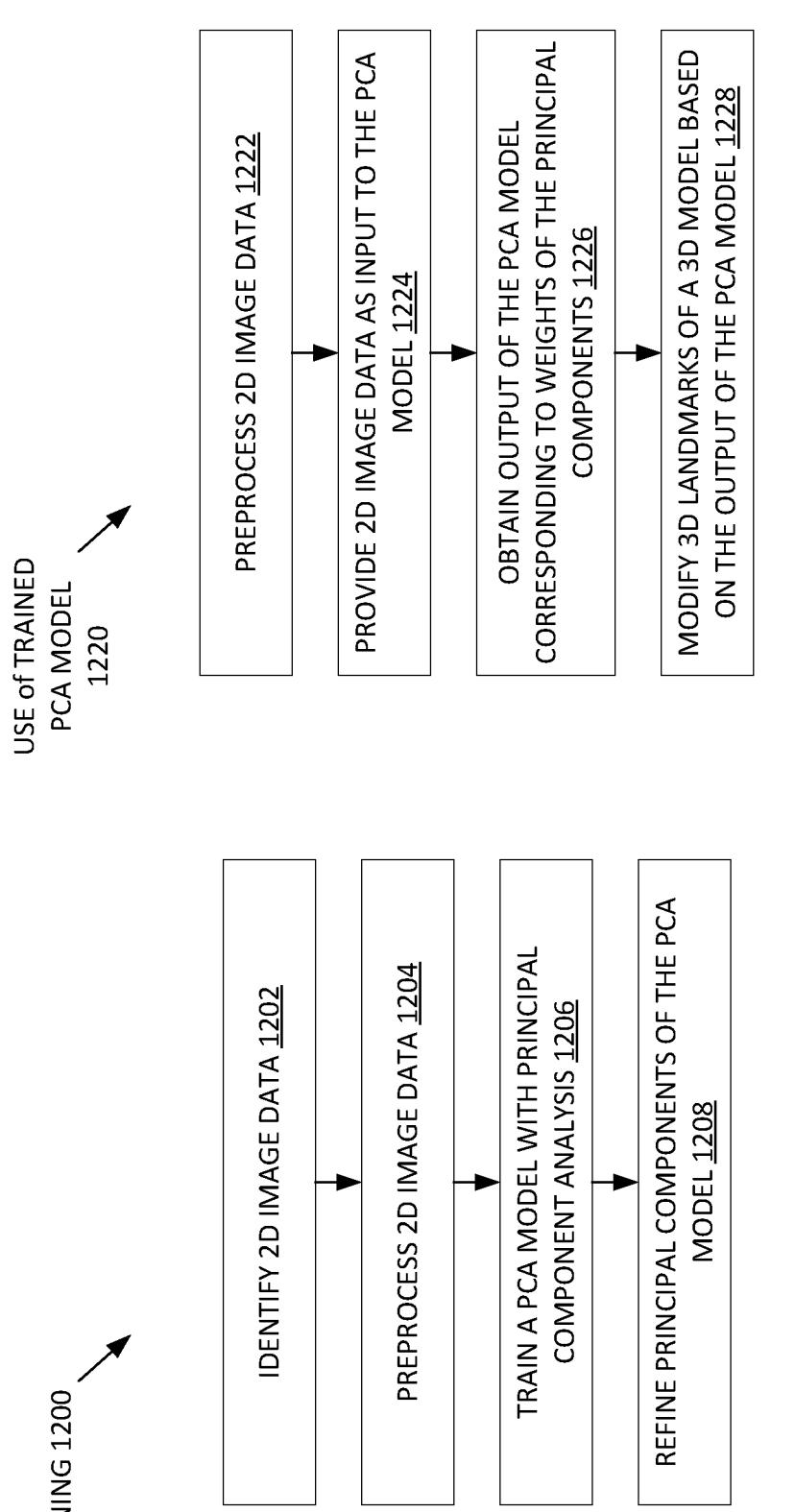

USE of TRAINED PCA MODEL 1220

PREPROCESS 2D IMAGE DATA 1222

PROVIDE 2D IMAGE DATA AS INPUT TO THE PCA MODEL 1224

OBTAIN OUTPUT OF THE PCA MODEL CORRESPONDING TO WEIGHTS OF THE PRINCIPAL COMPONENTS 1226

MODIFY 3D LANDMARKS OF A 3D MODEL BASED ON THE OUTPUT OF THE PCA MODEL 1228

FIG. 12B

TRAINING 1200

IDENTIFY 2D IMAGE DATA 1202

PREPROCESS 2D IMAGE DATA 1204

TRAIN A PCA MODEL WITH PRINCIPAL COMPONENT ANALYSIS 1206

REFINE PRINCIPAL COMPONENTS OF THE PCA MODEL 1208

FIG. 12A

USING TWO-DIMENSIONAL IMAGES AND MACHINE LEARNING TO IDENTIFY INFORMATION PERTAINING TO FACIAL FEATURES

TECHNICAL FIELD

Aspects and embodiments of the disclosure relate to data processing, and more specifically, to using two-dimensional (2D) images and machine learning to identify information pertaining to facial features.

BACKGROUND

Image processing can include the manipulation of digital images using various techniques and algorithms to improve their quality, extract useful information, or perform specific tasks.

SUMMARY

The following is a simplified summary of the disclosure to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure provides a computer-implemented method for training a machine learning model using information pertaining to a human face, the method comprising: generating training data for the machine learning model, wherein generating the training data comprises: generating a first training input, the first training input comprising information representing 2D images of human faces corresponding to a first beauty target; and generating a first target output for the first training input, wherein the first target output identifies, for each of the 2D images of human faces corresponding to the first beauty target, information identifying one or more facial features represented in the respective 2D image of human faces corresponding to the first beauty target; and providing the training data to train the machine learning model on (i) a set of training inputs comprising the first training input, and (ii) a set of target outputs comprising the first target output.

In some aspects, generating the training data further comprises: generating a second target output for the first training input, wherein the second target output comprises information identifying relationships between the one or more facial features represented in each of the 2D images of human faces corresponding to the first beauty target, wherein the set of target outputs comprises the second target output.

In some aspects, the 2D images of human faces corresponding to the first beauty target are first 2D images, wherein generating the training data further comprises: generating a second training input, the second training input comprising information representing second 2D images of human faces corresponding to a non-beauty target; generating a third target output for the second training input, wherein the third target output identifies, for each of the second 2D images of human faces corresponding to the non-beauty target, information identifying one or more facial features represented in the respective second 2D image of human faces corresponding to the non-beauty target; generating a fourth target output for the second training input, wherein the fourth target output comprises information identifying relationships between the one or more facial features represented in each of the 2D images of human faces corresponding to the non-beauty target; and generating a fifth target output for the second training input, wherein the fifth target output comprises information identifying variation information, the variation information representing differences between the information identifying the relationships between the one or more facial features represented in each of the 2D images of human faces corresponding to the first beauty target and the information identifying the relationships between the one or more facial features represented in each of the 2D images of human faces corresponding to the non-beauty target, wherein the set of training inputs comprises the second training input, and wherein the set of target outputs comprises the third target output, the fourth target output, and the fifth target output.

In some aspects, the 2D images of human faces corresponding to the first beauty target are first 2D images, wherein generating the training data further comprises: generating a third training input, the third training input comprising information representing second 2D images of human faces corresponding to a second beauty target among a plurality of beauty targets, wherein the set of training inputs comprises the third training input.

In some aspects, generating the training data further comprises: generating a fourth training input, the fourth training input comprising information identifying three-dimensional (3D) models of human faces corresponding to the first beauty target and the 2D images of human faces corresponding to the first beauty target, wherein the set of training inputs comprises the fourth training input.

In some aspects, generating the training data further comprises: generating a sixth target output for the fourth training input, wherein the sixth target output identifies, for each of the 3D models of human faces corresponding to the first beauty target, information identifying one or more landmarks that correspond to the one or more facial features represented in the respective 2D image, wherein the set of target outputs comprises the sixth target output.

In some aspects, generating the training data further comprises: generating a seventh target output for the fourth training input, wherein the seventh target output comprises information identifying relationships between the one or more landmarks on each of the 3D models of human faces, wherein the set of target outputs comprises the seventh target output.

In some aspects, the 2D images of human faces corresponding to the first beauty target are first 2D images, wherein the 3D models of human faces corresponding to the first beauty target are first 3D models, wherein generating the training data further comprises: generating a fifth training input, the fifth training input comprising information representing second 2D images of human faces corresponding to a non-beauty target; generating an eighth target output for the fifth training input, wherein the eighth target output identifies, for each of the second 2D images of human faces, information identifying one or more facial features represented in the respective second 2D image of human faces corresponding to the non-beauty target; generating sixth training input, the sixth training input comprising information representing second 3D models of human faces corresponding to the non-beauty target and the second 2D images of human faces corresponding to the non-beauty target; generating ninth target output for the sixth training input, wherein the ninth target output identifies, for each of the second 3D models of human faces corresponding to the non-beauty target, information identifying one or more landmarks that correspond to the one or more facial features represented in the respective second 2D image; generating a tenth target output for the sixth training input, wherein the tenth target output comprises information identifying relationships between the one or more landmarks on each of the second 3D models of human faces; and generating an eleventh target output for the sixth training input, wherein the eleventh target output comprises information identifying second variation information, the second variation information representing differences between the information identifying the relationships between the one or more landmarks on each of the 3D models of human faces corresponding to the first beauty target and the information identifying the relationships between the one or more landmarks on each of the 3D models of human faces corresponding to the non-beauty target, wherein the set of training inputs comprises the fifth training input and the sixth training input, and wherein the set of target outputs comprises the eighth training output, the ninth training output, the tenth training output, and the eleventh training output.

In some aspects, generating the training data further comprises: generating a twelfth target output for the fourth training input, wherein the twelfth target output comprises information identifying geometric data for the one or more landmarks on each of the 3D models of human faces, wherein the set of target outputs comprises the twelfth target output.

In some aspects, the fourth training input further comprises correspondence data that maps points of the 3D models of human faces to corresponding points of the 2D images of human faces.

In some aspects, generating the fourth training input comprises: performing a pre-processing operation to generate 3D models of human faces corresponding to the first beauty target using 2D image data representing the 2D images of human faces corresponding to the first beauty target.

An aspect of the disclosure provides a computer-implemented method for training a machine learning model using information pertaining to a human face, the method comprising: generating training data for the machine learning model, wherein generating the training data comprises: generating a first training input, the first training input comprising information representing 2D images of human faces corresponding to a first beauty target; providing the training data to train the machine learning model on a set of training inputs comprising the first training input; and obtaining from the machine learning model a first training output of a set of training outputs based on the set of training inputs, wherein the first training output identifies, for each of the 2D images of human faces, information identifying one or more facial features represented in the respective 2D image.

In some aspects, the method further comprises: comparing the set of training outputs to an evaluation metric related to the one or more facial features; and modifying one or more parameters of the machine learning model based on the comparison.

In some aspects, the one or more facial features comprise a computer-derived facial feature.

In some aspects, generating the training data further comprises: generating a second training input, the second training input comprising information identifying three-dimensional (3D) models of human faces corresponding to the first beauty target and the 2D images of human faces corresponding to the first beauty target, wherein the set of training inputs comprises the second training input.

In some aspects, generating the training data further comprises: obtaining from the machine learning model a second training output based on the set of training inputs, wherein the second training output identifies, for each of the 3D models of human faces corresponding to the first beauty target, information identifying one or more landmarks that correspond to the one or more facial features represented in the respective 2D image corresponding to the first beauty target, wherein the set of training outputs comprises the second training output.

In some aspects, generating the training data further comprises: obtaining from the machine learning model a third training output based on the set of training inputs, wherein the third training output comprises information identifying relationships between the one or more landmarks on each of the 3D models of human faces corresponding to the first beauty target, wherein the set of training outputs comprises the third training output.

An aspect of the disclosure provides a computer-implemented method for using a trained machine learning model using information pertaining to a human face, comprising: providing to the trained machine learning model a first input comprising two-dimensional (2D) image data representing a 2D image of a face of a subject; and obtaining, from the trained machine learning model, one or more outputs identifying (i) an indication of one or more facial features represented in the 2D image, (ii) a level of confidence that the one or more facial features correspond to one or more actual facial features of the subject represented in the 2D image, (iii) an indication of first variation information representing differences between the one or more facial features represented in the 2D image and one or more target facial features of a target face corresponding to a beauty target, and (iv) a level of confidence that the first variation information accurately reflects the differences between the one or more facial features represented in the 2D images and the one or more target facial features of the target face corresponding to the beauty target.

In some aspects, the first variation information describes differences between first relationships and first target relationships, wherein the first relationships are between the one or more facial features represented in the 2D image of the face of the subject, and wherein the first target relationships are between the one or more target facial features of the target face corresponding to the beauty target.

In some aspects, the method further comprises: determining whether the level of confidence that the first variation information accurately reflects the differences between the one or more facial features represented in the 2D images and the one or more target facial features of the target face corresponding to the beauty target satisfies a threshold level of confidence; and responsive to determining that the level of confidence satisfies the threshold level of confidence, providing, to a client device, an indication of the first variation information.

In some aspects, the method further comprises: receiving an indication of a user selection of the beauty target among a plurality of beauty target; and providing to the trained machine learning model a second input comprising information identifying the beauty target selected among the plurality of beauty targets.

In some aspects, the method further comprises: providing to the trained machine learning model a third input comprising information identifying a three-dimensional (3D) model of the face of the subject; and obtaining, from the trained machine learning model, the one or more outputs identifying (v) an indication of one or more landmarks of the 3D model, (vi) a level of confidence that the one or more landmarks of the 3D model correspond to the one or more facial features represented in the 2D image, (vii) an indication of second variation information identifying differences between the one or more landmarks of the 3D model and one or more target landmarks of a target 3D model corresponding to the beauty target, and (viii) a level of confidence that the second variation information accurately reflects the differences between the one or more landmarks of the 3D model and the one or more target landmarks of the target 3D model corresponding to the beauty target.

In some aspects, the second variation information describes differences between second relationships and second target relationships, wherein the second relationships are between the one or more landmarks of the 3D model, and wherein the second target relationships are between the one or more target landmarks of the target 3D model corresponding to the beauty target.

In some aspects, the method further comprises: determining whether the level of confidence that the second variation information accurately reflects the differences between the one or more landmarks of the 3D model and the one or more target landmarks of the target 3D model corresponding to the beauty target satisfies a threshold level of confidence; and responsive to determining that the level of confidence satisfies the threshold level of confidence, providing, to a client device, an indication of the second variation information.

In some aspects, the second information describes differences between geometric data and target geometric data, the target geometric data based on the one or more landmarks of the 3D model, and the target geometric data based on the one or more target landmarks of the target 3D model corresponding to the beauty target.

In some aspects, the method further comprises: selecting, among a plurality of beauty products, a first beauty product based on the first variation information and the second variation information; and providing, to a client device, a first notification identifying the first beauty product.

In some aspects, the method further comprises: providing, to the client device, a second notification identifying instructions on using the beauty product to reduce the differences between the one or more facial features represented in the 2D images and the one or more target facial features of the target face corresponding to the beauty target.

A further embodiment(s) of the disclosure provides a system comprising: a memory; and a processing device, coupled to the memory, the processing device to perform a method according to any aspect or embodiment described herein. A further embodiment(s) of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

FIG. 7A depicts a flow diagram of an example method for using a machine learning model and images of a human face to identify facial features, in accordance with aspects of the disclosure.

FIG. 7B depicts a flow diagram of an example sub-method that can be performed as a portion of the method for using a machine learning model and images of a human face to identify facial features, in accordance with aspects of the disclosure.

FIG. 12A illustrates a flow diagram of an example method for training a PCA model, in accordance with aspects of the disclosure.

FIG. 12B illustrates a flow diagram of an example method for using a trained PCA model, in accordance with aspects of the disclosure.

DETAILED DESCRIPTION

Figure 1A:
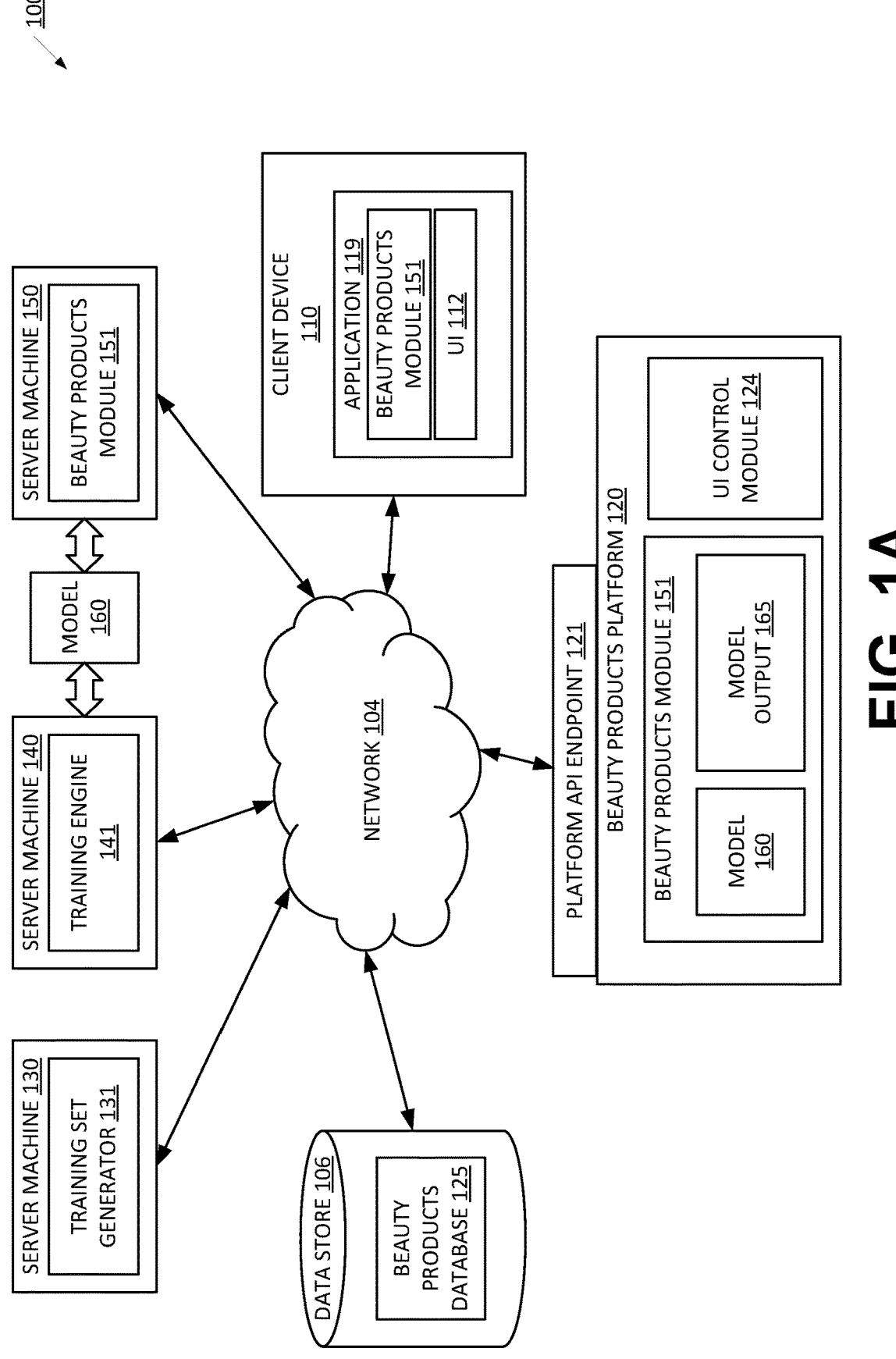
FIG. 1A illustrates an example system, in accordance with aspects of the disclosure.

Embodiments described herein are related to methods and systems for using 2D images and machine learning to identify information pertaining to facial features of a human face.

Variation in human faces can be exceptionally high compared to many other body parts. This high degree of variability in facial features can be due to a combination of genetic, environmental, and stochastic factors, for example. The human face exhibits a wide range of shapes, sizes, colors, and expressions, making each individual's face unique.

Beauty products are often developed to enhance or alter specific facial features, contributing to a relationship between facial feature variability and beauty products. For example, personal preference for facial features can vary widely among individuals. Beauty products can cater to individual preferences by offering a wide range of products for different purposes. In another example, as awareness of diverse beauty standards grows, the number of beauty products that are suitable for a wide range of facial features and that celebrate the natural variability in facial features also grows. With the high degree of variability in facial features, large number of personal preferences, and the large variety of beauty products, providing relevant information and services associated with beauty products can be challenging.

In some conventional systems, color information from two-dimensional (2D) images of human faces is used to provide, for example, relevant information and services to users. However, color information of 2D images may be inaccurate (e.g., poor lighting) and not reflect actual skin tones. Moreover, using only color information of 2D images can be limiting at least because color information alone may not accurately reflect facial features (e.g., geometry of a user's facial features).

Additionally, some conventional systems may provide beauty products, but often provide limited information (much less subject-specific information) that facilitates the application of the beauty products in a manner that helps users achieve their beauty goals.

Aspects of the disclosure address the above challenges as well as others by enhancing image processing techniques with machine learning to provide information pertaining to facial features. In some embodiments, the information pertaining to facial features received as output from a trained machine learning model can include 2D information and/or three-dimensional (3D) information reflecting one or more of the subject's facial features, the facial features of a beauty target (e.g., a beauty standard selected, among multiple beauty standards, by the subject), and differences between the subject's facial features and the beauty target's facial features.

In some embodiments, the beauty products platform can receive a 2D image taken by a camera and that represents a subject's face (e.g., 2D image data representing the 2D image). The 2D image data can be transformed, using image processing, from a 2D representation to a 3D structure (e.g., 3D model represented by 3D model data) that adds or estimates a 3rd dimension (e.g., depth) to the information captured in the 2D image. One or more of 2D image data representing the 2D image of the subject's face, 3D model data representing the 3D model of the subject's face, and/or a user selected preference of a particular beauty target, among multiple beauty targets, is used as input to the trained machine learning model. The trained machine learning model (e.g., trained to enhance image processing) can provide an output that includes one or more of 2D information corresponding to the subject's facial features (e.g., one or more of 2D facial feature data, 2D geometric data, and/or 2D facial feature relationship data), 3D information corresponding to the subject's facial features (e.g., one or more of 3D landmark data, 3D geometric data, and/or 3D landmark relationship data), and/or variation information that describes the differences between the 2D information and/or 3D information corresponding to the subject's facial features and the 2D information and/or 3D information corresponding to the beauty target's facial features.

In some embodiments, the output of the trained machine learning model can be used to provide a variety of information and services, such as information and services related to beauty products. For example, the variation information can be provided to the client device to help the subject understand the differences between the subject's facial features and the beauty target. In another example, the variation information can be used with an interactive tutorial (e.g., augmented reality (AR) tutorial) that teaches a subject how apply a beauty product such that the subject's facial features approximate the facial features of a user-selected beauty target.

In some embodiments, the machine learning model can be trained by pairing inputs to corresponding outputs. The machine learning model can be trained based on multiple 2D images of human faces, such as multiple 2D images representing faces of one or more beauty targets and 2D images representing faces of a non-beauty target. In some embodiments, for each 2D image the input to the machine learning model can include one or more of 2D image data, 3D model data, and correspondence data that maps 2D points of the 2D image to 3D points of the 3D model. The 2D image data used as input can be paired with output data that includes corresponding 2D information (e.g., one or more 2D facial feature data, 2D geometric data, or 2D facial feature relationship data). The 3D model data used as input can be paired with 3D information (e.g., one or more of 3D landmark data, 3D geometric data, or 3D landmark data). In some embodiments, for each 2D image the output of the machine learning model can include variation information that reflects the differences between the output data (2D information and/or 3D information) for the beauty target and non-beauty target.

As noted, a technical problem addressed by some embodiments of the disclosure is identifying and/or generating facial feature information represented in 2D image data of a subject's face.

A technical solution to the above identified technical problem can include using a machine learning and/or other algorithms described herein to identify information pertaining to facial features, such as computer-derived information, from 2D image data.

As noted, another technical problem addressed by some embodiments of the disclosure is identifying information pertaining to facial features using a 2D image.

A technical solution to the above identified technical problem can include enhancing image processing by one or more of training a machine learning model and using the trained machine learning model to derive information pertaining facial features based on one or more 2D images. In some embodiments, the machine learning model can be trained using one or more of 2D image data and 3D model data derived from the 2D image data. In some embodiments, the trained machine learning model can output one or more of 2D information corresponding to the subject's facial features (e.g., one or more of 2D facial feature data, 2D geometric data, or 2D facial feature data), 3D information corresponding to the subject's facial features (e.g., one or more of 3D landmark data, 3D geometric data, or 3D landmark relationship data), and/or variation information that describes the differences between the 2D information and 3D information corresponding to the subject's facial features and the 2D information and 3D information corresponding to the beauty target's facial features.

Thus, the technical effect can include improving image processing of 2D images, and in particular enhancing image analysis and features extraction by training a machine learning model and/or implementing the machine learning model trained to provide information pertaining to facial features of a subject.

A beauty product can refer to any substance or item designed for use on the body, particularly the face, skin, hair, and nails, often with the purpose of enhancing and/or maintaining beauty and appearance.

A facial feature can refer to a physical characteristic or element that is part of a human face. Facial features can include, but are not limited to the lips, nose, tip of the nose, bridge of the nose, eyes, inner eye, pupil, eyelids, eyebrows, inner eyebrow, outer eyebrow, center eyebrow, cheeks (e.g., cheek bones, etc.), jaw (e.g., jawline, etc.), among others.

A beauty target (also referred to as "facial beauty target" or "facial target" herein) can refer to one or more qualities or attributes (e.g., physical characteristics, such as facial features), often of a human face, that are shared between a group. In some case, the one or more qualities or attributes are preferred (e.g., desirable aesthetic) by an individual of group of people.

A non-beauty target (also referred to as a "facial non-beauty target" herein) can refer to one or more qualities or attributes (e.g., physical characteristics, such as facial features), often of a human face, that are different than a beauty target. In some cases, the one or more qualities or attributes are not preferred (e.g., undesirable aesthetic) by an individual of group of people.

FIG. 1A illustrates an example of a system 100A, in accordance with aspects of the disclosure. The system 100A includes a beauty products platform 120, one or more server machines 130-150, a data store 106, and client device 110 connected to network 104. In some embodiments, system 100A can include one or more other platforms (such as those illustrated in FIG. 1B).

A beauty product can refer to any substance or item designed for use on the body, particularly the face, skin, hair, and nails, often with the purpose of enhancing and/or maintaining beauty and appearance. Beauty products can often be part of personal care and grooming routines, and can serve various functions, such as cleansing, moisturizing, styling, and embellishing. Beauty products include, but are not limited to, skincare products such as cleansers, moisturizers, serums, toners, or other products designed to care for the skin and/or address specific skin concerns. Beauty products can include haircare product, such as shampoos, conditioners, hair masks, styling products (e.g., hair wax, hair spray, etc.), and treatments often designed to clean, nourish, and/or style the hair (e.g., hair cutting and styling). Beauty products can include cosmetics, such as foundation, lipstick, eyeshadow, mascara, eyeliner, bronzer, or other items often applied to enhance facial features and/or create different "looks." Beauty products can include nail care products, such as nail polish, nail polish remover and/or other products that can help maintain healthy and/or attractive nails. Beauty products can include fragrance products such as perfumes and colognes designed to add or enhance the scent of the body or user. Beauty products can include personal care products such as deodorants, body lotions, shower gels, or other products designed to maintain personal hygiene. Beauty products can include false eyelashes, such as strip lashes, individual clusters, individual hairs, or artificial lash extensions that are designed for application at the eye area often to enhance or accentuate a user's eyes or eyelashes. Beauty products can include artificial nails, such as acrylic nails, gel nails, press-on nails, fiberglass or silk wraps, nail tips, semi-cured artificial nails and other products that are designed to protect and/or enhance a user's nails. Beauty products can include eyebrow products such as eyebrow pencils or pens, eyebrow powders, eyebrow gels, eyebrow pomades, eyebrow waxes, eyebrow highlighters, eyebrow stencils, eyebrow brushes or combs or other products that are designed to enhance and/or shape the eyebrows. Beauty products can include tools and accessories such as brushes, combs, sponges, applicators and/or other tools used in the application of various beauty products.

In some embodiments, network 104 can include a public network (e.g., the Internet), a private network (e.g., a local area network (LAN) or wide area network (WAN)), a wired network (e.g., Ethernet network), a wireless network (e.g., an 802.11 network or a wireless fidelity (Wi-Fi) network), a cellular network (e.g., a Long Term Evolution (LTE) network), routers, hubs, switches, server computers, and/or a combination thereof.

Data store 106 can be a persistent storage that is capable of storing data such as beauty products information, 2D image information, 3D model information, machine learning model data, etc. Data store 106 can be hosted by one or more storage devices, such as main memory, magnetic or optical storage based disks, tapes or hard drives, network-attached storage (NAS), storage area network (SAN), and so forth. In some embodiments, data store 106 can be a network-attached file server, while in other embodiments the data store 106 can be another type of persistent storage such as an object-oriented database, a relational database, and so forth, that can be hosted by beauty products platform 120, or one or more different machines coupled to the server hosting the beauty products platform 120 via the network 104. In some embodiments, data store 106 can be capable of storing one or more data items, as well as data structures to tag, organize, and index the data items. A data item can include various types of data including structured data, unstructured data, vectorized data, etc., or types of digital files, including text data, audio data, image data, video data, multimedia, interactive media, data objects, and/or any suitable type of digital resource, among other types of data. An example of a data item can include a file, database record, database entry, programming code or document, among others.

In some embodiments, data store 106 can implement beauty products database 125.

In some embodiments, beauty products database 125 can store information (e.g., data items) related to one or more beauty products.

In some embodiments, beauty products database 125 can include a vector database. In some embodiment, a vector database can index and/or store vector data, such as vector embeddings (e.g., also referred to as vector embedding data). In some embodiments, the vector embedding data can have the same or variable dimensionality. The vector embedding data can include one or more of word embedding data (e.g., vector representation of a word), image embedding data (e.g., vector representation of an image), audio embedding data (e.g., vector representation of audio content), and so forth. In some embodiments, the vector embedding data can represent one or more beauty products. Additional details of beauty products database 125 are further described herein.

The client device(s) (e.g., client device 110) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client devices 110 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some embodiments, client device(s) may also be referred to as a "user device" herein. Although a single client device 110 is shown for purposes of illustration rather than limitation, one or more client devices can be implemented in some embodiments. Client device 110 will be referred to as client device 110 or client devices 110 interchangeably herein.

In some embodiments, a client device, such as client device 110, can implement or include one or more applications, such as application 119 executed at client device 110. In some embodiments, application 119 can be used to communicate (e.g., send and receive information) with beauty products platform 120. In some embodiments, application 119 can implement user interfaces (UIs) (e.g., graphical user interfaces (GUIs)), such as a user interface (UI) (e.g., UI 112) that may be webpages rendered by a web browser and displayed on the client device 110 in a web browser window. In another embodiment, the UIs 112 of client application, such as application 119 may be included in a stand-alone application downloaded to the client device 110 and natively running on the client device 110 (also referred to as a "native application" or "native client application" herein). In some embodiments, beauty products module 151 can be implemented as part of application 119. In other embodiments, beauty products module 151 can be separate from application 119 and application 119 can interface with beauty products module 151.

In some embodiments, one or more client devices 110 can be connected to the system 100A. In some embodiments, client devices, under direction of the beauty products platform 120 when connected, can present (e.g., display) a UI 112 to a user of a respective client device through application 119. The client devices 110 may also collect input from users through input features.

In some embodiments, a UI 112 may include various visual elements (e.g., UI elements) and regions, and can be a mechanism by which the user engages with the beauty products platform 120, and system 100A at large. In some embodiments, the UI 112 of a client device 110 can include multiple visual elements and regions that enable presentation of information, for decision-making, content delivery, etc. at a client device 110. In some embodiments, the UI 112 may sometimes be referred to as a graphical user interface (GUI)).

In some embodiments, the UI 112 and/or client device 110 can include input features to intake information from a client device 110. In one or more examples, a user of client device 110 can provide input data (e.g., a user query, control commands, etc.) into an input feature of the UI 112 or client device 110, for transmission to the beauty products platform 120, and system 100A at large. Input features of UI 112 and/or client device 110 can include space, regions, or elements of the UI 112 that accept user inputs. For example, input features may include visual elements (e.g., GUI elements) such as buttons, text-entry spaces, selection lists, drop-down lists, etc. For example, in some embodiments, input features may include a chat box which a user of client device 110 can use to input textual data (e.g., a user query).

The application 119 via client device 110 can then transmit that textual data to beauty products platform 120, and the system 100A at large, for further processing. In other examples, input features can include a selection list, in which a user of client device 110 can input selection data e.g., by selecting, or clicking. The application 119 via client device 110 can then transmit that selection data to beauty products platform 120, and the system 100A at large, for further processing.

In some embodiments, client device 110 can include a camera (e.g., digital camera) to capture images, such as two-dimensional (2D) images, and video (e.g., sequential video frames of a video item). The images and/or video can be sent to beauty products platform 120 using application 119. In some embodiments, client device 110 can stream a video item to beauty products platform 120 using application 119. The video frames of a video item can be arranged (e.g., sequentially arranged) using timestamps. In some embodiments, application 119 can be used to implement augmented reality (AR) or virtual reality (VR) features at client device 110.

In some embodiments, a client device 110 can access the beauty products platform 120 through network 104 using one or more application programming interface (API) calls via platform API endpoint 121. In some embodiments, beauty products platform 120 can include multiple platform API endpoints 121 that can expose services, functionality, or information of the beauty products platform 120 to one or more client devices 110. In some embodiments, a platform API endpoint 121 can be one end of a communication channel, where the other end can be another system, such as a client device 110 associated with a user account. In some embodiments, the platform API endpoint 121 can include or be accessed using a resource locator, such a universal resource identifier (URI), universal resource locator (URL), of a server or service. The platform API endpoint 121 can receive requests from other systems, and in some cases, return a response with information responsive to the request. In some embodiments, HTTP (Hypertext Transfer Protocol), HTTPS (Hypertext Transfer Protocol Secure) methods (e.g., API calls) can be used to communicate to and from the platform API endpoint 121.

In some embodiments, the platform API endpoint 121 can function as a computer interface through which access requests are received and/or created. In some embodiments, the platform API endpoint 121 can include a platform API whereby external entities or systems can request access to services and/or information provided by the beauty products platform 120. The platform API can be used to programmatically obtain services and/or information associated with a request for services and/or information.

In some embodiments, the API of the platform API endpoint 121 can be any suitable type of API such as a REST (Representational State Transfer) API, a GraphQL API, a SOAP (Simple Object Access Protocol) API, and/or any suitable type of API. In some embodiments, the beauty products platform 120 can expose through the API, a set of API resources which when addressed can be used for requesting different actions, inspecting state or data, and/or otherwise interacting with the beauty products platform 120. In some embodiments, a REST API and/or another type of API can work according to an application layer request and response model. An application layer request and response model can use HTTP, HTTPS, SPDY, or any suitable application layer protocol. Herein HTTP-based protocol is described for purposes of illustration, rather than limitation. The disclosure should not be interpreted as being limited to the HTTP protocol. HTTP requests (or any suitable request communication) to the beauty products platform 120 can observe the principals of a RESTful design or the protocol of the type of API. RESTful is understood in this document to describe a Representational State Transfer architecture. The RESTful HTTP requests can be stateless, thus each message communicated contains all necessary information for processing the request and generating a response. The platform API can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

It can be appreciated that in some embodiments, any element, such as server machine 130, server machine 140, server machine 150, and/or data store 106 may include a corresponding API endpoint for communicating with APIs.

In some embodiments, the beauty products platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to data or services. Such computing devices can be positioned in a single location or can be distributed among many different geographical locations. For example, beauty products platform 120 can include a plurality of computing devices that together may comprise a hosted computing resource, a grid computing resource, or any other distributed computing arrangement. In some embodiments, beauty products platform 120 can correspond to an elastic computing resource where the allotted capacity of processing, network, storage, or other computing-related resources may vary over time.

In some embodiments, beauty products platform 120 can implement beauty products module 151. In some embodiments, beauty products module 151 can implement one or more features and/or operations as described herein. In some embodiments, beauty products module 151 can include or access one or more of model 160, and model output 165. In some embodiments, beauty products platform 120 can receive 2D image data of a 2D image representing a human face of a subject and/or 3D model data of a 3D model representing the human face of the subject. Beauty products platform 120 can provide the 2D image data and/or the 3D model data to the beauty products module 151. In some embodiments, beauty products module 151 can use the 2D image data and/or the 3D model data as an input to a trained machine learning model, such as model 160. Model 160 can generate outputs, including model output 165. The model output 165 can include information such as one or more of: (i) information identifying 2D facial features data represented in the 2D image data, (ii) information identifying 2D geometric data for respective 2D facial features, (iii) information identifying relationships between the 2D facial features represented in the 2D image data (e.g., 2D facial feature relationship data), (iv) information identifying 3D landmarks corresponding to the facial features (e.g., 3D landmark data), (v) information identifying 3D geometric data pertaining to the 3D landmark data corresponding to the 2D facial features, (vi) information identifying relationships between the 3D landmarks (e.g., 3D landmark relationship data), and/or (vii) information identifying variation information. In some embodiments, model outputs (i)-(vii) can correspond to a beauty target and/or a non-beauty target.

Additional details regarding beauty target output data and non-beauty target output data is described below in FIGS. 2-7B.

In some embodiments, beauty products platform 120 and in particular, the UI control module 124 may perform user-display functionalities of the system such as generating, modifying, and monitoring the client-side UIs (e.g., graphical user interfaces (GUI)) and associated components that are presented to users of the beauty products platform 120 through UI 112 client devices 110. For example, beauty products module 151 via UI control module 124 can generate the UIs (e.g., UI 112 of client device 110) that users interact with while engaging with the beauty products platform 120.

In some embodiments, a machine learning model (e.g., also referred to as an "artificial intelligence (AI) model" herein) can include a discriminative machine learning model (also referred to as "discriminative AI model" herein), a generative machine learning model (also referred to as "generative AI model" herein), and/or other machine learning model.

In some embodiments, a discriminative machine learning model can model a conditional probability of an output for given input(s), A discriminative machine learning model can learn the boundaries between different classes of data to make predictions on new data. In some embodiments, a discriminative machine learning model can include a classification model that is designed for classification tasks, such as learning decision boundaries between different classes of data and classifying input data into a particular classification. Examples of discriminative machine learning models include, but are not limited to, support vector machines (SVM) and neural networks.

In some embodiments, a generative machine learning model learns how the input training data is generated and can generate new data (e.g., original data). A generative machine learning model can model the probability distribution (e.g., joint probability distribution) of a dataset and generate new samples that often resemble the training data. Generative machine learning models can be used for tasks involving image generation, text generation and/or data synthesis. Generative machine learning models include, but are not limited to, gaussian mixture models (GMMs), variational autoencoders (VAEs), generative adversarial networks (GANs), large language models (LLMs), visual language models (VLMs), multi-modal models (e.g., text, images, video, audio, depth, physiological signals, etc.), and so forth.

Training of and inference using discriminative machine learning models and generative machine learning models is described herein. It should be noted that although the training of and inference using discriminative machine learning model and generative machine learning model are described separately for the purposes of clarity, it can be appreciated that elements described with respect to discriminative machine learning models can apply to generative machine learning models, and vice versa, unless otherwise described.

In some embodiments, some elements of FIG. 1A, such as training set generator 131 of server machine 130, training engine 141 of server machine 140, and model 160 can apply to a discriminative machine learning model, unless otherwise described. In some embodiments, some elements of FIG. 1B can apply to generative machine learning model(s), unless otherwise described.

Server machine 130 includes a training set generator 131 that is capable of generating training data (e.g., a set of training inputs and a set of target outputs) to train a model 160 (e.g., a discriminative machine learning model). In some embodiments, training set generator 131 can generate the training data based on various data (e.g., stored at data store 106 or another data store connected to system 100A via the network 104). Data store 106 can store metadata associated with the training data.

Server machine 140 includes a training engine 141 that is capable of training a model 160 using the training data from training set generator 131. The model 160 (also referred to "machine learning model" or "artificial intelligence (AI) model" herein) may refer to the model artifact that is created by the training engine 141 using the training data that includes training inputs (e.g., features) and corresponding target outputs (correct answers for respective training inputs) (e.g., labels). The training engine 141 may find patterns in the training data that map the training input to the target output (the answer to be predicted) and provide the model 160 that captures these patterns. The model 160 may be composed of, e.g., a single level of linear or non-linear operations (e.g., a support vector machine (SVM), or may be a deep network, i.e., a machine learning model that is composed of multiple levels of non-linear operations). An example of a deep network is a neural network with one or more hidden layers, and such machine learning model may be trained by, for example, adjusting weights of a neural network in accordance with a backpropagation learning algorithm or the like. Model 160 can use one or more of a support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc. For convenience rather than limitation, the remainder of this disclosure describing discriminative machine learning model will refer to the implementation as a neural network, even though some implementations might employ other type of learning machine instead of, or in addition to, a neural network.

In some embodiments, such as with a supervised machine learning model, the one or more training inputs of the set of the training inputs are paired with respective one or more training outputs of the set of training outputs. The training input-output pair(s) can be used as input to the machine learning model to help train the machine learning model to determine, for example, patterns in the data.

In some embodiments, training data, such as training input and/or training output, and/or input data to a trained machine learning model (collectively referred to as "machine learning model data" herein) can be preprocessed before providing the aforementioned data to the (trained or untrained) machine learning model (e.g., discriminative machine learning model and/or generative machine learning model) for execution. Preprocessing as applied to machine learning models (e.g., discriminative machine learning model and/or generative machine learning model) can refer to the preparation and/or transformation of machine learning model data.

In some embodiments, preprocessing can include data scaling. Data scaling can include a process of transforming numerical features in raw machine learning model data such that the preprocessed machine learning model data has a similar scale or range. For example, Min-Max scaling (Normalization) and/or Z-score normalization (Standardization) can be used to scale the raw machine learning model. For instance, if the raw machine learning model data includes feature representing temperatures in Fahrenheit, the raw machine learning model data can be scaled to a range of [0, 1] using Min-Max scaling.

In some embodiments, preprocessing can include data encoding. Encoding data can include a process of converting categorical or text data into a numerical format on which a machine learning model can efficiently execute. Categorical data (e.g., qualitative data) can refer to a type of data that represents categories and can be used to group items or observations into distinct, non-numeric classes or levels. Categorical data can describe qualities or characteristics that can be divided into distinct categories, but often does not have a natural numerical meaning. For example, colors such as red, green, and blue can be considered categorical data (e.g., nominal categorical data with no inherent ranking). In another example, "small," "medium," and "large" can be considered categorical data (ordinal categorical data with an inherent ranking or order). An example of encoding can include encoding a size feature with categories ["small," "medium," "large"] by assigning 0 to "small," 1 to "medium," and 2 to "large."

In some embodiments, preprocessing can include data embedding. Data embedding can include an operation of representing original data in a different space, often of reduced dimensionality (e.g., dimensionality reduction), while preserving relevant information and patterns of the original data (e.g., lower-dimensional representation of higher-dimensional data). The data embedding operation can transform the original data so that the embedding data retains relevant characteristics of the original data and is more amenable for analysis and processing by machine learning models. In some embodiments embedding data can represent original data (e.g., word, phrase, document, or entity) as a vector in vector space, such as continuous vector space. Each element (e.g., dimension) of the vector can correspond to a feature or property of the original data (e.g., object). In some embodiments, the size of the embedding vector (e.g., embedding dimension) can be adjusted during model training. In some embodiments, the embedding dimension can be fixed to help facilitate analysis and processing of data by machine learning models.

In some embodiments, the training set is obtained from server machine 130. Server machine 150 includes a beauty products module 151 that provides current data (e.g., 2D image data, etc.) as input to the trained machine learning model (e.g., model 160) and runs the trained machine learning model (e.g., model 160) on the input to obtain one or more outputs.

In some embodiments, confidence data can include or indicate a level of confidence of that a particular output (e.g., output(s)) corresponds to one or more inputs of the machine learning model (e.g., trained machine learning model). In one example, the level of confidence is a real number between 0 and 1 inclusive, where 0 indicates no confidence that output(s) corresponds to a particular one or more inputs and 1 indicates absolute confidence that the output(s) corresponds to a particular one or more inputs. In some embodiments, confidence data can be associated with inference using a machine learning model.

In some embodiments, machine learning model, such as model 160, may be (or may correspond to) one or more computer programs executed by processor(s) of server machine 140 and/or server machine 150. In other embodiments, machine learning model may be (or may correspond to) one or more computer programs executed across a number or combination of server machines. For example, in some embodiments, machine learning models may be hosted on the cloud, while in other embodiments, these machine learning models may be hosted and perform operations using the hardware of a client device 110. In some embodiments, the machine learning models may be a self-hosted machine learning model, while in other embodiments, machine learning models may be external machine learning models accessed by an API.

In some embodiments, server machines 130 through 150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to one or more data items of the beauty products platform 120. The beauty products platform 120 can also include a website (e.g., a webpage) or application back-end software that can be used to provide users with access to the beauty products platform 120.

In some embodiments, one or more of server machine 130, server machine 140, model 160, server machine 150 can be part of beauty products platform 120. In other embodiments, one or more of server machine 130, server machine 140, server machine 150, or model 160 can be separate from beauty products platform 120 (e.g., provided by a third-party service provider).

Also as noted above, for purpose of illustration, rather than limitation, aspects of the disclosure describe the training of a machine learning model (e.g., model 160) and use of a trained machine learning model (e.g., model 160). In other embodiments, a heuristic model or rule-based model can be used as an alternative. It should be noted that in some other embodiments, one or more of the functions of beauty products platform 120 can be provided by a greater number of machines. In addition, the functionality attributed to a particular component of the beauty products platform 120 can be performed by different or multiple components operating together. Although embodiments of the disclosure are discussed in terms of beauty products platforms, embodiments can also be generally applied to any type of platform or service.

Figure 1B:
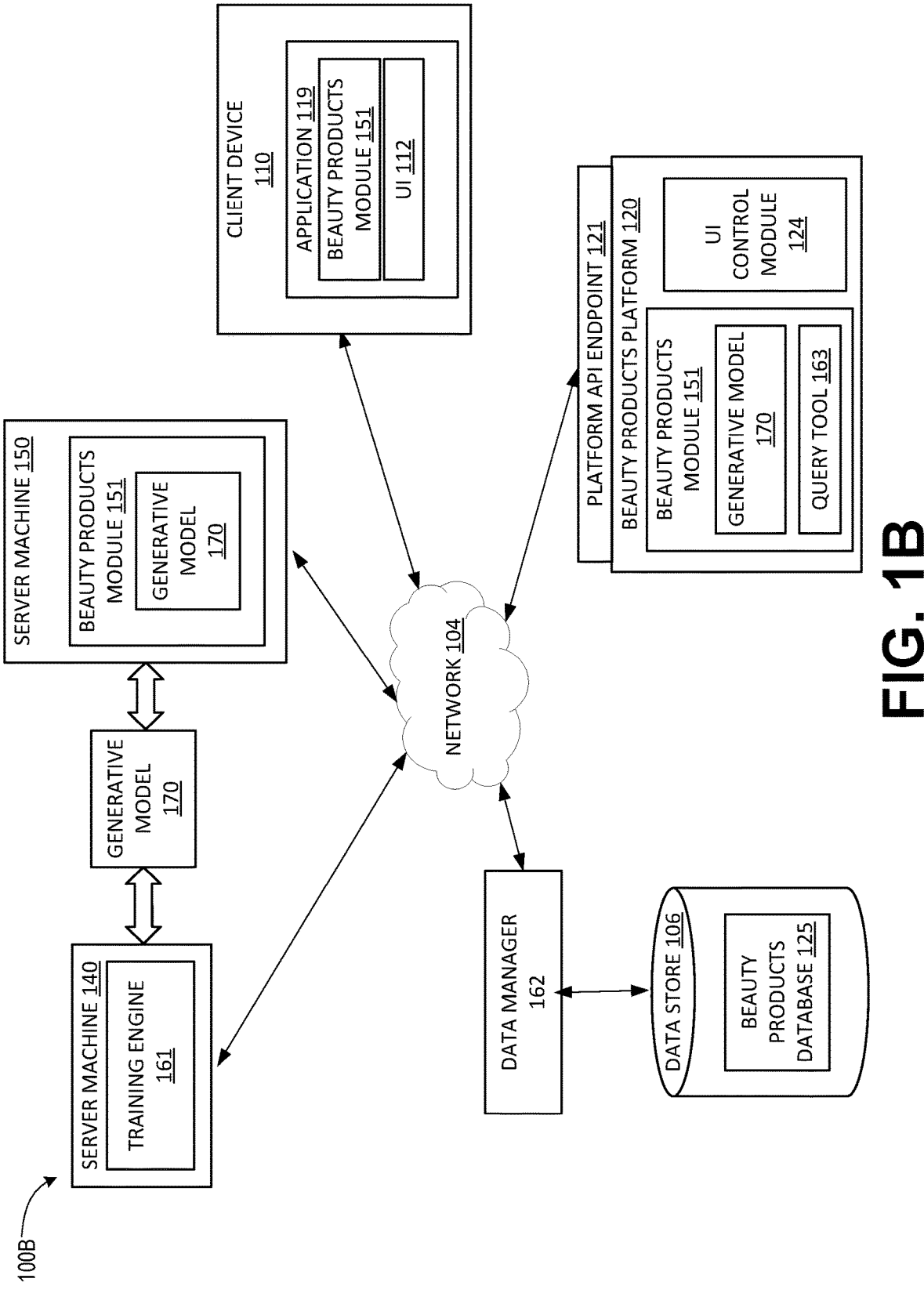
FIG. 1B illustrates a high-level component diagram of an example system for a generative machine learning model, in accordance with aspects of the disclosure.

FIG. 1B illustrates a high-level component diagram of an example system architecture, system 100B, for a generative machine learning model, in accordance with aspects of the disclosure. It can be noted that elements of system 100A can be used to help describe elements of system 100B. For the sake of clarity and brevity, the description of elements of FIG. 1A can similarly apply to corresponding elements of FIGS. 1B and 1s not repeated here. It can be further noted the description of FIG. 1A can similarly apply to FIG. 1B, unless otherwise described, and is not repeated here for the sake of clarity and brevity.

The system 100B includes a data store 106, a generative machine learning model 170 trained by server machine 140 and provided to server machine 150, a beauty products platform 120, one or more client devices 110, data manager 162 and/or other components connected to a network 104. In some embodiments, system 100B can, at least in part, be a part of or can be included in system 100A, as described above.

In some embodiments, the system 100B includes a server machine 150 including a generative machine learning model 170 (also referred to as "generative AI model," or "generative model (GM)" herein). In some embodiments, a generative machine learning model 170 can be trained according based on a corpus of data, as described herein.

In some embodiments, a generative machine learning model 170 can deviate from some machine learning models based on the generative machine learning model's ability to generate new, original data. As described above, a generative machine learning model 170 can include a generative adversarial network (GAN) and/or a variational autoencoder (VAE). In some instances, a GAN, a VAE, and/or other types of generative machine learning models can employ different approaches to training and/or learning the underlying probability distributions of training data, compared to some machine learning models.

For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

In some embodiments, the generative machine learning model 170 can be a generative large language model (LLM). In some embodiments, the generative machine learning model 170 can be a large language model that has been pre-trained on a large corpus of data so as to process, analyze, and generate human-like text based on given input.

In some embodiments, the generative machine learning model 170 may have any architecture for LLMs, including one or more architectures as seen in Generative Pre-trained Transformer (GPT) series (Chat GPT series LLMs), Google's Bard®, or LaMDA, or leverage a combination of transformer architecture with pre-trained data to create coherent and contextually relevant text.

In some embodiments, a generative machine learning model 170, such as an LLM, can use an encoder-decoder architecture including one or more self-attention mechanisms, and one or more feed-forward mechanisms. In some embodiments, the generative machine learning model 170 can include an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative machine learning model 170 can also utilize the previously discussed deep learning techniques, including recurrent neural networks (RNNs), convolutional neural networks (CNNs), or transformer networks.

In some embodiments, the generative machine learning model 170 can be a multi-modal generative machine learning model, such as a Visual-Language Model (VLM). In some embodiments, the generative machine learning model 170 can be a VLM that has been pre-trained on a large corpus of data (e.g., textual data and image data) so as to process, analyze, and generate human-like text and/or image data based on given input (e.g., image data and/or natural language text).

With respect to generative machine learning model 170, generative machine learning model 170 can be trained by server machine 140 (or another server or computing device of system 100B), in some embodiments.

In some embodiments, training a generative machine learning model can include providing training input to a generative machine learning model 170, and the generative machine learning model 170 can produce one or more training outputs. The one or more training inputs can be compared to one or more evaluation metrics. An evaluation metric can refer to a measure used to assess the output (e.g., training output(s)) of a machine learning model, such as a generative machine learning model 170. In some embodiments, the evaluation metric can be specific to the task and/or goals of the machine learning model. Based on the comparison, one or more parameters and/or weights of the generative machine learning model 170 can be adjusted (e.g., backpropagation based on computed loss). In some embodiments, and for example, the one or more training outputs can be compared to an evaluation metric such as a ground truth (e.g., target output, such as a correct or better answer). In some embodiments and for example, the one or more training outputs can be evaluated/compared to an evaluation metric and can be rewarded (e.g., evaluated as a positive answer) or penalized (e.g., evaluated as a negative answer) based on the quality of the one or more training outputs (e.g., reinforcement learning).

In some embodiments, a validation engine (not shown) may be capable of validating a generative machine learning model 170 using a corresponding set of features of a validation set from the training set generator. In some embodiments, the validation engine may determine an accuracy of each of the trained generative models, such as generative machine learning model 170 (e.g., accuracy of the training output) based on the corresponding sets of features of the validation set. The validation engine may discard a trained generative machine learning model 170 that has an accuracy that does not meet a threshold accuracy. In some embodiments, a selection engine not shown) may be capable of selecting a generative machine learning model 170 that has an accuracy that meets a threshold accuracy. In some embodiments, the selection engine may be capable of selecting the trained generative machine learning model 170 that has the highest accuracy of the trained generative models (e.g., generative machine learning model 170).

A testing engine (not shown) may be capable of testing a trained generative machine learning model 170 using a corresponding set of features of a testing set from the training engine 141. For example, a first trained generative machine learning model 170 that was trained using a first set of features of the training set may be tested using the first set of features of the testing set. The testing engine may determine a trained generative machine learning model 170 that has the highest accuracy of all of the trained machine learning models based on the testing sets.

In some embodiments, a generative machine learning model 170 can be trained on a corpus of data, such textual data and/or image data. In some embodiments, the generative machine learning model 170 can be a model that is first pre-trained on a corpus of text to create a foundational model (e.g., also referred to as "pre-trained model" herein), and afterwards adapted (e.g., fine-tuned or transfer learning) on more data pertaining to a particular set of tasks to create a more task-specific or targeted generative machine learning model (e.g., also referred as an "adapted model" herein.) The foundational model can first be pre-trained using a corpus of data (e.g., text and/or images) that can include text and/or image content in the public domain, licensed content, and/or proprietary content (e.g., proprietary organizational data). The generative machine learning model 170 can use pre-training to learn broad image elements and/or broad language elements including general sentence structure, common phrases, vocabulary, natural language structure, and any other elements commonly associated with natural language in a large corpus of text. In example, the pre-trained model can be fine-tuned to the specific task or domain that the generative machine learning model 170 is to be adapted.

In some embodiments, generative machine learning model 170 may include one or more pre-trained models or adapted models.

System 100B may further include a data manager 162 that may be any application configured to manage data transport to and from data store 106, e.g., retrieval of data and/or storage of new data, indexing data, arranging data by user, time, type of activity to which the data is related, associating the data with keywords, and/or the like. Data manager 162 may collect data associated with various user activities, e.g., content pertaining to user 2D images, user 2D video steams, beauty products, applications, internal tools, and/or the like. Data manager 162 may collect, transform, aggregate, and archive such data in data store 106. In some embodiments, data manager 162 can transform data into vector data, such as vector embedding data, and index and store the vector data at data store 106. The data manager 162 can also provide the appropriate vector data to generative machine learning model (e.g., model 160) for training and inference.

In some embodiments, beauty products platform 120 may include query tool 163 (also referred to as "prompt tool 163" herein) configured to perform automated identification and facilitate retrieval of relevant and timely contextual information for quick and accurate processing of user queries (or queries by beauty products platform 120) by generative machine learning model 170. In some embodiments, query tool 163 may be implemented by beauty products module 151. It can be noted that a user's request for an operation pertaining to beauty products platform 120 can be formed into a query (e.g., prompt) that uses query tool 163, in some embodiments. Via the network 104, query tool 163 may be in communication with one or more client devices 110, sever server machine 140, server machine 150, and data store 106, e.g., via data manager 162. Communications between query tool 163 and server machine 150 may be facilitated by an API of server machine 150. Communications between query tool 163 and data store 106/data manager 162 may be facilitated by an API of the data store 106 and/or the data manager 162. In some embodiments, query tool 163 may generate an intermediate query (e.g., query analyzer) and may translate an intermediate query into unstructured natural-language format (e.g., natural language prompt) and, conversely, translate responses received from generative machine learning model 170 into any suitable form (including any structured proprietary format as may be primarily used by query tool 163).

In can be noted that a query as provided to a generative machine learning model can also be referred to as a "prompt" herein. A prompt can refer to an input (e.g., a specific input) or instruction provided to a generative machine learning model 170 to generate a response. In some embodiments, a prompt can be written, at least in part, in natural language. Natural language can refer a language that is expressed in or corresponds to a way that humans communicate using spoken or written language to convey meaning, express thoughts, and/or interact. In some embodiments, the prompt can specify the information or context the generative machine learning model 170 can use to produce an output. For example, a prompt can include text, image, or other data that serves as the starting point for the generative machine learning model 170 to perform a task.

In some embodiments, query tool 163 may include a query analyzer to support various operations. For example, query analyzer may receive a user input, e.g., user query, and generate one or more intermediate queries corresponding to generative machine learning model 170 to determine what type of data (e.g., user data, beauty product data, etc.)

generative machine learning model 170 might use to successfully respond to the user input. Responsive to receiving a response from generative machine learning model 170, query analyzer may analyze the response and form a request for relevant contextual data for data manager 162, which may then supply such data. Query analyzer may then generate a final query (e.g., prompt) to generative machine learning model 170 that includes the original user query and the contextual data received from data manager 162. In some embodiments, query analyzer may itself include a light-weight generative machine learning model that may process the intermediate query(ies) and determine what type of contextual data may have to be provided to generative machine learning model 170 together with the original user query to ensure a meaningful response from generative machine learning model 170.

For example, and in some embodiments, query tool 163 can implement a retrieval augmented generation (RAG) technique that allows the generative machine learning model 170 to retrieve data from various sources, such as data store 106. For instance, and in some embodiments, beauty products database 125 can include proprietary, domain-specific data and/or organization-specific data, such as data related to beauty products of a particular organization. Responsive to a user query, the query analyzer can identify specific instructions related to the user query and that instruct the query analyzer to obtain relevant contextual data from beauty products database 125. The query analyzer can identify relevant contextual data (e.g., organization-specific beauty products, instruction guides, tutorials etc.) from beauty products database 125 and generate a final query that includes the user query and the relevant contextual data. The final query can be provided as a prompt to generative machine learning model 170 for execution.

In some embodiments, query tool 163 may include (or may have access to) instructions stored on one or more tangible, machine-readable storage media of beauty products platform 120 and executable by one or more processing devices of beauty products platform 120. In some embodiments, beauty products module 151, query tool 163, and or generative machine learning model 170 may be implemented at beauty products platform 120. In some embodiments, beauty products module 151, query tool 163, and/or generative machine learning model 170 may be a combination of a client component and a server component. In some embodiments, beauty products module 151, query tool 163, and/or generative machine learning model 170 may be executed entirely on the client devices 110. Alternatively, some portion of beauty products module 151, query tool 163, and/or generative machine learning model 170 may be executed on a client device 110 while another portion of beauty products module 151, query tool 163, and/or generative machine learning model 170 may be executed on beauty products platform 120.

In some embodiments, UI 112 of client device 110 may allow a user to select from multiple (e.g., specialized in particular knowledge areas) of the generative machine learning models 170. In some embodiments, UI 112 may allow the user to provide consent for query tool 163 and/or generative machine learning model 170 to access user data previously stored in data store 106 (and/or any other memory device), process and/or store new data received from the user, and the like. UI 112 may allow the user to withhold consent to provide access to user data to query tool 163 and/or generative machine learning model 170.

In situations in which the systems discussed here collect personal information about users, or can make use of personal information, the users of client devices 110 can be provided with an opportunity to control whether or how the beauty products platform 120 collects user information. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the beauty products platform 120.

Figure 2:
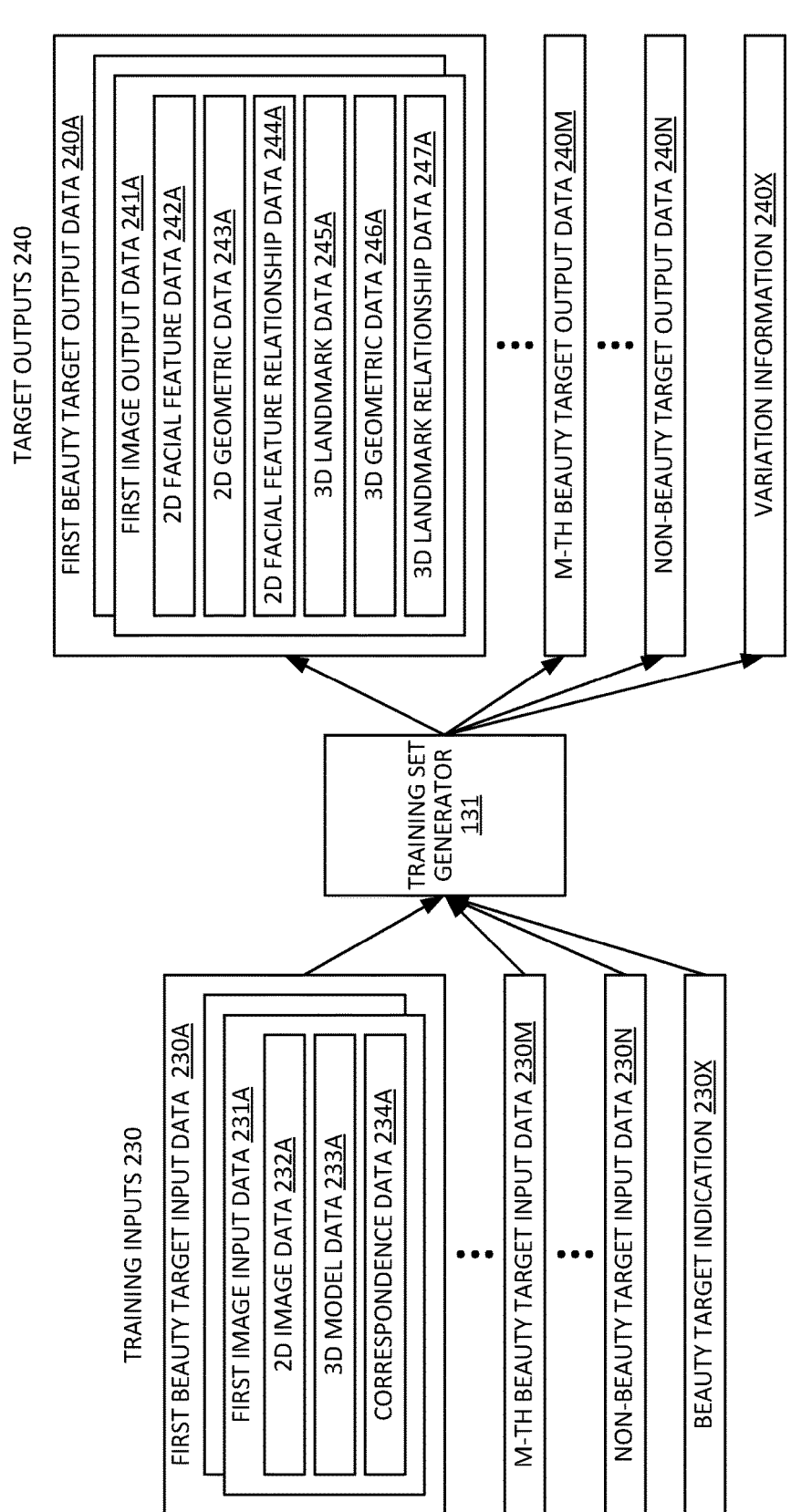
FIG. 2 is an example training set generator to create training data for a machine learning model using information pertaining to various beauty targets, in accordance with aspects of the disclosure.

FIG. 2 is an example training set generator to generate training data for a machine learning model using information pertaining to one or more beauty targets and one or more non-beauty target, in accordance with aspects of the disclosure. System 200 shows a training set generator 131, training inputs 230, and target outputs 240. System 200 can include similar components as system 100A and system 100B, as described in FIGS. 1A-B. Components described with reference to system 100A or system 100B of FIGS. 1A-B can be used to describe system 200 of FIG. 2.

In some embodiments, training set generator 131 generates training data that includes one or more training inputs 230, and one or more target outputs 240. The training data can include mapping data that maps the training inputs 230 to the target outputs 240. Training inputs 230 can also be referred to as "features" or "attributes," herein. In some embodiments, training set generator 131 can provide the training data in a training set, and provide the training set to the training engine 141 where the training set is used to train the model 160. Generating a training set is further described with reference to FIG. 3.

As noted above, the human face is one or the most variable and complex of human features. Similarly, the physical appearance of facial features can vary significantly among individuals. Beauty, and in particular beauty of a human face, is multifaceted and can be found in various forms. Rather than a single beauty architype, beauty can be found in range of skin tones, body shapes, facial features shapes, facial features sizes, hair textures, and features generally. Beauty can include and vary between and among different ethnicities, races, genders, ages, abilities, and backgrounds. Similarly, beauty targets can also vary widely.

As noted above, a beauty target (also referred to as "facial beauty target" or "facial target" herein) can refer to one or more qualities or attributes (e.g., physical characteristics, such as facial features), often of a human face, that are shared between a group. In some cases, the one or more qualities or attributes are preferred (e.g., desirable aesthetic) by an individual of group of people. In some embodiments, a beauty target can be defined by multiple images (e.g., 2D images) representing facial features of one or more individuals that share qualities and/or attributes. Similar to beauty, beauty targets can vary widely between people, cultures, and historical periods. Rather than a single beauty target, multiple beauty targets can co-exist and can include a range of skin tones, body shapes, facial features shapes, facial features sizes, hair textures, and features generally.

In some embodiments, a beauty target need not necessarily correspond to beauty, but rather be a target that is preferred by an individual or group of individuals. For instance, a group of makeup artist may desire a "beauty target" that looks like a face of troll, or some other whimsical or comical target.

As noted above, a non-beauty target (also referred to as a "facial non-beauty target" herein) can refer to one or more qualities or attributes (e.g., physical characteristics, such as facial features), often of a human face, that are different from a beauty target. In some cases, the one or more qualities or attributes are not preferred (e.g., undesirable aesthetic) by an individual of group of people. The non-beauty target can include one or more qualities or attributes that deviate from a beauty target.

As illustrated in FIG. 2, multiple beauty targets are represented by first beauty target input data 230A through an m-th beauty target input data 230M and first beauty target output data 240A through m-th beauty target output data (corresponding to a first beauty target input data 230A and an m-th beauty target input data 230M, respectively). In some embodiments, a beauty target can be different from other beauty targets. For example, one or more facial features or relationships between facial features can be different among beauty targets. In some embodiments, a beauty target may share some qualities and/or attributes with other beauty targets, but not all qualities or attributes. For example, a first beauty target and an m-th beauty target can share the same facial feature information representing a particular facial feature, but not other facial feature information representing other facial features. For instance, a first beauty target and an m-th beauty target may both share the same representation of a nose, but not share the same representation of other facial features. Facial feature information can include, but is not limited to, one or more of 2D information (e.g., one or more of 2D image data, 2D facial feature data, 2D geometric data, 2D facial feature relationship data, or 2D variation information) and 3D information (e.g., one or more of 3D model data, 3D landmark data, 3D geometric data, 3D landmark relationship data, or 3D variation information). In some embodiments, information pertaining to facial features can include some or all facial feature information.

Non-beauty target input data 230N and non-beauty target output data 240N can correspond to a non-beauty target. For example, a particular facial feature of a first beauty target can have substantially different facial features information (e.g., 2D lengths, widths, or ratios) facial feature information of the non-beauty target. For example, and in some embodiments, a nose length-to-width ratio corresponding to a first beauty target can significantly deviate from a nose length-to-with ratio corresponding to a non-beauty target.

Training Inputs

In some embodiments, training inputs 230 can include one or more of a first beauty target input data 230A through m-th beauty target input data 230M, a non-beauty target input data 230N (which can include one or more non-beauty targets having non-beauty target input data, also referred to collectively as "beauty target input data 230A-N" herein), and a beauty target indication 230X. It can be appreciated that for the purposes of brevity in FIG. 2, only elements of the first beauty target input data 230A are illustrated and described. The illustration and corresponding description of elements of the first beauty target input data 230A, including first image input data 231A, 2D image data 232A, 3D model data 233A, and correspondence data 234A can similarly apply to m-th beauty target input data 230M and non-beauty target input data 230N (e.g., as first beauty image input 231M/N, 2D image data 232M/N (not illustrated), etc.), unless otherwise described.

In some embodiments, each beauty target input can correspond to a respective beauty target output data. For example, the first beauty target input data 230A can correspond to the first beauty target output data 240A. Similarly, and in some embodiments, the m-th beauty target input data 230M can correspond to the m-th beauty target output data 240M, and the non-beauty target input data 230N can correspond to the non-beauty target output data 240N. In some embodiments, each beauty target input data 230A-N can include one or more image inputs (e.g., image input data) that represent a human face. For example, the first beauty target input data 230A can include first image input data 231A through Nth image input data (illustrated by the additional box behind the first image input data 231A element in FIG. 2).

In some embodiments and as noted above, each image input of each beauty target input data 230A-N can correspond to a respective image output information of a respective beauty target output data 240A-N. For example, the first image input data 231A of the first beauty target input data 230A can correspond to the first image output data 241A of the first beauty target output data 240A. In another example, an Nth image input of the first beauty target input data 230A can correspond to an Nth image output information of the first beauty target output data 240A.

In some embodiments, each image input data can include one or more of 2D image data, 3D model data, and/or correspondence data. For example, first image input data 231A includes 2D image data 232A representing a 2D image, 3D model data 233A (e.g., based on the 2D image), and correspondence data 234A, and an Nth image input data includes Nth 2D image data, Nth 3D model data, and Nth correspondence data. In some embodiments, each image input data can correspond to or be obtained from an image. For example, first image input data 231A can be obtained from a first image (e.g., a 2D image), and Nth image data can be obtained from an Nth image.

In some embodiments, each respective image input (e.g., first image input data 231A) can correspond to a distinct representation of a human face. For example, each image input data can correspond to an image of a human face (e.g., 2D image representing a human face). In some embodiments, each respective image input of a particular beauty target can correspond to the same human face or different human faces that share similar facial features. In some embodiments, each image input data can correspond to a respective image output data (e.g., first image input data 231A corresponds to first image output data 241A), and both can correspond to the same 2D image representing a human face. In some embodiments, each of different 2D images (e.g., Nth image) can correspond to respective image input data (e.g., Nth image input data) and image output data (e.g., Nth image output data).

In some embodiments, the 2D image data 232A can represent an image of a scene. In some embodiments, the scene can include one or more objects, such as an image of a person. In some embodiments, the 2D image data 232A can represent an image of a subject's face or a part of the subject's face (e.g., an image of a subject's eye area). In some embodiments, the 2D image data 232A can represent a frontal face image. A frontal face image can refer to an image taken from a front-facing perspective. For instance, in a frontal face image the subject can look directly at the camera.

In some embodiments, the 2D image data 232A can represent a still image. In some embodiments, the 2D image data 232A can represent one or more video images of a video, such as video images of a video stream. In some embodiments, the 2D image data 232A can include 2D coordinate information of points (e.g., pixels) of the 2D image (e.g., x- and y-coordinates). In some embodiments, the 2D image can lack depth information (e.g., depth information measured by a depth camera). In some embodiments, the 2D image data 232A can include digital data (e.g., pixels) representing a digital image. In some embodiments, a 2D image may be represented in various formats such as joint photographic experts group (JPEG), portable network graphics (PNG), tag image file format (TIFF), etc. In some embodiments, 2D image data 232A may include color information by for example, using values of a color model such as a red, green, blue (RGB) color model or other color model.

In some embodiments, 2D image data 232A may identify one or more facial features of a target face. A target face can refer to a face that corresponds to a particular beauty target (e.g., first beauty target represented by first beauty target output data 240A). As noted above, a facial feature can refer to a physical characteristic or element that is part of a human face. Facial features can include, but are not limited to the lips, nose, tip of the noise, bridge of the nose, eyes, inner eye, pupil, eyelids, eyebrows, inner eyebrow, outer eyebrow, center eyebrow, cheeks (e.g., cheek bones, etc.), jaw (e.g., jawline, etc.), and/or other facial features.

In some embodiments, the 2D image data 232A can have fixed dimensional values (e.g., fixed width, height, and color depth, such as 24-bit). In some embodiments, the 2D image data 232A can have variable dimensional values. In some embodiments, the 2D image data 232A can include depth information. In some embodiments, the 2D image data 232A can include metadata such as a timestamp, location information indicating where an image was taken, image sensor specifications, facial feature coordinates and identifiers, etc.

In some embodiments, 3D model data 233A can represent a three-dimensional digital representation of a scene or object (e.g., a 3D model). In some embodiments, the 3D model data is derived or generating using the respective 2D image (e.g., the 2D image represented by 2D image data). In some embodiments, the 3D model data 233A of a 3D model can include width information, height information, and depth information of the scene and/or object. The 3D model data 233A can include geometric data that describes the corresponding scene or object. The geometric data can include one or more of vertices (e.g., points), edges, and/or faces. In some embodiments, vertices (e.g., nodes or points) can include points of a 3D model. A vertex can have 3D coordinates (e.g., x-, y-, and z-coordinates). The vertex can identify a location where one or more edges intersect. In some embodiments, an edge can include a line, such as a straight line and connect at least two vertices. In some embodiments, faces can include surfaces, such as planar surfaces, connecting edges (e.g., closed-loop edges). In some embodiments, one or more of vertices, edges and faces can define the geometry of a 3D model.

In some embodiments, the 3D model data 233A of the 3D model can include texture information that describes an object's surface texture. In some embodiments, 3D model data 233A does not include texture information. In some embodiments, 3D model data 233A includes material information that can influence the appearance of a 3D model at rendering (e.g., how light reflects from the material). In some embodiments, 3D model data 233A does not include material information. In some embodiments, the 3D model data 233A includes lighting information that describes the interaction of light (and absence of light) with the scene or object. In some embodiments, 3D model data 233A does not include lighting information. In some embodiments, 3D model data 233A includes color information that indicates the colors of surface (e.g., faces) of a 3D model.

In some embodiments, correspondence data 234A can include data that maps 3D points (e.g., vertices) of the 3D model data 233A that represent a 3D model to 2D points (e.g., pixels) of the 2D image data 232A that represent a 2D image. In some embodiments, correspondence data can indicate a relationship between (x-,y-) coordinates of a 2D point in 2D image data 232A that represent a 2D image, and (x-, y-, z-) coordinates of a 3D point in 3D model data 233A that represent a 3D model. In some embodiments, correspondence data 234A can include information for each 3D point in the 3D model data 233A that represent a 3D model (e.g., 1:1 mapping). In some embodiments, correspondence data 234A can map a cluster or group of 2D points in the 2D image data 232A that represent a 2D image to a single 3D point in the 3D model data 233A that represent a 3D model (e.g., many-to-one (X:1) mapping), and vice versa. In some embodiments, correspondence data 234A can be generated by performing one or more pre-processing operations on 2D image data 232A to generate the 3D model data 233A. In some embodiments, an algorithm or model, such as a principal component analysis (PCA) model can be used to transform the 2D image data 232A into a new set of dimensions (e.g., 3D model data 233A). Additional details regarding using a PCA model to generate a 3D model from 2D image data is described below with reference to FIGS. 10A-B.

In some embodiments, beauty target indication 230X can include an indication of a particular beauty target among the multiple beauty targets. For example, the beauty target indication 230X can identify the first beauty target (e.g., first beauty target input data 230A and a corresponding target output data, such as first beauty target output data 240A) among the Nth beauty targets. In some embodiments, a machine learning model can be trained on multiple beauty target inputs (e.g., first beauty target input data 230A through m-th beauty target input data 230M, etc.) and outputs. At inference, a particular beauty target among the multiple beauty targets can be selected such that input data representing the subject's face can be compared to a particular beauty target (e.g., rather than to multiple beauty targets). In some embodiments, the beauty target indication 230X can be implemented to provide a selection of a beauty target for comparison.

For example, the beauty target indication 230X can identify a selected beauty target among multiple beauty targets. The beauty target indication 230X can be provided to the training input to allow a machine learning model to put greater emphasis (e.g., weights) on the beauty target identified by the beauty target indication 230X. In some embodiments and for example, at inference the trained machine learning model can receive a selection of a beauty target (e.g., user selection) and machine learning model can evaluate the subject's face against the selected beauty target (rather than multiple beauty targets). In some embodiments, the beauty target indication 230X can be used by the training set generator 131 to determine which beauty target input 230A-M to use to generate variation information 240X.

As illustrated and in some embodiments, a single machine learning model can be trained with multiple beauty targets. In some embodiments, multiple machine learning models can be trained where each machine learning model is trained using a different beauty target. In such embodiments, a user or system can select a particular machine learning model that pertains to a particular beauty target.

Target Outputs

In some embodiments, target outputs 240 can include one or more of a first beauty target output data 240A through m-th beauty target output data 240M, a non-beauty target output data 240N (which can include one or more beauty targets having respective beauty target output data, also referred to collectively as "beauty target output data 240A-N" herein), and a variation information 240X. It can be appreciated that for the purposes of brevity in FIG. 2, only elements of the first beauty target output data 240A are illustrated and described. The illustration and corresponding description of elements of first beauty target output data 240A, including first image output data 241A, 2D facial feature data 242A, 2D geometric data 243A, 2D facial feature relationship data 244A, 3D landmark data 245A, 3D geometric data 246A, and 3D landmark relationship data 247A can similarly apply to the m-th beauty target output data 240M, and the non-beauty target output data 240N, unless otherwise described.

As described above and in some embodiments, each beauty target can correspond to respective beauty target input data and beauty target output data. That is, the training set generator 131 can generate a respective beauty target output data 240A-N for each respective beauty target input data 230A-N. For example, the training set generator 131 can generate the first beauty target output data 240A for the first beauty target input data 230A. In some embodiments, each beauty target 240A-N can include one or more sets of image output data that represent a human face. For example, the first beauty target output data 240A can include first image output data through Nth image output data (illustrated by the additional box behind the first image output data 241A element in FIG. 2). In some embodiments, each respective image output data can correspond to a particular 2D image.

Similarly, as described above and in some embodiments, each image output data in each beauty target output data 240A-N can correspond to a respective image input data of a respective beauty target input data 230A-N. For example, the first image output data 241A of the first beauty target output data 240A can correspond to the first image input data 231A of the first beauty target input data 230A, and an Nth image output data of the first beauty target output data 240A can correspond to an Nth image input data of the first beauty target input data 230A.

In some embodiments, each image output data can include one or more of 2D facial feature data, 2D geometric data, 2D facial feature relationship data, 3D landmark data, 3D geometric data, and/or 3D landmark relationship data. For example, the first image output data 241A includes 2D facial feature data 242A, 2D geometric data 243A, 2D facial feature relationship data 244A, 3D landmark data 245A, 3D geometric data 246A, and 3D landmark relationship data 247A.

In some embodiments, multiple sets of image output data of a particular beauty target output data 240A-N can be aggregated into a target output data or target representation. That is, each image output data (e.g., first image output data 241A) can be aggregated such that the respective beauty target output data 240A-N can represent a target face corresponding to the respective beauty target. For example, first image output data 241A of first beauty target output data 240A can be aggregated with Nth image output data of first beauty target output data 240A, such that the aggregated output data (e.g., using averages) can represent the first target output.

In some embodiments, the 2D facial feature data 242A can include data that represents one or more facial features of the human face (such as facial features described above). In some embodiments, the 2D facial feature data 242A can correspond to a respective 2D image represented by 2D image data 232A. For example, each 2D image (represented by 2D image data 232A) can include a respective instance of 2D facial feature data 242A. In another example, one or more facial features represented in a 2D image can be identified by respective 2D facial feature data. In some embodiments, for each of the facial features represented by the 2D facial feature data 242A, the 2D facial feature data 242A can identify one or more 2D points (e.g., pixels of the 2D image data 232A) that represent a respective facial feature. For instance, the nose of can be represented by a single 2D point at the tip of the nose, or by multiple 2D points along the bridge of the nose, the tip of the nose, and/or outline of the nose. In some embodiments, the 2D facial feature data 242A can include 2D coordinate data that represent the 2D points, such as x-coordinate and y-coordinate information identifying the one or more 2D points (e.g., pixels). In some embodiments, the 2D facial feature data 242A can include textual identifiers of respective facial features represented by one or more 2D points (e.g., points X through Z represent the bridge of the nose). In some embodiments, the 2D facial feature data 242A can include color data for the 2D points. For example, the color data for a 2D point can be expressed in values of the RGB model. It can be noted that points as described with respect to 2D information, such as 2D image data and 2D facial features data, 2D geometric data, and 2D facial feature relationship data can also be interchangeably described as pixels, herein, unless otherwise described. In some embodiments, the facial features represented by the 2D facial feature data 242A can be referred to as "target 2D facial features" or "target facial features" herein.

In some embodiments, 2D geometric data 243A can describe a facial feature represented by the 2D facial feature data 242A. In some embodiments, 2D geometric data can refer to information related to 2D coordinate space (e.g., describing objects and shapes that exist in a flat plane, typically defined by two perpendicular axes). In some embodiments, the 2D geometric data 243A can include one or more of 2D points (e.g., pixels), lines or curves, and/or shapes. In some embodiments, a 2D point can have 2D coordinates (e.g., x-, and y-coordinates). In some embodiments, the 2D point can identify a location where two or more lines or curves intersect. In some embodiments, a line can include a straight- or curved line and connect at least two 2D points. In some embodiments, shapes can include bounded areas, such as connecting lines (e.g., closed-loop lines, or enclosed shapes).

In some embodiments, the 2D geometric data 243A can include data identifying a relationship between two or more 2D points of a facial feature represented by the 2D facial feature data 242A (e.g., between two or more 2D points corresponding to the same facial feature). In some embodiments, the relationship between two or more 2D points can include one or more of distances, angles, positions, areas, or ratios.

In some embodiments, the 2D geometric data 243A can include data identifying a line or curve between two or more 2D points, and the distance therebetween. For example, the 2D geometric data 243A can include data identifying the length of an eyebrow that corresponds to a line or curve between two or more 2D points representing the eyebrow.

In some embodiments, the 2D geometric data 243A can include data identifying two or more lines between three or more 2D points, and the ratio between the length of each line. For instance, the 2D geometric data can include data identifying a ratio between an eye height (represented as a first line between an eye apex and an eye bottom) and an eye width (represented as a second line between an inner eye corner and an outer eye corner).

In some embodiments, the 2D geometric data 243A can include data identifying a curve between two or more 2D points, and a curvature radius of the curve. For example, the 2D geometric data 243A can include data identifying the curvature of an eyebrow that corresponds to a curve between two or more 2D points representing the eyebrow.

In some embodiments, the 2D geometric data 243A can include data identifying two or more lines between three or more 2D points, and the angle between the two or more lines. For example, the 2D geometric data 243A can include data identifying a first line between a 2D point representing to the inner eye corner and a 2D point corresponding to the outer eye corner, a second (horizontal) line intersecting a 2D point corresponding to the center of the pupil, and an angle between the first line and the second line.

In some embodiments, the 2D geometric data 243A can include data identifying two or more 2D points and a relative position of each of the two or more 2D points with respect to the group of two or more 2D points. For example, the 2D geometric data 243A can include data identifying a first 2D point, a second 2D point, a third 2D point, and respective lengths and slopes of lines between each point (e.g., a length and slope of a line between the first and second 2D point, a length and slope of a line between the first and third 2D point, etc.). For instance, the 2D geometric data 243A can include data identifying relative positional data for respective 2D points representing the inner corner of the eyebrow, the apex of the eyebrow, and the outer corner of the eyebrow, respectively.

In some embodiments, the 2D facial feature relationship data 244A can include data identifying a relationship between 2D facial feature data 242A of two or more facial features. In some embodiments, the 2D facial feature relationship data 244A can include data identifying a relationship between 2D geometric data 243A of two or more facial features. In some embodiments, the relationships between data corresponding to a first facial feature (e.g., first 2D facial feature data, and/or first 2D geometric data) and data corresponding to a second facial feature (e.g., second 2D facial feature data, and/or second 2D geometric data) can include one or more of distances between 2D points, angles, positions, or ratios of 2D information.

In some embodiments, the 2D facial feature relationship data 244A can include data identifying a line or curve between one or more 2D points of a first facial feature represented in the 2D facial feature data 242A, and one or more 2D points of a second facial feature represented in the 2D facial feature data 242A. For example, the 2D facial feature relationship data 244A can include data identifying a distance between one or more points representing the left eye and one or more points representing the right eye.

In some embodiments, the 2D facial feature relationship data 244A can include data identifying a first line between two or more 2D points of a first facial feature and a second line between two or more 2D points of a second facial feature, and the angle between the first line and the second line. For example, the 2D facial feature relationship data 244A can include data identifying an angle between a horizontal line between 2D points representing the right and left pupils, and a right eye line between 2D points representing the inner corner of the right eye and the outer corner of the right eye.

In some embodiments, the 2D facial feature relationship data 244A can include data identifying a first measurement (e.g., size, length, depth width, area, etc.) corresponding to a first facial feature (represented by one or more 2D points) and a second measurement corresponding to a second facial feature (represented by one or more 2D points), and a ratio between the first measurement and the second measurement. For example, the 2D facial feature relationship data 244A can include data identifying a ratio between an eye size (represented by one or more 2D points representing the eye) and a mouth size (represented by one or more 2D points representing the mouth).

Additional details regarding 2D facial feature data, 2D geometric data, and 2D facial feature relationship data are described below with reference to FIGS. 8A-B.

In some embodiments, the 3D landmark data 245A can include data that represents one or more 3D landmarks corresponding to one or more facial features of the human face (e.g., represented by 2D facial feature data 242A). In some embodiments, 3D landmark data can correspond to associated 2D facial feature data (e.g., represent the same facial feature). In some embodiments, 3D landmark data 245A can identify one or more 3D points (e.g., vertices of the 3D model data 233A) that represent a respective facial feature represented by the 2D facial feature data 242A. For example, the nose of a subject can be represented by a single 3D point (and corresponding 2D point of the 2D facial feature data 242A) at the tip of the nose, or by multiple 3D points (and corresponding 2D points of the 2D facial feature data 242A) along the bridge of the nose, the tip of the nose, and/or outline of the nose.

In some embodiments, the 3D landmark data 245A can include 3D coordinate data that represents the 3D points, such as x-coordinate, y-coordinate, and z-coordinate information identifying the one or more 3D points (e.g., vertices) in three-dimensional space. In some embodiments, the 3D landmark data 245A can include textual identifiers of respective facial features represented by one or more 3D points. For example, a 3D landmark that represents a nose can include or be associated with a textual identifier, "nose." In some embodiments, the 3D landmarks identified by the 3D landmark data that correspond to facial features represented by the 2D facial feature data 242A can be referred to as "target 3D landmarks" or "3D landmarks" herein.

In some embodiments, the 3D landmark data 245A can correspond to a respective 3D model represented by a 3D model data. For example, each 3D model can include a respective instance of 3D landmark data 245A.

In some embodiments, 3D geometric data 246A can describe a 3D landmark represented by the 3D landmark data 245A. In some embodiments, the 3D geometric data 246A can include one or more of vertices (e.g., 3D points), edges, and/or faces. In some embodiments, vertices (e.g., nodes or points) can include 3D points of a 3D model represented by 3D landmark data 245A. A vertex can have 3D coordinates (e.g., x-, y-, and z-coordinates). The vertex can identify a location where one or more edges intersect. In some embodiments, an edge can include a line, such as a straight line and connect at least two vertices. In some embodiments, faces can include surfaces, such as planar surfaces, connecting edges (e.g., closed-loop edges).

In some embodiments, the 3D geometric data 246A can include data identifying a relationship between two or more 3D points of a facial feature represented by the 3D landmark data 245A (e.g., between two or more 3D points corresponding to the same facial feature). In some embodiments, the relationship between two or more 2D points can include one or more of distances, angles, positions, areas, or ratios.

In some embodiments, the 3D geometric data 246A can include data identifying a line or curve between two or more 3D points, and the distance therebetween. For example, the 3D geometric data 246A can include data identifying the length of an eyebrow that corresponds to a line or curve between two or more 3D points representing the eyebrow.

In some embodiments, the 3D geometric data 246A can include data identifying two or more lines between three or more 3D points, and the ratio between the length (e.g., magnitude) of each line. For example, the 3D geometric data can include data identifying a ratio between a 3D eye height (represented as a first line between an eye apex and an eye bottom) and a 3D eye width (represented as a second line between an inner eye corner and an outer eye corner).

In some embodiments, the 3D geometric data 246A can include data identifying a curve between two or more 3D points, and a curvature radius of the curve. For example, the 3D geometric data 246A can include data identifying the curvature of an eyebrow that corresponds to a curve between two or more 3D points representing the eyebrow.

In some embodiments, the 3D geometric data 246A can include data identifying two or more lines between three or more 3D points, and the angle between the two or more lines. For example, the 3D geometric data 246A can include data identifying a first line between a 3D point corresponding to the inner eye corner and a 3D point corresponding to the outer eye corner, and a second (horizontal) line intersecting a 2D point corresponding to the center of the pupil, and an angle between the first line and the second line.

In some embodiments, the 3D geometric data 246A can include data identifying two or more 3D points and a relative position of each of the two or more 3D points with respect to the group of two or more 3D points. For example, the 3D geometric data 246A can include data identifying a first 3D point, a second 3D point, a third 3D point, and respective lengths and slopes of lines between each point (e.g., a length and slope of a line between the first and second 3D point, a length and slope of a line between the first and third 3D point, etc.). For instance, the 3D geometric data 246A can include data identifying relative positional data for respective 3D points representing the inner eyebrow corner, the eyebrow apex, and the outer eyebrow corner, respectively.

In some embodiments, the 3D landmark relationship data 247A can include data identifying a relationship between 3D landmark data 245A corresponding to two or more respective facial features. In some embodiments, the 3D landmark relationship data 247A can include data identifying a relationship between 3D geometric data 246A corresponding to two or more facial features. In some embodiments, the relationships between data corresponding to a first facial feature (e.g., 3D landmark data 245A and/or 3D geometric data 246A) and data corresponding to a second facial feature (e.g., second 3D landmark data and/or 3D geometric data) can include one or more of distances, angles, positions, areas, or ratios of 3D information.

In some embodiments, the 3D landmark relationship data 247A can include data identifying a line or curve between one or more 3D points corresponding to a first facial feature and one or more 3D points corresponding to a second facial feature. For example, the 3D landmark relationship data 247A can include data identifying a distance between one or more points representing the left eye and one or more points representing the right eye (e.g., the distance between the left and right eye).

In some embodiments, the 3D landmark relationship data 247A can include data identifying a first line between two or more 3D points of a first facial feature and a second line between two or more 3D points of a second facial feature, and an angle(s) between the first line and the second line. For example, the 3D landmark relationship data 247A can include data identifying angle(s) between a horizontal plane that intersects the 3D points representing the right and left pupils, and a right eye line between 3D points representing the inner corner of the right eye and the outer corner of the right eye.

In some embodiments, the 3D landmark relationship data 247A can include data identifying a first measurement (e.g., size, length, depth, width, area, etc.) corresponding to a first facial feature (corresponding to one or more 3D points) and a second measurement corresponding to a second facial feature (corresponding to one or more 3D points), and a ratio between the first measurement and the second measurement. For example, the 3D landmark relationship data 247A can include data identifying a ratio between an eye size (represented by one or more 3D points representing the eye) and a mouth size (represented by one or more 3D points representing the mouth).

Additional details regarding the 3D landmark data 245A, 3D geometric data 246A, and 3D landmark relationship data 247A are described below with reference to FIGS. 8A-B.

In some embodiments, variation information 240X can include information identifying one or more variations (e.g., differences) between a target face corresponding to a particular beauty target and a target face corresponding non-beauty target. As described above, a target face corresponding to the first beauty target can be represented by aggregating some or all the image output data of the first beauty target output data 240A (e.g., aggregating the first image output data 241A with Nth image output data, etc.). Thus, in some embodiments, variation information 240X can include information identifying differences between aggregated image output data (e.g., first image output data 241A through Nth image output data, etc.) of the first beauty target output data 240A, and aggregated image output data (e.g., first image output data 241A through Nth image output data, etc.) of the non-beauty target output data 240N.

In some embodiments, variation information 240X can be generated for each pairing between a respective beauty target and a non-beauty target. For example, the variation information 240X can be generated to include information identifying differences between first beauty target output data 240A (e.g., representing a first beauty target face) and non-beauty target output data 240N (e.g., representing a non-beauty target face). In another example, the variation information 240X can be generated to include information identifying differences between m-th beauty target output data 240M (e.g., representing an m-th beauty target face) and non-beauty target output data 240N (e.g., representing a non-beauty target face).

In some embodiments, variation information 240X can include information identifying differences between one or more elements of first beauty target output data 240A (aggregated or non-aggregated) and corresponding elements of non-beauty target output data 240N. For example, variation information 240X can include information identifying a difference between aggregated first beauty 2D facial feature data (e.g., similar to, or including 2D facial feature data 242A of the first beauty target output data 240A) and aggregated non-beauty 2D facial feature data (e.g., similar to, or including 2D facial feature data of the non-beauty target output data 240N (not illustrated)). In another example, variation information 240X can include information identifying a difference between first beauty 3D landmark data (e.g., similar to, or including 3D landmark data 245A of the first beauty target output data 240A), and non-beauty 3D landmark data (e.g., similar to, or including 3D landmark data of the non-beauty target output data 240N (not illustrated)).

In some embodiments, variation information 240X can include data representing a magnitude difference (e.g., such as a difference in x-, y-, z-coordinates of a particular facial feature of a beauty target face and a non-beauty target face respectively). In some embodiments, data identifying a magnitude difference can be a difference between elements of first beauty target output data 240A and corresponding elements of non-beauty target output data 240N. For example, a magnitude difference can be a difference in a width (e.g., magnitude) of a particular facial feature corresponding to a first beauty target output data 240A representing a first beauty target, in comparison to a width of the particular facial feature corresponding to the non-beauty target. For instance, variation information 240X may include data that indicates that a 3D width of the beauty target eye is three millimeters greater than the width of the non-beauty target eye.

In some embodiments, variation information 240X can include data representing a ratio difference (e.g., such as a difference in a size of a particular facial feature of a beauty target face and a non-beauty target face respectively). In some embodiments, data identifying a ratio difference can be a difference (e.g., a difference in size, etc.) between elements of first beauty target output data 240A and corresponding elements of non-beauty target output data 240N (e.g., a beauty target face and a non-beauty target face). For example, a ratio difference can be a difference between a beauty target ratio corresponding to a particular facial feature of the beauty target face and a non-beauty target ratio corresponding the particular facial feature of the non-beauty target face. For example, variation information 240X can include data that indicates an eye-to-nose size ratio of the first beauty target is 1:1.2, and an eye-to-nose size ratio of the non-beauty target is, for example, 1:1.3. The data included in the variation information can indicate that the non-beauty target ratio is 1.083 times greater (e.g., 1.3/1.2) than the beauty target ratio.

In some embodiments, variation information 240X can be generated as a target output 240 by training set generator 131 based the beauty target indication 230X. In some embodiments, the indication of a beauty target indication 230X can indicate to generate variation information 240X between a particular beauty target (e.g., first beauty target output data 240A) and non-beauty target output data 240N. As described above, beauty target indication 230X can include an indication of a beauty target corresponding to a particular beauty target (e.g., beauty target input data 230A-M). At inference, variation information 240X can be generated based on the selection information indicated in beauty target indication 230X.

Figure 3:
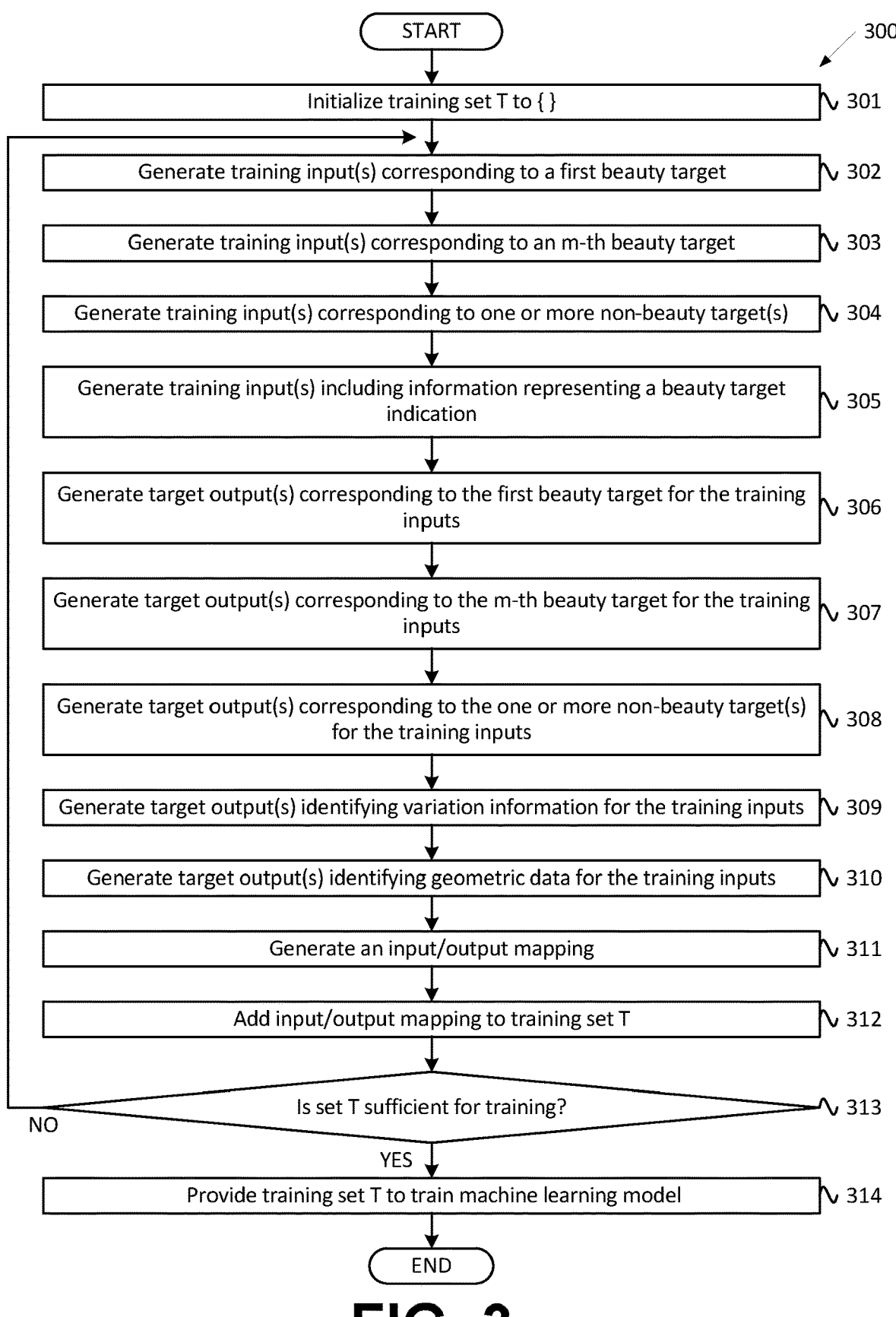
FIG. 3 depicts a flow diagram of an example method for training a machine learning model, in accordance with aspects of the disclosure.

FIG. 3 depicts a flow diagram of one example of a method 300 for training a machine learning model, in accordance with aspects of the disclosure. The method is performed by processing logic that can include hardware (circuitry, dedicated logic, etc.), software (e.g., instructions run on a processing device), or a combination thereof. In one embodiment, some or all the operations of method 300 can be performed by one or more components of system 100A of system 100B of FIGS. 1A-B. In other embodiments, one or more operations of method 300 can be performed by training set generator 131 of server machine 130 as described with reference to FIG. 1A through FIG. 2. It can be noted that components described with respect to FIG. 1A through FIG. 2 can be used to help illustrate aspects of FIG. 3. In some embodiments, the operations (e.g., operations 301-314) can be the same, different, fewer, or greater. For instance, in some embodiments one or more training inputs can be generated or one or more target outputs can be generated, and the one or more training inputs and one or more training outputs can be used as input-output pairs (for input) to train the machine learning model, such as model 160, to be used by the beauty products module 151.

Method 300 generates training data for a machine learning model. In some embodiments, at operation 301, processing logic implementing the method 300 initializes the training set "T" to an empty set (e.g., "{ }").

At operation 302, processing logic generates training input(s) corresponding to a first beauty target (as described with reference to first beauty target input data 230A of FIG. 2). In some embodiments, processing logic can generate a training input including information (e.g., 2D image data 232A) representing 2D images of human faces corresponding to the first beauty target. In some embodiments, processing logic can generate information (e.g., 3D model data 233A) representing 3D models of human faces corresponding to the 2D images of human faces associated with the first beauty target. In some embodiments, processing logic can generate a training input including correspondence data (e.g., correspondence data 234A) that maps points of a 3D model of a human face to respective points of a corresponding 2D image of a human face corresponding to the first beauty target.

At operation 303, processing logic generates training input(s) corresponding to an m-th beauty target (as described with reference to m-th beauty target input data 230M of FIG. 2). In some embodiments, processing logic can generate a training input including information (e.g., 2D image data 232M (not illustrated)) representing 2D images of human faces corresponding to the m-th beauty target. In some embodiments, processing logic can generate information (e.g., 3D model data 233M (not illustrated)) representing 3D models of human faces corresponding to the 2D images of human faces corresponding to the m-th beauty target. In some embodiments, processing logic can generate a training input including correspondence data (e.g., correspondence data 234M (not illustrated)) that maps points of a 3D model of a human face to respective points of a corresponding 2D image of a human face corresponding to the m-th beauty target.

At operation 304, processing logic generates training input(s) corresponding to a non-beauty target (as described with reference to non-beauty target input data 230N of FIG. 2). In some embodiments, processing logic can generate a training input including information (e.g., 2D image data 232N (not illustrated)) representing 2D images of human faces corresponding to the non-beauty target. In some embodiments, processing logic can generate information (e.g., 3D model data 233N (not illustrated)) representing 3D models of human faces corresponding to the 2D images of human faces corresponding to the non-beauty target. In some embodiments, processing logic can generate a training input including correspondence data (e.g., correspondence data 234N (not illustrated)) that maps points of a 3D model of a human face to respective points of a corresponding 2D image of a human face corresponding to the non-beauty target.

At operation 305, processing logic generates training input(s) including information representing a beauty target indication (as described with reference to beauty target indication 230X of FIG. 2).

At operation 306, processing logic generates target output (s) corresponding to the first beauty target for the training inputs (as described with reference to first beauty target output data 240A of FIG. 2). In some embodiments, processing logic can generate a target output including information (e.g., 2D facial feature data 242A) that identifies one or more 2D facial features represented in the 2D images for the first beauty target. In some embodiments, processing logic can generate a target output including information (e.g., 2D geometric data 243A) that identifies 2D geometric data for respective 2D facial features of the first beauty target. In some embodiments, processing logic can generate a target output including information (e.g., 2D facial feature relationship data 244A) that identifies relationships between the 2D facial features for the first beauty target. In some embodiments, processing logic can generate a target output including information (e.g., 3D landmark data 245A) that identifies one or more 3D landmarks that correspond to the facial features for the first beauty target. In some embodiments, processing logic can generate a target output including information (e.g., 3D geometric data 246A) that identifies 3D geometric data for respective 3D landmarks corresponding to facial features of the first beauty target. In some embodiments, processing logic can generate a target output including information (e.g., 3D landmark relationship data 247A) that identifies relationships between the 3D landmarks for the first beauty target.

At operation 307, processing logic generates target output (s) corresponding to the m-th beauty target for the training inputs (as described with reference to m-th beauty target output data 240M of FIG. 2). In some embodiments, processing logic can generate a target output including information (e.g., 2D facial feature data element (not illustrated)) that identifies one or more 2D facial features represented in the 2D images for the m-th beauty target. In some embodiments, processing logic can generate a target output including information (e.g., 2D geometric data element (not illustrate)) that identifies 2D geometric data for respective 2D facial features of the m-th beauty target. In some embodiments, processing logic can generate a target output including information (e.g., 2D facial feature relationship data element (not illustrated)) that identifies relationships between the 2D facial features for the m-th beauty target. In some embodiments, processing logic can generate a target output including information (e.g., 3D landmark data element (not illustrated)) that identifies one or more 3D landmarks that correspond to the 2D facial features for the m-th beauty target. In some embodiments, processing logic can generate a target output including information (e.g., 3D landmark relationship data element (not illustrated)) that identifies relationships between the 3D landmarks for the m-th beauty target.

At operation 308, processing logic generates target output (s) corresponding to the non-beauty target for the training inputs (as described with reference to non-beauty target output data 240N of FIG. 2). In some embodiments, processing logic can generate a target output including information (e.g., 2D facial feature data element (not illustrated)) that identifies one or more 2D facial features represented in the 2D images for the non-beauty target. In some embodiments, processing logic can generate a target output including information (e.g., 2D facial feature relationship data element (not illustrated)) that identifies relationships between the 2D facial features for the non-beauty target. In some embodiments, processing logic can generate a target output including information (e.g., 3D landmark data element (not illustrated)) that identifies one or more 3D landmarks that correspond to the 2D facial features for the non-beauty target. In some embodiments, processing logic can generate a target output including information (e.g., 3D landmark relationship data element (not illustrated)) that identifies relationships between the 3D landmarks for the non-beauty target.

At operation 309, processing logic generates target output (s) that identifies variation information for the training inputs (as described with reference to variation information 240X of FIG. 2). Variation information 240X can identify differences between a beauty target and a non-beauty target. For example, variation information 240X can identify a difference between any element (e.g., 2D facial feature data 242A, 2D geometric data 243A, 2D facial feature relationship data 244A, 3D landmark data 245A, 3D geometric data 246A, 3D landmark relationship data 247A) of first image output data 241A for the first beauty target output data 240A and corresponding element for the non-beauty target output data 240N. In some embodiments, processing logic can generate a target output including first variation information (e.g., variation information 240X) representing differences facial features (e.g., 2D facial feature data 242A) of the first beauty target and facial features of the non-beauty target. In some embodiments, the first variation information can represent differences between the first beauty target and the m-th beauty target, and/or differences between the m-th beauty target and the non-beauty target. In some embodiments, processing logic can generate a target output including second variation information representing differences between the relationships of landmarks (e.g., 3D landmark relationship data 247A) for the first beauty target, and the relationships of landmarks for the non-beauty target. In some embodiments, the second variation information can represent differences between the first beauty target and the m-th beauty target, and/or differences between the m-th beauty target and the non-beauty target.

At operation 310, processing logic optionally generates mapping data that is indicative of an input/output mapping. The input/output mapping (or training set mapping data) can refer to the training input (e.g., one or more of the training inputs described herein), the set of target outputs for the training input (e.g., one or more of the target outputs described herein), and an association between the training input(s) and the target output(s).

At operation 311, processing logic adds the mapping data generated at operation 311 to the training set T.

At operation 312, processing logic branches base on whether training set T is sufficient for training the model 160. If so, execution proceeds to operation 314, otherwise, execution continues back at operation 302. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy satisfying a threshold, etc.) in addition to, or instead of, the number of input/output mappings.

At operation 313, processing logic provides training set T to train the machine learning model (e.g., model 160). In one embodiment, training set T is provided to training engine 141 of server machine 140 to perform the training. In some embodiments, operation 314 can include training the machine learning model using the training set T. In the case of a neural network, for example, input values of a given input/output mapping (e.g., numerical values associated with training inputs 230) are input to the neural network, and output values (e.g., numerical values associated with target outputs 240) of the input/output mapping are stored in the output nodes of the neural network. The connection weights in the neural network are then adjusted in accordance with a learning algorithm (e.g., back propagation, etc.), and the procedure is repeated for the other input/output mappings in training set T. At operation 314, the machine learning model (e.g., model 160) can be trained using training engine 141 of server machine 140. The trained machine learning model (e.g., model 160) can be implemented by the beauty products module 151 (of server machine 150, or beauty products platform 120) to identify information pertaining to facial features represented in 2D images of human faces.

Figure 4:
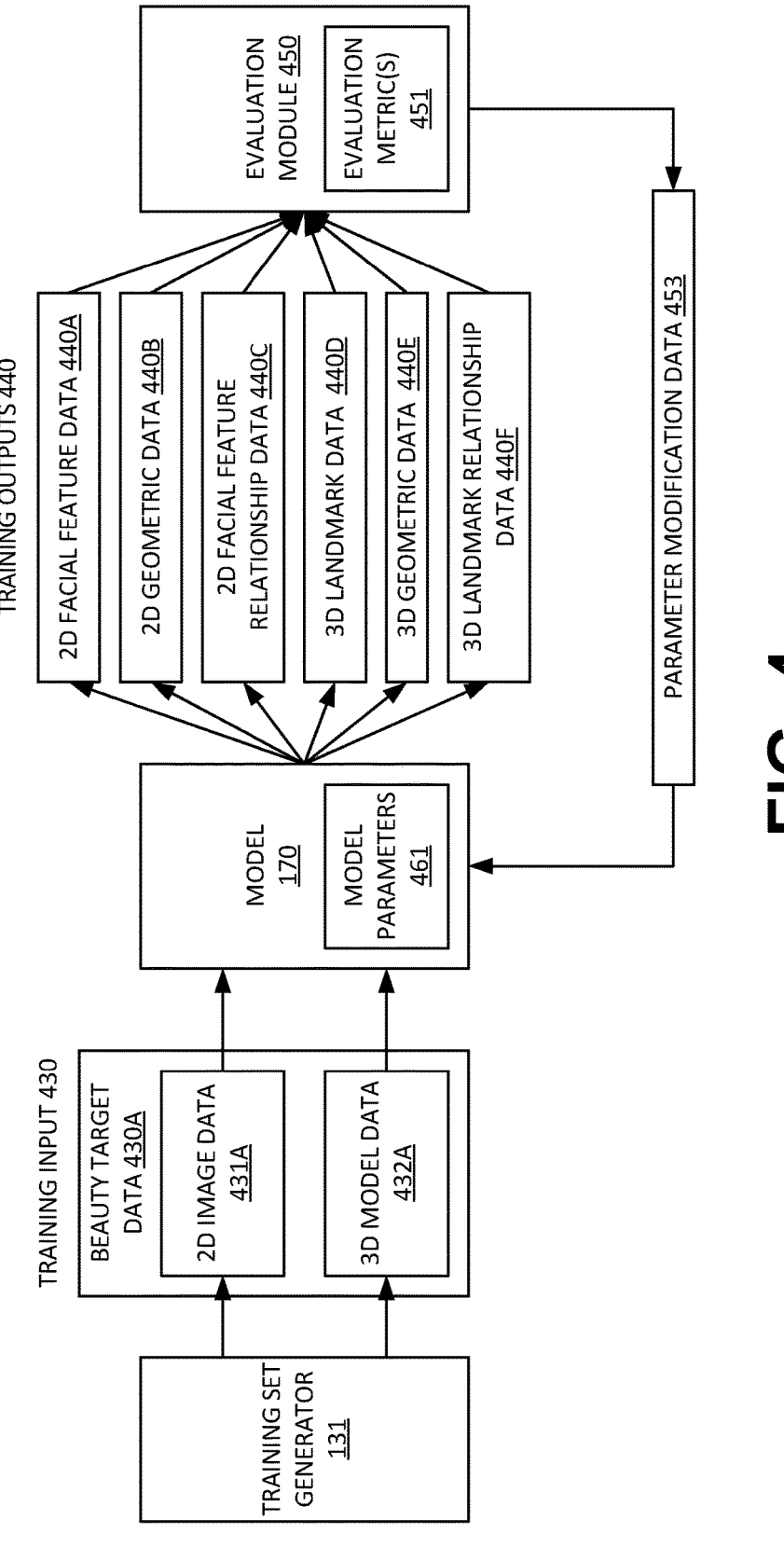
FIG. 4 is an example training set generator to create training data for a machine learning model using information pertaining to various beauty targets, in accordance with aspects of the disclosure.

FIG. 4 is an example system for training a machine learning model using information pertaining to various beauty targets, in accordance with aspects of the disclosure. System 400 illustrates a training set generator 131, training inputs 430, generative machine learning model 170 with model parameters 461, training outputs 440, and evaluation module 450 with evaluation metric 451. System 400 can include similar components as system 100A and system 100B, as described in FIGS. 1A-B, respectively. Components described with reference to system 100A or system 100B of FIGS. 1A-B can be used to describe system 400 of FIG. 4. In some embodiments, the parameter modification data 453 can be generated by evaluation module 450 based on the evaluation metric 451, and can be used as an input to generative machine learning model 170 and/or to alter one or more of the model parameters 461. It can be noted that system 400 can also be used in inference to, for example, generate new facial feature information.

In some embodiments, generative machine learning model 170 is a generative machine learning model. In some embodiments, generative machine learning model 170 is trained using unsupervised (e.g., learn patterns and information from data without explicit labeled output) or semi-supervised machine learning (e.g., where some of the input and/or output data is labeled (e.g., supervised) and some of the input and/or output data is not labeled (e.g., unsupervised)). In some embodiments, the generative machine learning model 170 can be trained to generate new data, such as computer-derived features, such as computer-derived 2D facial feature data, computer-derived 2D geometric data, computer-derived 2D facial feature relationship data, computer-derived 3D landmark data, computer-derived 3D geometric data, and computer-derived 3D landmark data. A computer-derived feature can refer to attributes or information, often about an individual's face, that is extracted, analyzed, recognized by a computer (e.g., processing device implementing digital image processing). In some embodiments, a computer-derived feature may be a feature that is generated by a machine learning model. In some embodiments, the computer-derived features may be generated by a machine learning model without direct human intervention. In some embodiments, the computer derived features can be new data and can include previously unknown features (e.g., 2D facial feature data, 3D landmark data, etc.) or unknown relationships between features (e.g., 2D facial feature relationship data, 3D landmark relationship data, etc.). It can be noted that although generative machine learning model 170 is described as a generative machine learning model, in some embodiments a discriminative machine learning model may be implemented.

In some embodiments, training inputs 430 can be used as input to a machine learning model, such as generative machine learning model 170. In some embodiments, the training input 430 can include beauty target data 430A. In some embodiments, beauty target data 430A can include one or more of 2D image data 431A and 3D model data 432A. 2D image data 431A and 3D model data 432A can be the same as, or similar to 2D image data 232A and 3D model data 233A respectively, as described above with reference to FIG. 2. As described above, in some embodiments, 3D model data 432A can be generated from 2D image data 431A that represents one or more 2D images. In some embodiments, 3D model data 432A can be generated from 2D image data 431A. While not illustrated here, 2D image data 431A and 3D model data 432A can represent multiple 2D images and 3D models, respectively, that can be used as input to the generative machine learning model 170. For example, 2D image data 431A that represents multiple 2D images, and 3D model data 432A that represents multiple 3D models generated using the 2D images can be used as beauty target data 430A.

In some embodiments, the 2D image data 431A and the 3D model data 432A can be associated with labeled data. In some embodiments, the 2D image data 431A and the 3D model data 432A can be labeled by a generative model, such as a VLM described with reference to FIG. 1B, as described herein. In some embodiments, the 2D image data 431A and the 3D model data 432A can be labeled by one or more human evaluators. For example, the 2D image data and 3D model data can be associated with one or more respective labels identifying one or more of 2D facial feature data, 2D geometric data, 2D facial feature relationships data, 3D landmark data, 3D geometric data, and 3D landmark data. In some embodiments, the labeled data can be used as evaluation metrics 451 and compared to training outputs 440.

In some embodiments, the 2D image data 431A and the 3D model data 432A can be preprocessed prior to being input to the generative machine learning model 170. In some embodiments, after the 3D model data 432A is generated from the 2D image data 431A, information from the 3D model data 432A is used to add visual augmentations to the 2D image data 431A (e.g., used to enhance the 2D image data 431A). For example, information in the 3D model data 432A associated with an outline of the eye, such as the curve of an eyelid, can be used to augment the 2D image data 431A or 3D model data 431A. In another example, information in the 3D model data 432A associated with the shape of the face or shape of facial features (e.g., represented by 2D facial feature data 440A) can be used to crop the 2D image (e.g., modify the 2D image data 431A) to the shape of the face, or a particular facial feature. In some embodiments, a generative machine learning model (e.g., VLM) or discriminative machine learning model is used to determine whether the 2D image data 431A or the 3D model data 432A is to be included in model training data. In some embodiments, a human evaluator can manually perform any combination of these and other preprocessing techniques on the 2D image data 431A and the 3D model data 432A before the 2D image data 431A and/or 3D model data 432A are input into the generative machine learning model 170.

In some embodiments, the generative machine learning model 170 can be trained to generate training outputs 440 based on one or more of the training inputs 430. In some embodiments, training outputs 440 include one or more of 2D facial feature data 440A, 2D geometric data 440B, 2D facial feature relationship data 440C, 3D landmark data 440D, 3D geometric data 440E, and 3D landmark relationship data 440F. In some embodiments, the generative machine learning model 170 can be trained to generate some or all of the training outputs 440 for each instance of beauty target data 430A. For instance, the generative machine learning model 170 can be trained to generate the 2D facial feature data 440A for the training input of 2D image data 431A. In some embodiments, multiple sets of 2D image data 431A can be used as input to the generative machine learning model 170, and the generative machine learning model 170 can generate distinct outputs (e.g., training outputs 440) for each distinct input of 2D image data 431A. For example, 2D image data 431A that represents a first 2D image and second 2D image data representing a second 2D image can be used as input for the generative machine learning model 170. The generative machine learning model 170 can generate a first 2D facial feature data (e.g., 2D facial feature data 440A) corresponding to the first 2D image (e.g., represented by 2D image data 431A) and a second 2D facial feature data corresponding to the second 2D image.

In some embodiments, the generative machine learning model 170 can include one or more of the model parameters 461. The values of the model parameters 461 can affect how the beauty target data 430A generates the training outputs 440. In some embodiments, as described above, the model parameters 461 can be adjusted to adjust how the generative machine learning model 170 generates the training outputs 440 from the training input 430.

In some embodiments, the model parameters 461 can be adjusted based on parameter modification data 453 generated by evaluation module 450. In some embodiments, evaluation module 450 can receive the training outputs 440 and determine whether the training outputs 440 satisfy one or more of the evaluation metrics 451.

In some embodiments, the evaluation metrics 451 can include one of one or more ground truths corresponding to respective outputs (e.g., training outputs 440), or training rule data identifying correct answers corresponding to the training outputs, and/or threshold data corresponding to the training outputs 440. In some embodiments, the evaluation module 450 can determine whether a particular training output represents a respective ground truth of the evaluation metrics 451.

In some embodiments, the evaluation metrics 451 can include a beauty threshold that corresponds to one or more of the training outputs 440 (e.g., a 2D facial feature data beauty threshold, a 2D geometric data beauty threshold, etc.). For example, the beauty thresholds can be derived from a beauty target (e.g., a first beauty target as described with reference to FIG. 2). The training outputs 440 can be compared to respective beauty thresholds.

In some embodiments, the evaluation module 450 can perform reinforcement learning by rewarding the generative machine learning model 170 when one or more of the training outputs 440 satisfies one or more of the corresponding evaluation metrics (e.g., evaluation metrics 451), or penalizing the model when one or more of the training outputs 440 does not satisfy one or more of the evaluation metrics 451.

In some embodiments, evaluation metric 451 can include a training rule represented by training rule data. In some embodiments, training rule data can include rules for the training outputs 440. For example, training rule data can require that a first portion of a facial feature and a second portion of a facial feature have a minimum correspondence value. That is, that the first portion of a facial feature (e.g., a computer-defined facial feature) is sufficiently related to a second portion of the facial feature. For instance, if the generative machine learning model 170 identifies a facial feature (e.g., a computer derived facial feature represented by 2D facial feature data 440A) as including the human-defined facial features of the "nose" and "mouth," training rule data from the evaluation metric 451 can determine whether the first portion (e.g., the nose) and the second portion (e.g., the mouth) are sufficiently related (e.g., using metrics of similarity, proximity, shared 2D points and/or 3D landmarks, etc.).

In some embodiments, a portion of the processes of the evaluation module 450 can be performed by a human reviewer. In some embodiments, the evaluation metric 451 can include or reflect a human-derived metric. For example, one or more human evaluators can determine whether a particular training output matches a respective ground truth. For example, a human reviewer can indicate whether one or more of the training outputs 440 satisfies a beauty threshold corresponding to a particular beauty target. In other embodiments, the evaluation metric 451 can include a computer-derived metric.

In some embodiments, a portion of the processes of the evaluation module 450 can be performed by users of a machine learning model 160. That is, users of the machine learning model 160 can provide feedback explicitly as prompted, or implicitly, by making one or more selections for beauty targets (e.g., with beauty target indication 230X), and the feedback received from users of the machine learning model 160 can be used to further train the generative model 170. In some embodiments, the generative machine learning model 170 is a model used to supplement, or provide data to the machine learning model 160 (e.g., training data). That is, users of the machine learning model 160 do not directly interact with, or use the generative machine learning model 170. However, the data collected from users using the machine learning model 160 can be used to improve the generative machine learning model 170. For example, if multiple users of the machine learning model 160 consistently select a certain beauty target (reflected by beauty target indication 230X), the selected beauty target can be used as a reference to further train the generative machine learning model 170 (e.g., the certain beauty target can be used as an input to generate refinement training data for the generative machine learning model 170).

In some embodiments, the evaluation module 450 can generate parameter modification data 453 based on whether one or more evaluation metrics 451 were satisfied by the training outputs 440. In some embodiments, if the training outputs 440 do not satisfy one or more of the evaluation metrics 451, the parameter modification data 453 can reflect that the particular training output does not satisfy the evaluation metric 451. In some embodiments, the parameter modification data 453 can identify information to change one or more of the model parameters 461 of generative machine learning model 170. In some embodiments, the parameter modification data 453 can include new, or modified values for model parameters 461. For example, parameter modification data 453 can include replacement values for the model parameters 461, or relative changes to values of the model parameters 461. For instance, if a particular model parameter has a value of "X," the parameter modification data 453 can indicate "+Y," such that once integrated, the particular model parameter can have a value of "X+Y."

Figure 5:
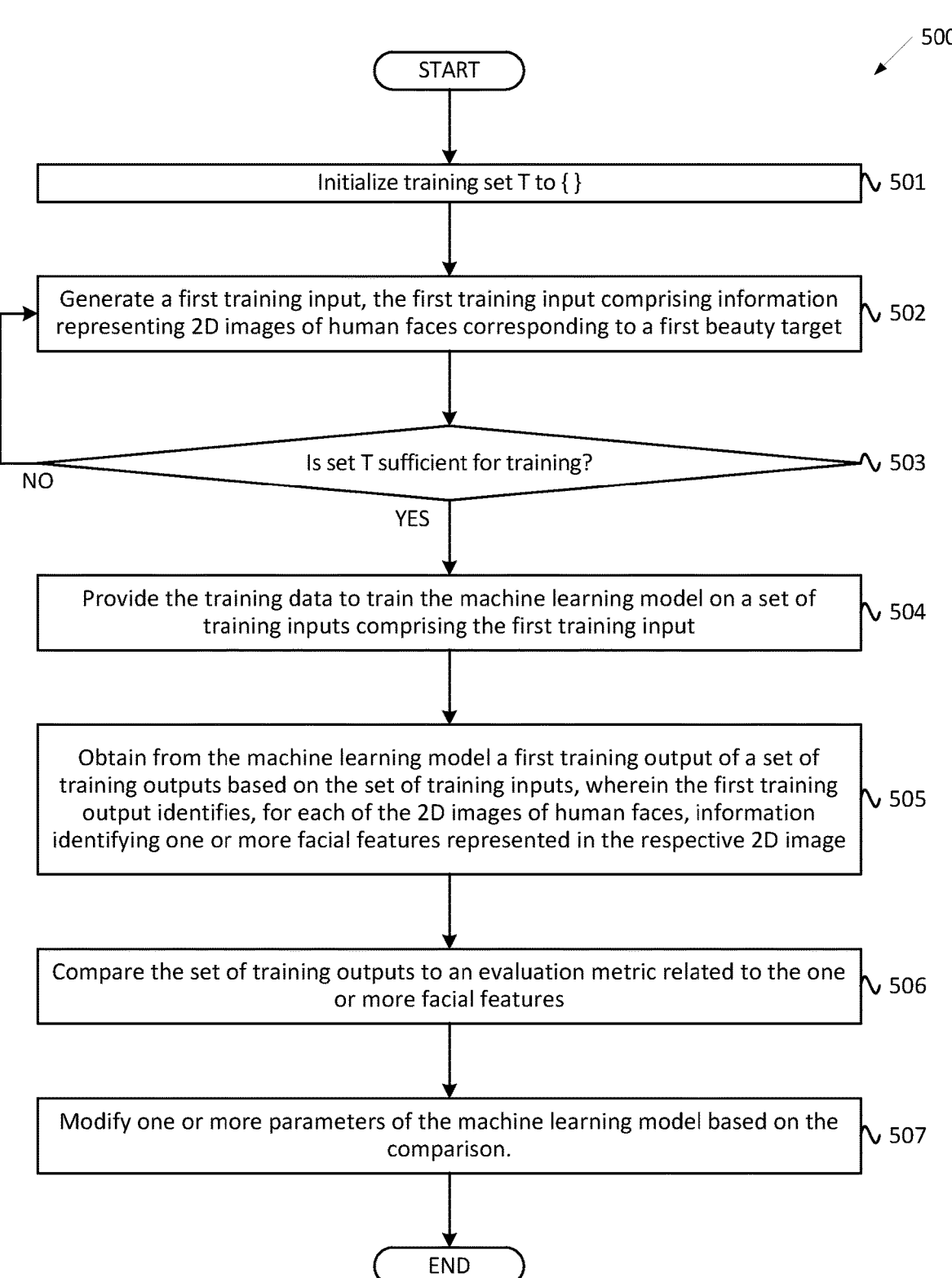
FIG. 5 depicts a flow diagram of an example method for training a machine learning model, in accordance with aspects of the disclosure.

FIG. 5 depicts a flow diagram of one example of a method 500 for training a machine learning model of FIG. 4, in accordance with aspects of the disclosure. The method is performed by processing logic that can include hardware (circuitry, dedicated logic, etc.), software (e.g., instructions run on a processing device), or a combination thereof. In one embodiment, some or all the operations of method 500 can be performed by one or more components of system 100A of system 100B of FIGS. 1A-B, respectively. In other embodiments, one or more operations of method 500 can be performed by training set generator 161 of server machine 140 as described with reference to FIGS. 1-2. It can be noted that components described with respect FIGS. 1-2 can be used to illustrate aspects of FIG. 5. In some embodiments, the operations (e.g., operations 501-507) can be the same, different, fewer, or greater.

Method 500 generates training data for a machine learning model. In some embodiments, the machine learning model can be an unsupervised, or semi-supervised model. In some embodiments, at operation 501, processing logic implementing the method 500 initializes the training set "T" to an empty set (e.g., "{ }").

At operation 502, processing logic generates a first training input. In some embodiments, the first training input includes information (e.g., 2D image data 431A) that represents 2D images of human faces corresponding to a first beauty target. In some embodiments, the first training input include information (e.g., 3D model data 432A) that represents a 3D model (generated based on the 2D image) of the human faces.

At operation 503, processing logic branches base on whether training set T is sufficient for training the machine learning model. If sufficient, processing logic proceeds to operation 504, otherwise, processing logic continues back at operation 502. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy satisfying a threshold, etc.) in addition to, or instead of, the number of input/output mappings.

At operation 504, processing logic provides the training data to train the machine learning model on a set of training inputs (e.g., training inputs 430) comprising the first training input. In some embodiments, training set T can be provided to training engine 141 of server machine 140 to perform the training. In some embodiments, operation 504 can include training the machine learning model using the training set T.

After operation 504, the machine learning model (e.g., generative machine learning model 170) can be trained using training engine 141 of server machine 140. In some embodiments, the trained machine learning model (e.g., generative machine learning model 170) can be implemented by the beauty products module 151 (of server machine 150, or beauty products platform 120) to identify facial feature information such as facial features represented in 2D images of human faces or 3D landmarks corresponding to the facial features.

At operation 505, processing logic obtains from the machine learning model, a first training output of a set of training outputs (e.g., training outputs 440) based on the set of training inputs (e.g., training inputs 430). In some embodiments, the first training output identifies, for each of the 2D images of human faces, information (e.g., 2D facial feature data 440A) that identifies one or more facial features represented in the respective 2D image. In some embodiments, a second training output identifies, for each of the 2D images of human faces, information (e.g., 2D geometric data 440B) that identifies 2D geometric data represented in the respective 2D image. In some embodiments, a third training output identifies, for each of the 2D images of human faces, information (e.g., 2D facial feature relationship data 440C)

that identifies relationships between facial features represented in the respective 2D image. In some embodiments, a fourth training output identifies, for each of the 2D images of human faces, information (e.g., 3D landmark data 440D) that identifies one or more 3D landmarks of a 3D model represented by 3D model data 432A. In some embodiments, the fourth training output identifies, for each of the 2D images of human faces, information that identifies one or more 3D landmarks corresponding to one or more facial features represented in the respective 2D image. In some embodiments, a fifth training output identifies, for each of the 2D images of human faces, information (e.g., 3D geometric data 440E) that identifies 3D geometric data represented in the respective 3D model. In some embodiments, a sixth training output identifies, for each of the 2D images of human faces, information (e.g., 3D landmark relationship data 440F) that identifies relationships between 3D landmarks represented in the respective 3D model.

At operation 506, processing logic compares the set of training outputs (e.g., training outputs 440) to an evaluation metric (e.g., evaluation metric 451).

At operation 507, processing logic modifies one or more parameters (e.g., model parameters 461) of the machine learning model based on the comparison performed at operation 506.

Figure 6:
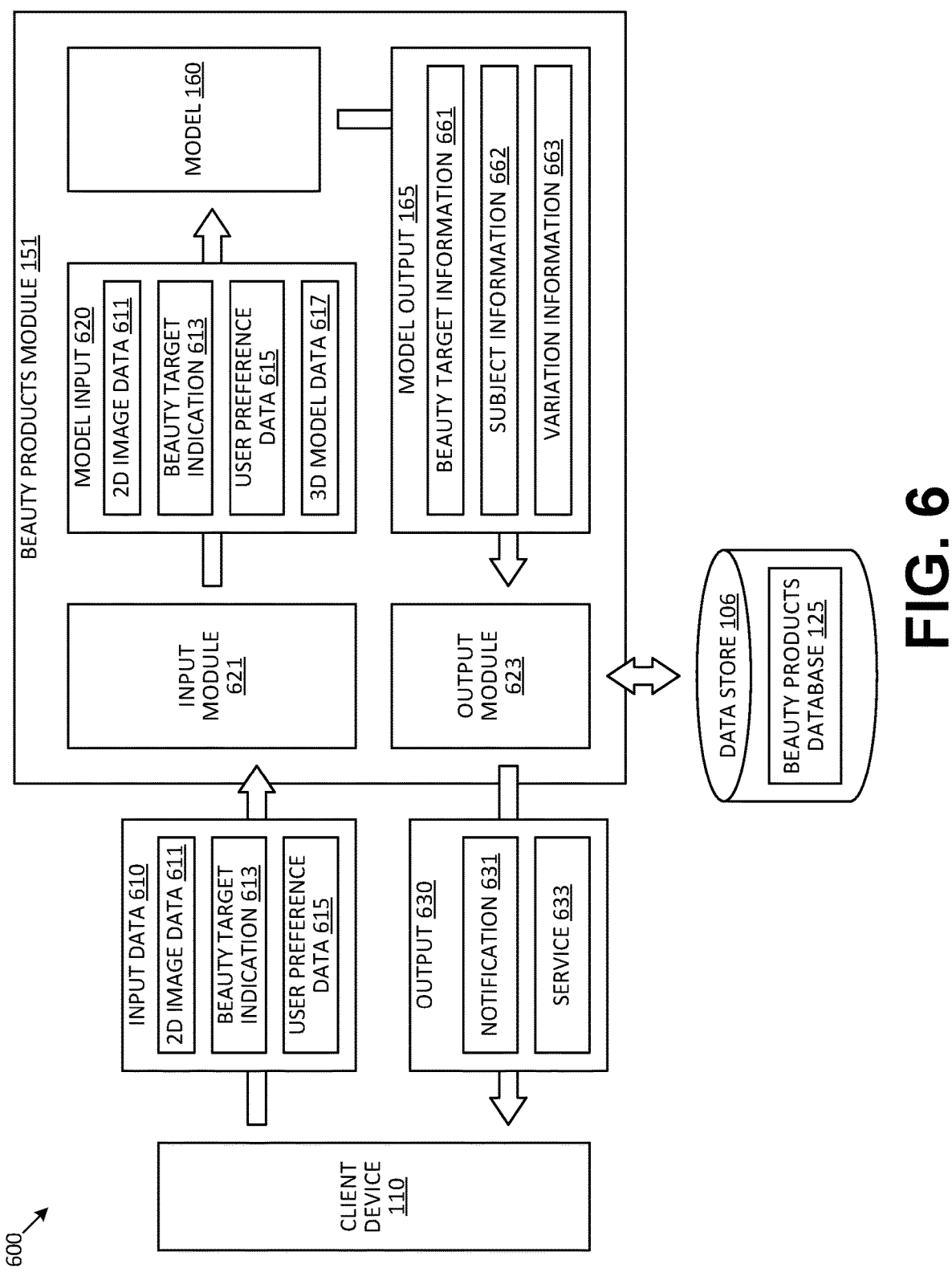
FIG. 6 is an example system flow for using a machine learning model trained to identify facial features from a 2D image, in accordance with aspects of the disclosure.

FIG. 6 is an example method for using a trained machine learning model with data of a human face, in accordance with aspects of the disclosure. In some embodiments, some, or all of the operations of method 600 can be performed by one or more components of system 100A or 100B of FIGS. 1A-B, such as beauty products module 151. It can be noted that components described with reference to FIGS. 1A-B can be used to illustrated aspects of FIG. 6. Although method 600 is illustrated with a particular order, it can be appreciated that some of the operations can be performed serially or in parallel. In some embodiments, the operations can be the same, difference, fewer, or greater. Method 600 illustrates using trained machine learning models to identify model output 165 based on input data 610. A method for using the trained machine learning model to identify facial features from image data is described below with reference to FIGS. 7A-B.

In some embodiments, the input module 621 of the beauty products module 151 can receive some or all of input data 610 from client device 110 or from other sources, such as data store 106. In some embodiments, the client device 110 can generate or obtain the input data 610. For example, the client device 110 can cause an imaging device coupled to the client device, such as a camera, to capture a 2D image represented by 2D image data 611. In another example, the client device 110 can retrieve the 2D image data 611 from a memory location, such as from data store 106. In some embodiments, some, or all of the operations of method 600 can be fully or partially performed on an application of a client device 110, such as application 119.

In some embodiments, input data 610 can include one or more of 2D image data 611, beauty target indication 613, and user preference data 615.

In some embodiments, 2D image data 611 can be the same as, or similar to 2D image data 232A of FIG. 2. In some embodiments, 2D image data 611 can represent a 2D image or one or more 2D video images of a video stream. In some embodiments, the 2D image data 611 can be obtained from a peripheral capture device, such as a camera that is coupled to the client device 110. In some embodiments, the 2D image data 611 can be obtained from a local memory of the client device 110. In some embodiments, the 2D image data 611 can be stored in data store 106, or beauty products module 151, and the client device 110 can cause the 2D image data 611 to be used as input data 610.

In some embodiments, the beauty target indication 613 can be the same as, or similar to beauty target indication 230X of FIG. 2. In some embodiments, the beauty target indication 613 can indicate which beauty target of multiple beauty targets should be used by the model 160 (or output module 623) to generate variation information 663. In some embodiments, the user can select the beauty target, among multiple beauty targets, and the beauty target indication can identify the selected beauty target.

In some embodiments, the user preference data 615 can identify user preferences of a subject. For example, the user preference data 615 can identify one or more of a color preference, a style preference, length preference, or any other preference. In some embodiments, the user preference data indicates user preference information that may not be identified from 2D image data. In some embodiments, the user preference data 615 can be obtained from a user of the client device 110. For example, the user preference data 615 can be received by presenting the user with a predetermined, selectable list (e.g., in a user interface of application 119). In another example, the user preference data 615 can be received as a free-response from the user of the client device 110 (e.g., a text or other input into a free-response field). In another example, the user preference data 615 can be received as a multi-modal input from the user of the client device 110. That is, a multimodal input field can be a field capable of accepting a text input, an image input, an audio input, a video input, etc., from a user of the client device 110.

In some embodiments, input module 621 can prepare model inputs 620 and provide model inputs 620 to the model 160 of the beauty products module 151. In some embodiments, the input module 621 can perform one or more pre-processing operations on the input data 610 to generate the model input 620. For example, and in some embodiments, the input module 621 can generate the 3D model data 617 from 2D image data 611. In some embodiments, the input module 621 can use an algorithm or model, such as a principal component analysis (PCA) model, to generate the 3D model data 617. In some embodiments, the 3D model data 617 can be obtained by processing the 2D image data 611 using a 2D to 3D conversion system, as described below with reference to FIG. 9.

In some embodiments, the input module 621 can accept the 3D model data 617 as an input from the client device 110 (e.g., input data 610 can include 3D model data 617). In some embodiments, the 3D model data 617 can be the same as, or similar to 3D model data 233A of FIG. 2.

In some embodiments, the model 160 can use the model input 620 to generate the model output 165. In some embodiments, the model 160 can be trained to generate the model output 165 based on model input 620. For example, the model 160 can be trained with training data described with reference to FIG. 2. In some embodiments, the model output 165 can include one or more of beauty target information 661, subject information 662, or variation information 663.

In some embodiments, beauty target information 661 can include 2D facial feature information and or 3D facial feature information representing the selected beauty target. For example, the beauty target information can be the same as, or similar to the first beauty target output data 240A as described with reference to FIG. 2. In some embodiments, the beauty target information 661 can refer to a set of predetermined values and ratios for a particular beauty target. For example, the beauty target information 661 for a particular beauty target can include a distance between a 2D point representing a center of the pupil, and one or more 2D points representing an eyebrow on a target face corresponding to the particular beauty target. In another example, a beauty target information 661 for the particular beauty target can include a ratio between an eyebrow length (represented as a distance between two or more 2D points representing an eyebrow) and an eye length (represented as a distance between a first 2D point representing an inner corner of the eye, and a second 2D point representing an outer corner of the eye) on the target face.

In some embodiments, subject information 662 can 2D facial feature information and/or 3D facial feature information representing the subject (e.g., the subject's face). For example, and in some embodiments, beauty target information 661 and subject information 662 can include the same types of data. For instance, beauty target information 661 and subject information 662 can each include one or more of respective 2D facial feature data, 2D geometric data, 2D facial feature relationship data, 3D landmark data, 3D geometric data, and/or 3D landmark relationship data, such as is described above with reference to FIG. 2. Subject information 662 can include one or more of the elements of first beauty target output data 240A such that the elements are for images representing the subject's face.

In some embodiments, variation information 663 can represent a difference between the beauty target information 661 and the subject information 662. For example, the variation information 663 can be the same as, or similar to variation information 240X in FIG. 2. For example, variation information 663 for 2D facial feature data can indicate a difference between the 2D facial feature data for the beauty target (e.g., represented in beauty target information 661) and 2D facial feature data for the subject (e.g., represented in subject information 662). For example, the variation information 663 can indicate a difference between a size of an eye represented by 3D points corresponding to a 3D model for a beauty target, and a size of an eye represented by 3D points corresponding to a 3D model for a subject. In another example, the variation information 663 can indicate a difference between a ratio of the size of an eye and the size of a nose (e.g., eye-to-nose size ratio) corresponding to a beauty target and an eye-to-nose size ratio of a subject. For instance, if an eye-to-nose size ratio for the subject is 1:1.5, and an eye-to-nose size ratio for the beauty target is 1:1.6, the variation information 663 can indicate a subject-to-beauty target ratio for the eye-to-nose size ratio of 1.5:1.6, or that the eye-to-nose size ratio for the subject is 93.75% of the eye-to-nose size ratio for the beauty target.

In some embodiments, the variation information 663 can be calculated using the beauty target information 661 and the subject information 662. For example, the variation information 663 can be calculated as the difference in one or more values corresponding to the beauty target information 661 and one or more values corresponding to the subject information 662.

In some embodiments, the variation information 663 can be generated based on the beauty target indication 613. For example, the beauty target indication 613 can indicate which beauty target of multiple beauty targets (e.g., which beauty target information 661) should be compared to the subject information 662 to generate variation information 663.

In some embodiments (as illustrated), the variation information 663 can be generated by the model 160. In some embodiments, the variation information 663 can be generated by output module 623 based on model output 165. For example, output module 623 can calculate the variation information 663 based on the beauty target information 661 and subject information 662.

In some embodiments, the output module 623 can process the model output 165 and provide an output 630 to the client device 110. In some embodiments, the output module 623 can generate an output 630 that includes a notification 631 and/or a service 633.

In some embodiments, the notification 631 can identify the model output 165. For example, the notification 631 can identify beauty target information 661 or subject information 662 such as respective 2D facial feature data, 2D geometric data, 2D facial feature relationship data, 3D landmark data, 3D geometric data, and/or 3D landmark relationship data. In another example, the notification 631 can include variation information represented as respective differences between the beauty target information and subjection information for 2D facial feature data, 2D geometric data, 2D facial feature relationship data, 3D landmark data, 3D geometric data, and/or 3D landmark relationship data, respectively.

In some embodiments, the output 630 can include an image (e.g., notification 631) representing one or more differences between beauty target information 661 and subject information 662, and/or a set of interactive steps (e.g., service 633) detailing how to alter the appearance of the subject's face to approximate the target face.

In some embodiments, a notification 631 generated by output module 623 can include an indication of model output 165, or information based on model output 165. For example, the notification 631 can include text, images, audio, or video. In some embodiments, the notification 631 can be presented in various mediums, such as in a file, as a pop-up, a message (e.g., an email message, a text message, or a message within an application), or as an alert. For example, a user of the client device 110 can be presented with a message in application 119 that indicates the variation information 663, and/or static instructions for how to minimize the variation information 663. In another example, the user of the client device can be presented with an email message including a textual description and image of a specific beauty product that output module 623 has selected for the subject based on the model output 165.

In some embodiments, notification 631 can identify one or more beauty products that are suitable for the subject's face. In some embodiments, the one or more beauty products can be identified based on one or more of model outputs 165. For example, one or more beauty products that can help a subject approximate the beauty target can be identified based on the variation information 663.

In some embodiments, a service 633 generated by output module 623 (and/or beauty products platform 120) can include one or more interactive processes based on the model output 165. For example, the service 633 can include interactive text, images, audio, or video. In some embodiments, the service can be presented in various interactive mediums, such as through a computer application, a mobile application, a web-based application, a virtual reality (VR) application, and/or an augmented reality (AR) application. For example, a service 633 can present a user of the client device with an interactive application that provides interactive instructions for how to minimize the variation information 663. For instance, the user of the client device 110 may receive an instruction as service 633, and feedback on how the instruction is performed (e.g., as part of service 633). When the instruction has been completed (e.g., as determined by the beauty products module 151, or by a user indication of the completion), a subsequent instruction of the service 633 can be presented to the user of the client device 110.

In some embodiments, the output module 623 can generate an output 630 for the client device 110 in real-time, based on input data 610 that is received in real-time at the beauty products module 151. For example, input data 610 can be captured in real-time (e.g., live-stream video stream), and continuously provided to the model 160 as model input 620. Model 160 can continuously generate model output 165, which can be processed by output module 623 to generated real-time output (e.g., output 630). For instance, the beauty products module 151 (e.g., through the output module) can generate real-time feedback (e.g., output 630) based on real-time changes made to the appearance of a subject's face (e.g., captured as input data 610). For instance, responsive to input data 610 capturing an action performed on the subject's face (e.g., an application of a beauty product), if the action caused the subject's face to converge towards the target face, the output 630 can indicate a "yes." In another instance, if the action caused the subject's face to diverge away from the target face, the output 630 can indicate a "no." In some embodiments, the output 630 can include a dynamic overlay image of the target face over the image of the subject's face that is continuously updated as the beauty product is applied to the subject's face.

In some embodiments, the output module 623 can generate output 630 for a client device 110 based at least in part on information stored in data store 106, such information in beauty products database 125. In some embodiments, the output module 623 can generate output 630 for a client device 110 that includes information indicating one or more beauty products (e.g., selected from the beauty products database 125), based on the model output 165. For example, the output 630 can include text describing the beauty product, such as text describing the beauty product name, manufacturer, brand, color, texture, application location, stock keeping unit (SKU) number etc.

In some embodiments, the output 630 can include visual representation of the beauty product. For example, the output 630 can include a 2D image of the beauty product, or the beauty product packaging. In another example, the output 630 can include a 3D model of the beauty product, or the beauty product packaging.

In some embodiments, a user of the client device 110 can interact with the information indicating the one or more beauty products. For example, a user can manipulate a 3D model of the beauty product (e.g., rotate or move the 3D model in 3D space, or a simulated 3D space). In another example, the user may be presented with a visual representation of a selection of beauty products or alternatives to a beauty product, and the user can be enabled to scroll through the visual representations of beauty products. In another instance, the user may be presented with an engagement link, such as a hyperlink to a webpage to purchase the beauty product.

As described above, in some embodiments, the output 630 can include information indicating one or more beauty product application techniques, based on the model output 165. In some embodiments, the output 630 can include descriptions of the beauty product application techniques as text descriptors, audio, one or more images, one or more videos, animations, or 3D interactive models, and/or any combination of such mediums. For instance, the output 630 can include a textual list of a set of ordered operations, along with one or more pictures that illustrate how to perform each described operation (or the result of performing each operation).

In some embodiments, the output module 623 can generate output 630 for a client device 110 that did not provide the input data 610. For example, a first device (e.g., a client device 110) can provide the input data 610 to the input module 621, and a second device (e.g., a client device 110) can receive the output 630.

FIG. 7A depicts a flow diagram of one example of a method 700 for using a trained machine learning model with data of a human face, in accordance with aspects of the disclosure. The method 700 is performed by processing logic that can include hardware (circuitry, dedicated logic, etc.), software (e.g., instructions run on a processing device), or a combination thereof. In one embodiment, some or all the operations of method 700 can be performed by one or more components of system 100A or 100B of FIGS. 1A-B, such as beauty products module 151. It can be noted that components described with reference to FIGS. 1A-B can be used to illustrate aspects of FIG. 7A. In some embodiments, the operations (e.g., operations 701-707) can be the same, different, fewer, or greater. In some embodiments, method 700 can use a trained machine learning model to identify facial features of a human face based on image data.

At operation 701, processing logic implementing the method 700 provides to the trained machine learning model an input including 2D image data representing a 2D image of a face of a subject.

At operation 702, processing logic provides to the trained machine learning model an input including information identifying a beauty target selection (e.g., a beauty target indication, such as beauty target indication 230X of FIG. 2) from among multiple beauty targets. After operation 702, processing logic can optionally perform one or more of the operations depicted in FIG. 7B, as described below. Additional details regarding the operations of 7B are described with reference to FIG. 7B, below.

At operation 703, processing logic obtains, from the trained machine learning model, one or more outputs identifying beauty target information (e.g., beauty target information 661), as described herein. In some embodiments, the one or more outputs of the trained machine learning model identify one or more of (i) an indication of one or more facial features represented in the 2D image (e.g., subject information 662), (ii) a level of confidence that the one or more facial features correspond to one or more actual facial features of the subject represented in the 2D image, (iii) an indication of a first variation information (e.g., variation information 663) identifying differences between the one or more facial features represented in the 2D image and one or more target facial features of a target face corresponding to a beauty target, and (iv) a level of confidence that the first variation information accurately reflects the differences between the one or more facial features represented in the 2D images and the one or more target facial features of the target face corresponding to the beauty target. It can be appreciated that in some embodiments any 2D facial feature information as described here can be obtained from the trained machine learning model (e.g., indication and corresponding level of confidence).

In some embodiments, the (i) indication of one or more facial features represented in the 2D image can be the same as, or similar to 2D facial feature data 242A of FIG. 2, 2D facial feature data 440A of FIG. 4, and/or facial features identified by subject information 662 of FIG. 6. In some embodiments, the (iii) indication of the first variation information identifying differences between one or more facial features represented in the 2D image and one or more target facial features of a target face corresponding to a beauty target can be the same as, or similar to information identified by variation information 240X of FIG. 2, and/or information identified by variation information 663 of FIG. 6.

At operation 704, processing logic determines whether the level of confidence that the first variation information accurately reflects the differences between the one or more facial features represented in the 2D images and the one or more target facial features of the target face corresponding to the beauty target satisfies a threshold level of confidence. If the level of confidence for the first variation information satisfies the threshold level of confidence, processing logic can proceed to operation 705. If the level of confidence for the first variation information does not satisfy the threshold level of confidence, processing logic can end the method 700 or repeat the method 700. For instance, processing logic can send a request to the client device requesting a new 2D image of the subject (e.g., requesting additional lighting, a different angle, etc.).

At operation 705, responsive to determining the level of confidence for the first variation information satisfies the threshold level of confidence, processing logic provides to a client device an indication of the first variation information.

At operation 706, processing logic provides, to the client device, a notification identifying a first beauty product and/or service. In embodiments where processing logic has performed one or more operations described in FIG. 7B (e.g., sub-method 750), the notification identifying the first beauty product can be based on the first variation information, and/or the second variation information. In some embodiments, the notification can be part of a service offered by beauty products platform 120.

At operation 707, processing logic provides, to the client device, a notification identifying instructions on using the beauty product to for example, reduce differences between the facial feature(s) represented in the 2D image and the target facial feature(s) of the target face corresponding to the beauty target. In embodiments where processing logic has performed one or more operations described in FIG. 7B (e.g., sub-method 750), the notification identifying instructions on using the beauty product can be based on the first variation information, and/or the second variation information.

FIG. 7B depicts a flow diagram of one example of a sub-method 750 that can be performed as a portion of the method 700 for using a trained machine learning model with data of a human face, in accordance with aspects of the disclosure. The sub-method 750 is performed by processing logic that can include hardware (circuitry, dedicated logic, etc.), software (e.g., instructions run on a processing device), or a combination thereof. In some embodiments, some or all the operations of sub-method 750 can be performed by one or more components of system 100A or system 100B of FIGS. 1A-B, such as beauty products module 151. It can be noted that components described with reference to FIGS. 1A-B can be used to illustrate aspects of FIG. 7B. In some embodiments, the operations (e.g., operations 751-754) can be the same, different, fewer, or greater. In some embodiments, sub-method 750 can be used as a part of method 700 which uses the trained machine learning model (e.g., model 160) with data of a human face.

At operation 751, processing logic implementing the sub-method 750 provides to the trained machine learning model an input including information identifying a 3D model of the face of the subject. For example, information identifying the 3D model can include 3D model data, as described herein. In some embodiments, the 3D model data can be generated based on the 2D image data.

At operation 752, processing logic obtains, from the trained machine learning model, one or more outputs identifying one or more of (v) an indication of one or more landmarks of the 3D model (e.g., subject information 662), (vi) a level of confidence that the one or more landmarks of the 3D model correspond to one or more facial features represented in the 2D images, (vii) an indication of second variation information identifying differences between the one or more landmarks of the 3D model and one or more target landmarks of a target 3D model corresponding to the beauty target (e.g., variation information 663), and (viii) a level of confidence that the second variation information accurately reflects the differences between the one or more landmarks of the 3D model and the one or more target landmarks of the target 3D model corresponding to the beauty target. It can be appreciated that in some embodiments any 3D facial feature information as described here can be obtained from the trained machine learning model (e.g., indication and corresponding level of confidence).

In some embodiments, the (v) indication of one or more landmarks of the 3D model can be the same as, or similar to 3D landmark data 245A of FIG. 2, 3D landmark data 440D of FIG. 4, and/or landmarks represented in subject information 662 of FIG. 6. In some embodiments, the (vii) indication of second variation information identifying differences between the one or more landmarks of the 3D model and one or more target landmarks of a target 3D model corresponding to the beauty target can be the same as, or similar to information identified by variation information 240X of FIG. 2, and/or information identified by variation information 663 of FIG. 6.

At operation 753, processing logic determines whether the level of confidence that the second variation information accurately reflects the differences between the one or more landmarks of the 3D model and the one or more target landmarks of the target 3D model corresponding to the beauty target satisfies a threshold level of confidence. If the level of confidence for the second variation information satisfies the threshold level of confidence, processing logic can proceed to operation 754. If the level of confidence for the second variation does not satisfy the threshold level of confidence, processing logic can end the sub-method 750 or repeat the sub-method. For example, beauty products platform 120 can send a request to the client device requesting a different 2D image of the subject, where the 2D image (e.g., 2D image data) is used to generate a new 3D model of the subject's face.

At operation 754, responsive to determining the level of confidence for the second variation information satisfies the threshold level of confidence, processing logic provides to a client device, an indication of the second variation information, and sub-method 750 ends.

Figure 8A:
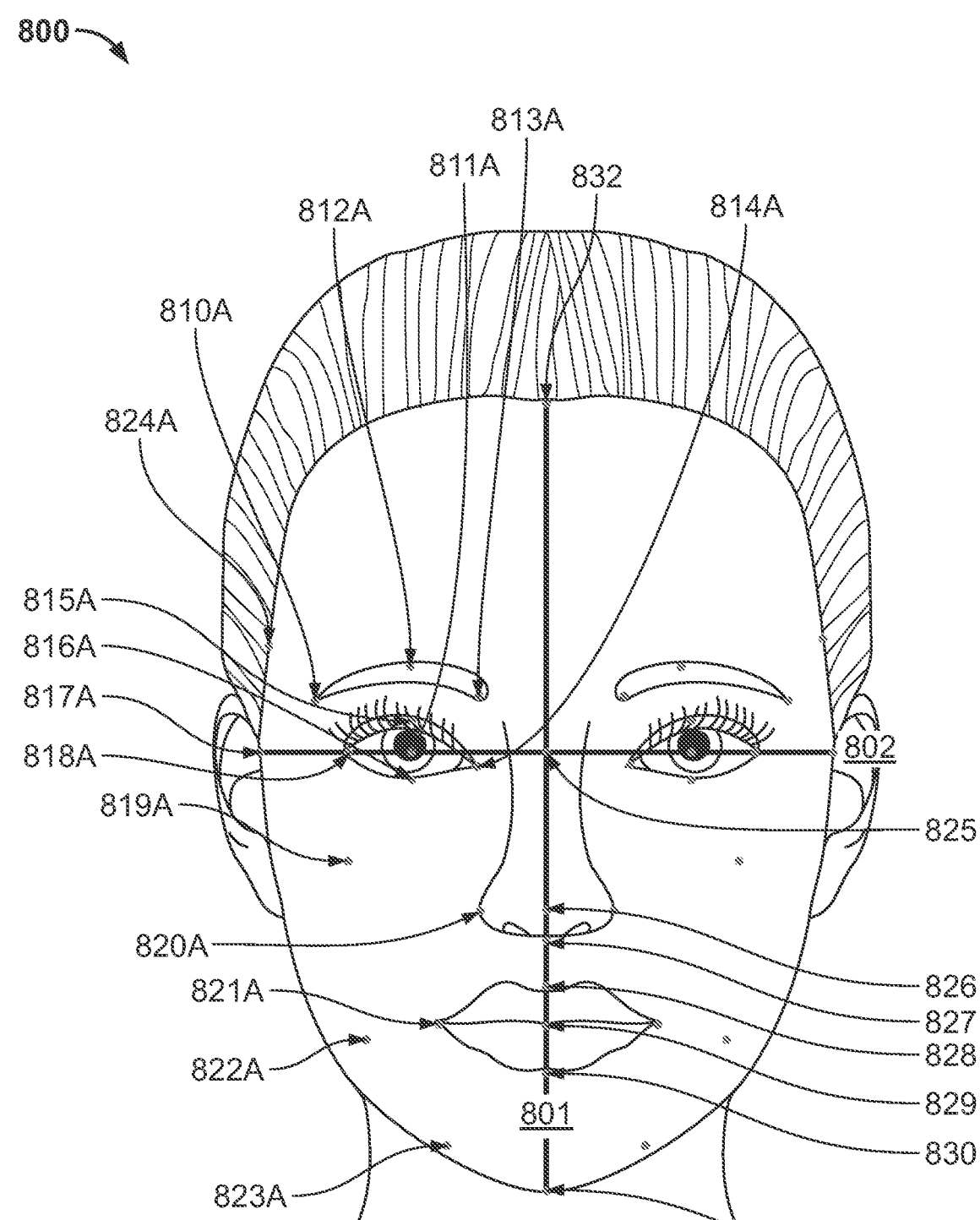
FIG. 8A illustrates an example human face that can be represented by image data, in accordance with aspects of the disclosure.

FIG. 8A illustrates a depiction of a human face 800, in accordance with aspects of the disclosure. Human face 800 is illustrated as a 2D representation of a 3D model for purposes of illustration, rather than limitation. Points on the human face 800 are described here as 3D points of a 3D model, for purposes of illustration rather than limitation. It should be noted that the description of FIG. 8A can apply equally to a 2D image and/or 2D points, unless otherwise described.

In some embodiments, multiple reference points (e.g., 3D points 810-832) can correspond to or represent facial features of the human face 800. In some embodiments, a number of 3D points 810-832 that correspond to each 3D landmark can be the same. For example, the number of 3D points corresponding to the nose can be the same as the number of 3D points corresponding to the mouth. In some embodiments, the number of 3D points 810-832 that correspond to each 3D landmark can be different. In some embodiments, the number of 3D points 810-832 that correspond to each 3D landmark can be based on an importance of the 3D landmark. For example, a machine learning model can determine that the nose has a higher importance than the mouth, and more 3D points can be generated and/or used to correspond to the nose than to the mouth. In some embodiments, the number of 3D points that correspond to each 3D landmark can be determined by the training set generator 131, model 160, generative machine learning model 170 of FIGS. 1-2, and/or received as input to the model 160 or training set generator 131.

As illustrated in FIG. 8A, 3D points 810A-824A correspond to one half of the face. 3D points 810B-824B (not illustrated) correspond to the other half of the face, but for clarity, are not labeled in FIG. 8A. It can be appreciated that each of the illustrated 3D points 810A-824A corresponds to a respective 3D point 810B-824B opposite the centerline (e.g., symmetric about the centerline). 3D points 825-831 line on, or near the centerline 801. As used herein, 3D points 810-832 can collectively refer to 3D points 810A-824A, 3D points 810B-824B (also, referred to herein as 3D points 810A/B-824A/B), and 3D points 825-831. As used herein, 3D points 810-832 can be referred to individually such as "3D point 810A," or "3D point 810B," or "3D point 810A/B," or "3D point 810," or "3D point 825" respectively as applicable.

It can be appreciated that the 3D points 810-832 do not represent an exhaustive list of 3D reference points for a human face, but are merely illustrative of the types of 3D reference points that can be used by a machine learning model in the process of identifying 3D landmarks that correspond to facial features based on human face data (e.g., 2D image data). In some embodiments, one or more 3D points 810-832 can correspond to one or more 3D landmarks of 3D landmark data. In some embodiments, corresponding 2D points (which may be located at similar x-, y-coordinate positions as respective 3D points 810-832, as described above with reference to correspondence data 234A of FIG. 2) can correspond to one or more facial features of 2D facial feature data.

3D Landmark Data

In some embodiments, the following illustratively named 3D points and groups of 3D points 810-832 (as described herein below) can represent 3D landmark data of the human face 800, such as 3D landmark data 245A of FIG. 2. In some embodiments, corresponding 2D points (which may be located at similar x-, y-coordinate positions as respective 3D points 810-832) can represent 2D facial feature data of the human face 800. For example, 3D point 825 can be representative of a "center point of the face," and can correspond to a 3D landmark. In another example, centerline 801 approximately intersects a majority of the 3D points 825-832 and can represent the "centerline of the face," and can represent a 3D landmark of 3D landmark data. In another example, the horizontal line 802 approximately intersects a majority of 3D points 811A/B, 818A/B, 817A/B, and 825, and can be a 3D landmark of 3D landmark data.

In some embodiments, 3D point 810 can be representative of an "outer brow corner."

In some embodiments, 3D point 811 can be representative of a "center of the pupil" or "eye center." As used herein, "pupil" can refer to the adjustable opening in the center of the eye that regulates the amount of light entering the eye. Generally, the pupil can be dark in color (e.g., black), and is surrounded by the iris. As used herein, "iris" can refer to a colored muscular structure that can contract or dilate to control the size of the pupil (e.g., to control the amount of light entering the eye). The iris is surrounded by the sclera. As used herein, "sclera" can refer to a light-colored (e.g., white, or nearly white) outer layer that protects maintains the structural integrity of the eyeball.

In some embodiments, 3D point 812 can be representative of a "brow apex."

In some embodiments, 3D point 813 can be representative of an "inner brow corner."

In some embodiments, 3D point 814 can be representative of an "inner eye corner."

In some embodiments, 3D point 815 can be representative of an "eye apex."

In some embodiments, 3D point 816 can be representative of an "eye bottom (nadir)."

In some embodiments, 3D point 817 can be representative of a "temporomandibular joint (TMJ)."

In some embodiments, 3D point 818 can be representative of an "outer eye corner."

In some embodiments, 3D point 819 can be representative of a "cheekbone," or "upper cheek."

In some embodiments, 3D point 820 can be representative of an "alar wing."

In some embodiments, 3D point 821 can be representative of a "mouth corner."

In some embodiments, 3D point 822 can be representative of a "lower cheek."

In some embodiments, 3D point 823 can be representative of a "chin." As illustrated, in some embodiment, 3D point 823 is located based on the position of 3D point 821 (e.g., the mouth corner) outline of the shape of the human face (e.g., a lower jawline).

In some embodiments, 3D point 824 can be representative of a "temple."

In some embodiments, 3D point 825 can be representative of a "center point," and/or the "center of the bridge of the nose."

In some embodiments, 3D point 826 can be representative of a "nose tip."

In some embodiments, 3D point 827 can be representative of a "nose bottom (nadir)."

In some embodiments, 3D point 828 can be representative of a "lips apex."

In some embodiments, 3D point 829 can be representative of a "lips center."

In some embodiments, 3D point 830 can be representative of a "lips bottom (nadir)."

In some embodiments, 3D point 831 can be representative of a "chin bottom (nadir)."

In some embodiments, 3D point 832 can be representative of a "forehead apex."

In some embodiments, 3D points 810, 812, and 813 can be representative of the "brow" or "eyebrow" facial feature.

In some embodiments, 3D points 811, 814, 815, 816, and 818 can be representative of the "eye" facial feature.

In some embodiments, 3D points 810-813 can be representative of an "eyelid area" facial feature.

In some embodiments, 3D points 810-818 can be representative of the "eye area" facial feature.

In some embodiments, 3D points 820A/B, and 825-827 can be representative of the "nose" facial feature.

In some embodiments, 3D points 821A/B and 828-830 can be representative of the "mouth" facial feature.

In some embodiments, 3D points 819 and 822 can be representative of the "cheek" facial feature.

In some embodiments, 3D points 817A/B, 823A/B and 831 can be representative of the "jawline," or "lower face shape" facial feature.

In some embodiments, 3D points 823A/B and 830-831 can be representative of the "chin" facial feature.

3D Geometric Data

As described with reference to FIG. 2, 3D geometric data (e.g., 3D geometric data 246A) can describe a scene or object, and can include one or more vertices (e.g., points), edges, and/or faces of a 3D model represented by 3D model data (e.g., 3D model data 233A). In some embodiments, 3D geometric data can be represented by x-, y-, z-coordinate positions of of one or more 3D points. For example, an x-, y-, z-coordinate position of the nose tip (e.g., 3D point 826) can represent a portion of 3D geometric data.

In some embodiments, 3D geometric data can be represented as a relationship between two or more 3D points of a particular facial feature. For example, a distance between the 3D point 820A and the 3D point 820B can represent a portion of 3D geometric data. In another example, centerline 801 can represent a relationship (e.g., a distance) between 3D point 831 and 3D point 832 as a "face height." In another instance, horizontal line 802 can represent a relationship (e.g., a distance) between 3D points 817A/B as a "face width." In some embodiments, 2D geometric data can similarly be represented by x-, y-coordinate positions of a 2D point, or a relationship between two or more 2D points. In some embodiments, a relationship between two or more points (e.g., two or more 2D points or two or more 3D points) can correspond to a facial feature.

In some embodiments, a relationship between 3D point 810A and 3D point 810B can represent an "outer brow width."

In some embodiments, a relationship between 3D point 811A and 3D point 811B can represent an "inner pupillary distance (IPD)."

In some embodiments a relationship between 3D point 813A and 3D point 813B can represent an "inner brow distance."

In some embodiments, a relationship between 3D point 818A and 3D point 814A can represent an "eye width."

In some embodiments, a relationship between 3D point 814A and 3D point 814B can represent an "inner eye corner distance."

In some embodiments, a relationship between 3D point 820A and 3D point 820B can represent a "nose width."

In some embodiments, a relationship between 3D point 825 and 3D point 827 can represent a "nose height."

In some embodiments, a relationship between 3D point 821A and 3D point 821B can represent a "mouth width."

In some embodiments, a relationship between 3D point 828 and 3D point 830 can represent a "mouth height."

3D Landmark Relationship Data

As described with reference to FIG. 2, 3D landmark relationship data (e.g., 3D landmark relationship data 247A) can describe a relationship between first information corresponding to a first facial feature (e.g., 3D landmark data 245A or 3D geometric data 246A) and second information of a second facial feature (e.g., a relationship between two or more facial features). In some embodiments, 3D geometric data can describe relationships between 3D points corresponding to the same facial feature (e.g., lengths, distances, ratios, etc. derived between 3D landmark data and 3D geometric data), 3D landmark relationship data can describe relationships between 3D points corresponding to different facial features. For example, a ratio of the length of the centerline 801 to the length of the horizontal line 802 can represent 3D landmark relationship data. In another example, a difference between a first slope of the horizontal line 802 and a second slope of a line between the inner and outer eye corners (e.g., 3D points 814 and 818 respectively) can be expressed as an angle, and represent 3D landmark relationship data. In another example, a difference in the x-, y-, z-coordinate position of the 3D points representing the nose and 3D points representing an eye can be expressed as a ratio or distance, and represent 3D landmark relationship data. In another example, a relationship between a width of the nose (e.g., first facial feature), and a width of an eye (e.g., second facial feature) can be a portion of 3D landmark relationship data. A specific illustrative example of 3D landmark relationship data is described below with reference to FIG. 8B. In some embodiments, 2D facial feature relationship data can similarly describe relationships between 2D points of two or more (different) facial features (e.g., based on 2D facial feature data 242A, and 2D geometric data 243A).

Figure 8B:
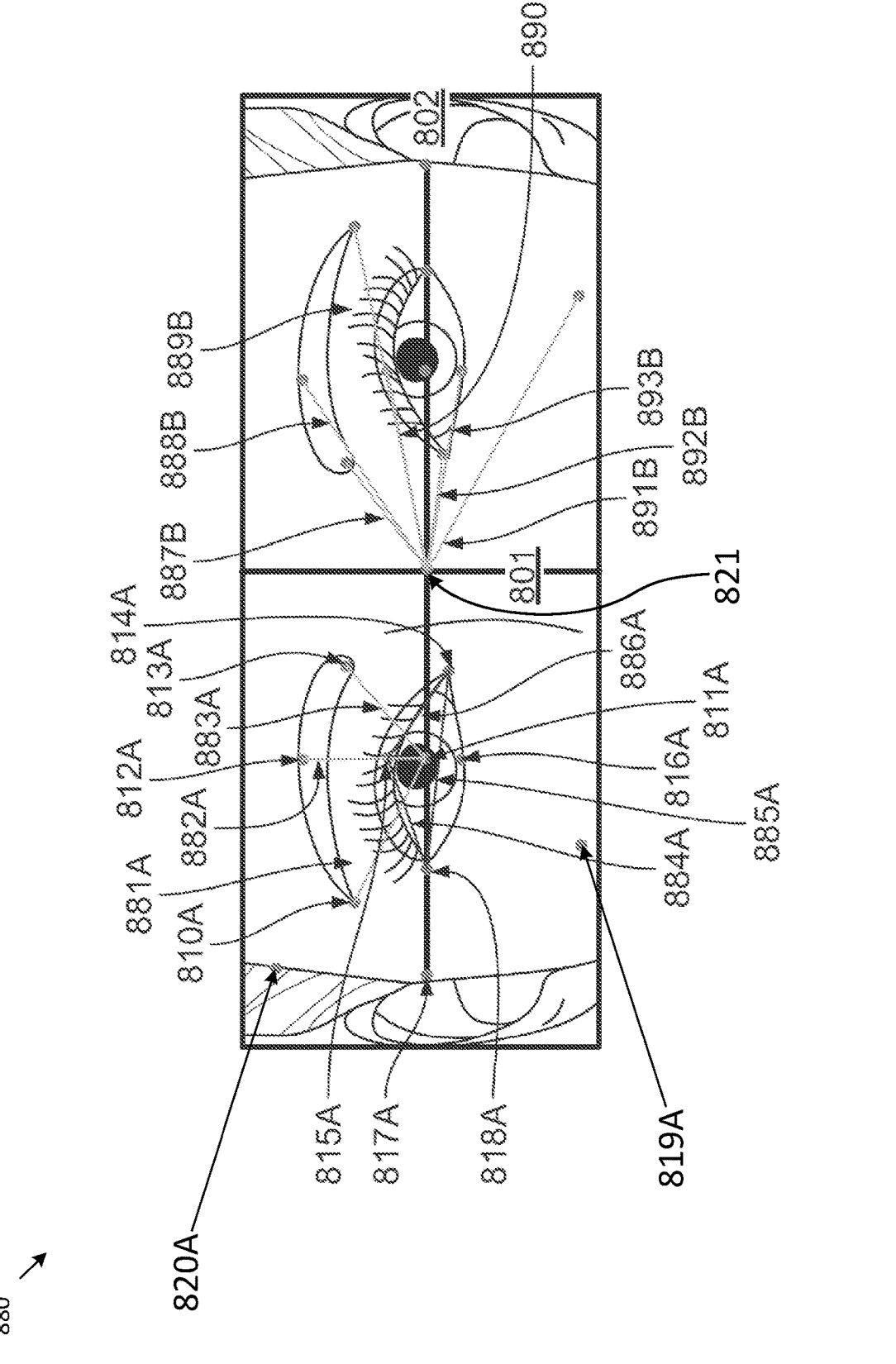
FIG. 8B represents an example eye area of an example human face that can be represented by image data, in accordance with aspects of the disclosure.

FIG. 8B illustrates a depiction of an eye area 880 of a human face, in accordance with aspects of the disclosure. In some embodiments, the human face can be a human face 800 as described with reference to FIG. 8A. Eye area 880 includes 3D relationships 881-886 and 3D relationships 887-893 (also referred to collectively as "3D relationships 881-893") between 3D points 810-819 as illustrated above in FIG. 8A. In some embodiments, the illustrative depictions of 3D relationships 881-893 can represent relationships between 3D points (e.g., 3D geometric data 246A). In some embodiments, the illustrative depictions of 3D relationships 881-893 can represent relationships between 3D landmarks (e.g., 3D landmark relationship data). In some embodiments, 3D relationships, such as 3D relationships 881-893, can represent 3D landmark relationship data.

Eye area 880 is illustrated as a 2D representation of a 3D model for purposes of illustration, rather than limitation. Points on eye area 880 are described here as 3D points of a 3D model, for purposes of illustration rather than limitation. It should be noted that the description of FIG. 8B can apply equally to a 2D image and/or 2D points unless otherwise described.

As illustrated in FIG. 8B, 3D relationships 881-893 correspond to one half of the face. It can be appreciated that for clarity, each of the 3D relationships 881-893 have been illustrated only on one half of the face, but that each of the 3D relationships 881-893 can correspond to either side of the face (not illustrated). It can be appreciated that the 3D relationships 881-893 do not represent an exhaustive list of relationships between reference points for the eye area 880 a human face, but are merely illustrative of the types of relationships that can be used by a machine learning model in the process of identifying 3D landmark relationship data (e.g., 3D landmark relationship data 247A) based on image input data (e.g., 2D image data 232A and 3D model data 233A). In some embodiments, relationships represented in 2D facial feature relationship data (e.g., 2D facial feature relationship data 244A) can similarly be identified by a machine learning model based on image input data (e.g., 2D image data 232A and 3D model data 233A).

In some embodiments, multiple relationships (e.g., represented by 3D geometric data) between reference points (e.g., 3D points 810-832) can correspond to or represent facial features of the eye area 880. In some embodiments, a number of relationships (e.g., represented by 3D geometric data) that correspond to each facial feature can be the same (e.g., each facial feature has an equal number of relationships), or can be based on an importance of the facial feature (e.g., more important facial features (for example, as determined by an algorithm or machine learning model) have a higher number of relationships than less important facial features). In some embodiments, multiple relationships represented by 2D geometric data can similarly correspond to or represent facial features of the eye area 880.

In some embodiments, multiple relationships (e.g., represented by 3D landmark relationship data) between 3D landmarks represented in the eye area 880 can correspond to facial features of the eye area 880. In some embodiments, a number of relationships (e.g., represented by 3D landmark relationship data 247A) can be based on an importance of the facial feature, such as an importance determined by an algorithm or machine learning model (e.g., more important 3D landmarks can have a higher number of relationships to other 3D landmarks than less important 3D landmarks).

In some embodiments, 3D relationship 881A can span between 3D point 810A and 3D point 811A (e.g., between the outer brow corner and the eye, such as the pupil or center of the pupil).

In some embodiments, 3D relationship 882A can span between 3D point 812A and 3D point 811A (e.g., between the brow apex and the eye, such as the pupil or center of the pupil).

In some embodiments, 3D relationship 883A can span between 3D point 813A and 3D point 811A (e.g., between the inner brow corner and the eye, such as the pupil or center of the pupil).

In some embodiments, 3D relationship 884A can span between 3D point 815A and 3D point 818A (e.g., between the eye apex and the outer eye corner).

In some embodiments, 3D relationship 885A can span between 3D point 814A and 3D point 818A (e.g., between the inner eye corner and the outer eye corner).

In some embodiments, 3D relationship 886A can span between 3D point 814A and 3D point 815A (e.g., between the eye apex and the inner eye corner).

In some embodiments, 3D relationships 887-893 can span between 3D point 825 (e.g., the center point) and respective 3D points of the eye area 880.

For example, 3D relationship 887B can span between 3D point 825 and 3D point 813A (e.g., the inner brow corner).

For example, 3D relationship 888B can span between 3D point 825 and 3D point 812A (e.g., brow apex).

For example, 3D relationship 889B can span between 3D point 825 and 3D point 810A (e.g., outer brow corner).

For example, 3D relationship 890B can span between 3D point 825 and 3D point 815A (e.g., eye apex).

For example, 3D relationship 891B can span between 3D point 825 and 3D point 819A (e.g., cheekbone).

For example, 3D relationship 892B can span between 3D point 825 and 3D point 814A (e.g., inner eye corner).

For example, 3D relationship 893B can span between 3D point 825 and 3D point 816A (e.g., eye bottom (nadir)).

In some embodiments, a ratio between two or more 3D relationships 881-893 corresponding to different facial features can represent a relationship between two or more 3D landmarks (e.g., 3D landmark relationship data 247A). Similarly, in some embodiments, a ratio between two or more 2D relationships corresponding to different facial features can represent a relationship between two or more 2D facial features (e.g., 2D facial feature relationship data 244A).

For example, for the facial features of the brow (e.g., represented by 3D points 810, 812, and 813) and the eye (represented by 3D points 811, 814, 815, 816, and 818), a ratio between the eye width (e.g., 3D relationship 885A) and the brow height (e.g., 3D relationship 882A) can be 3D landmark relationship data expressed as a ratio of eye-width to brow-height.

In some embodiments, an angle between two or more 3D relationships 881-893 corresponding to different facial features can represent a relationship between two or more 3D landmarks (e.g., 3D landmark relationship data 247A). Similarly, in some embodiments, an angle between two or more 2D relationships corresponding to different facial features can represent a relationship between two or more 2D facial features (e.g., 2D facial feature relationship data 244A).

For example, the facial feature of the horizontal line 802 and the eye (represented by 3D points 811, 814, 815, 816, and 818), an angle between the 3D relationship 885A (e.g., the relationship corresponding to the eye width) and the horizontal line 802 can be 3D landmark relationship data expressed as an angle representing "eye slant."

Figure 9:
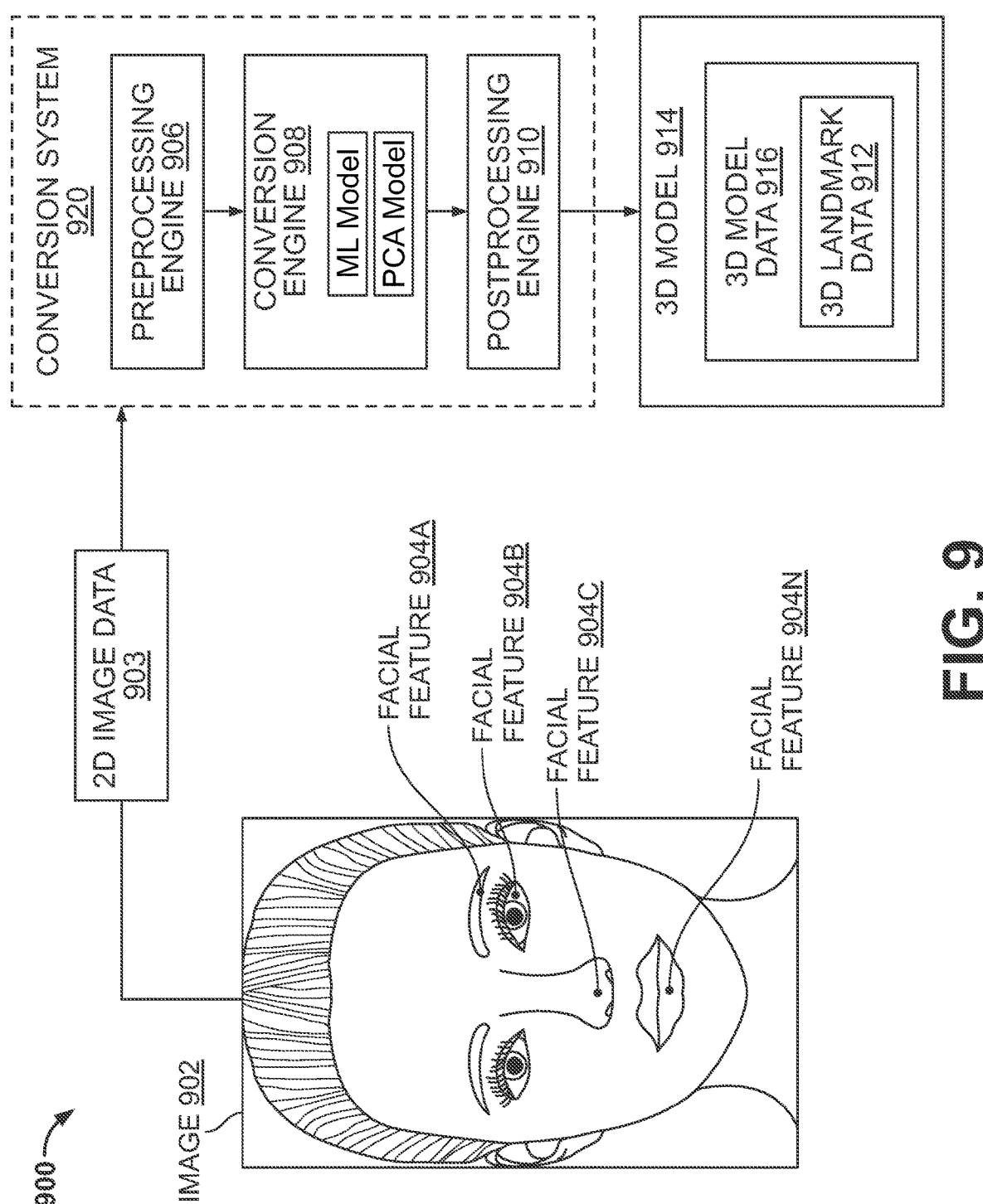
FIG. 9 is a block diagram of an example conversion system architecture for providing conversion of two-dimensional (2D) image data corresponding to a 2D image to a corresponding three-dimensional (3D) model, in accordance with aspects of the disclosure.

FIG. 9 is a block diagram of an example conversion system architecture 900 for providing conversion of 2D image data corresponding to a 2D image to a corresponding 3D model, in accordance with aspects of the disclosure. In some embodiments, conversion system 920 can include one or more of preprocessing engine 906, conversion engine 908, and/or postprocessing engine 910. In some embodiments, conversion system 920 can use the 2D image data 903 corresponding to image 902 to generate the 3D model data 916 of a 3D model 914. In some embodiments, image 902 is a 2D image that is represented by 2D image data 903. As described above, in some embodiments, image 902 can include an image of a subject's face or a part of the subject's face (e.g., an image of a subject's eye area).

Image 902 may depict one or more facial features, such as facial features 904A-N of the subject's face. As described above, a facial feature can refer to a physical characteristic or element that is part of a human face. Examples of facial features that may be depicted in image 902 include eyebrow features (e.g., inner eyebrow, eyebrow apex, center eyebrow, outer eyebrow) represented by facial feature 904A, eye features (e.g., pupil, inner eye, outer eye, upper lid, tightline) represented by facial feature 904B, nose features (e.g., bridge, nostrils) represented by facial feature 904C, lip features (e.g., upper lip, lower lip) represented by facial feature 904N, mouth features (e.g., corner of the mouth), and so forth.

In some embodiments and as noted above, conversion system 920 can use the 2D image data 903 corresponding to the image 902 as input to the conversion system 920.

In some embodiments and as noted above, conversion system 920 can use the 2D image data 903 of image 902 to generate information corresponding to 3D model 914 (e.g., 3D model data 916). As described above, 3D model 914 can refer to a three-dimensional digital representation of a scene or object. The 3D model can be represented by 3D model data 916. As described above, in some embodiments, one or more of vertices, edges and faces can define the geometry of a 3D model 914.

999 As described above, in some embodiments, 3D model data 916 of the 3D model 914 includes material information that can influence the appearance of the 3D model 914 at rendering (e.g., how light reflects from the material).

In some embodiments, the 3D model data 916 of the 3D model 914 can include landmark data, such as 3D landmark data 912. In some embodiments, one or more landmarks can be represented by 3D landmark data 912. As described above, a landmark can be represented by the grouping of points of the 3D model 914 that represent the right eye, the inner corner of the eyes, the bridge of the nose, a centerline of a face, or some other facial feature.

In some embodiments, 3D landmark data 912 can include information identifying one or more points of the 3D model 914 (e.g., specific grouping of points and/or 3D coordinate data of the points) that correspond to a feature, such as a facial feature. In some embodiments, 3D landmark data 912 can include information identifying the relationship between one or more points of a landmark. To identify the relationship between the one or more points of a landmark, the 3D landmark data 912 can include information identifying one or more of edges, faces, geometric data, such as length, height, and depth, and/or ratios of geometric data. To identify the relationship between the one or more points of a landmark, the 3D landmark data 912 can include one or more of absolute or relative values (e.g., deviations from average or template values). As described above, in some embodiments, 3D landmark data 912 can include information identifying relationships between multiple landmarks.

In some embodiments, preprocessing engine 906 of conversion system 920 can perform one or more preprocessing operations on 2D image data 903. In some embodiments, preprocessing engine can clean, transform, and/or organize the 2D image data 903 of image 902 in a manner suitable to be received by conversion engine 908 (also referred to as "preprocessed 2D image data" herein). For example, preprocessing engine 906 may scale or crop the image 902 and generate corresponding 2D image data (e.g., preprocessed image data, such as 2D image data 903). In some embodiments, preprocessing engine 906 can convert image 902 from an RGB color space to a grayscale color space, or vice versa. In some embodiments, preprocessing engine 906 can convert image 902 to a common or preferred format (e.g., JPEG).

In some embodiments, preprocessing engine 906 may perform preprocessing with one or more machine learning (ML) models. For example, a machine learning (ML) model may be implemented to identify one or more facial features, such as facial features 904A-N (which may be added to 2D image data 903 (e.g., metadata) of image 902). In another example, an ML model can be used to enhance contrast or resolution of image 902. In some embodiments, an ML model can be used to remove objects or a background element from image 902. For instance, an ML model can be used to remove glasses from a subject's face and fill the area where the glasses were removed with color and/or texture that is similar or that appears seamless with the surrounding area.

In an embodiment where conversion engine 908 includes an ML model as described below, preprocessing engine 906 may select or exclude various input images (e.g., image 902) as part of a training procedure to achieve a desired effect in training the ML model of conversion engine 908. In an embodiment, preprocessing engine 906 may not be implemented, and 2D image data 903 (e.g., raw 2D image data) of image 902 may be provided as input to conversion engine 908.

In some embodiments, conversion engine 908 uses the 2D image data 903 (e.g., raw, or preprocessed) to generate a 3D model 914 (e.g., 3D model data 916 of 3D model 914). In some embodiments, conversion engine 908 can generate the 3D model 914 with or without postprocessing engine 910.

In some embodiments, conversion engine 908 can implement one or more techniques to convert the 2D image data 903 to a 3D model 914. In some embodiments, conversion engine 908 may include an ML technique (e.g., statistical learning, deep learning, reinforcement learning, etc.) to convert the 2D image data 903 into a 3D model 914. For example, conversion engine 908 may include a neural radiance field (NeRF) ML model. In another example, conversion engine 908 may include an ML model based on differential rendering or inverse rendering techniques. ML models of conversion engine 908 may operate in a training mode or an inference mode. In a training mode, 2D and/or 3D training data may be provided as input and/or output of the ML model for supervised or unsupervised training. In an inference mode, 2D image data 903 may be provided as input to the ML model for generation of 3D model data 916 of 3D model 914 in accordance with previous training.

In some embodiments, conversion engine 908 may include a principal component analysis (PCA) model (further described below with reference to FIGS. 11-12) to convert the 2D image data 903 to a 3D model 914.

In some embodiments, conversion engine 908 may include a non-machine learning technique for converting the 2D image data 903 into 3D model 914. For example, conversion engine 908 may include parametric techniques based on various mathematical or physical principals, heuristics, or similar. In some embodiments, conversion engine 908 may include an ML module and/or a non-machine learning module for converting the 2D image data 903 into 3D model data 916 of 3D model 914.

In some embodiments, postprocessing engine 910 of conversion system 920 can perform one or more postprocessing operations on 3D model data 916 (e.g., also referred to as "postprocessed 3D model data" herein). In some embodiments, postprocessing engine 910 can perform further analysis, refinement, transformations and/or other modifications of 3D model data 916 received from conversion engine 908. For example, postprocessing engine 910 may generate a set of 3D landmark data of one or more landmarks corresponding to facial features by grouping particular vertices of the 3D model 914 that represent respective landmarks. In another example, postprocessing engine 910 can remove or modify the 3D model data 916. In some embodiments, postprocessing engine can emphasize particular landmarks (e.g., weighting or PCA techniques) and/or define particular landmarks and/or remove particular landmarks and/or de-emphasize particular landmarks. In some embodiments, postprocessing engine 910 is not implemented, and thus 3D landmark data 912 can be generated by conversion engine 908.

Figure 10:
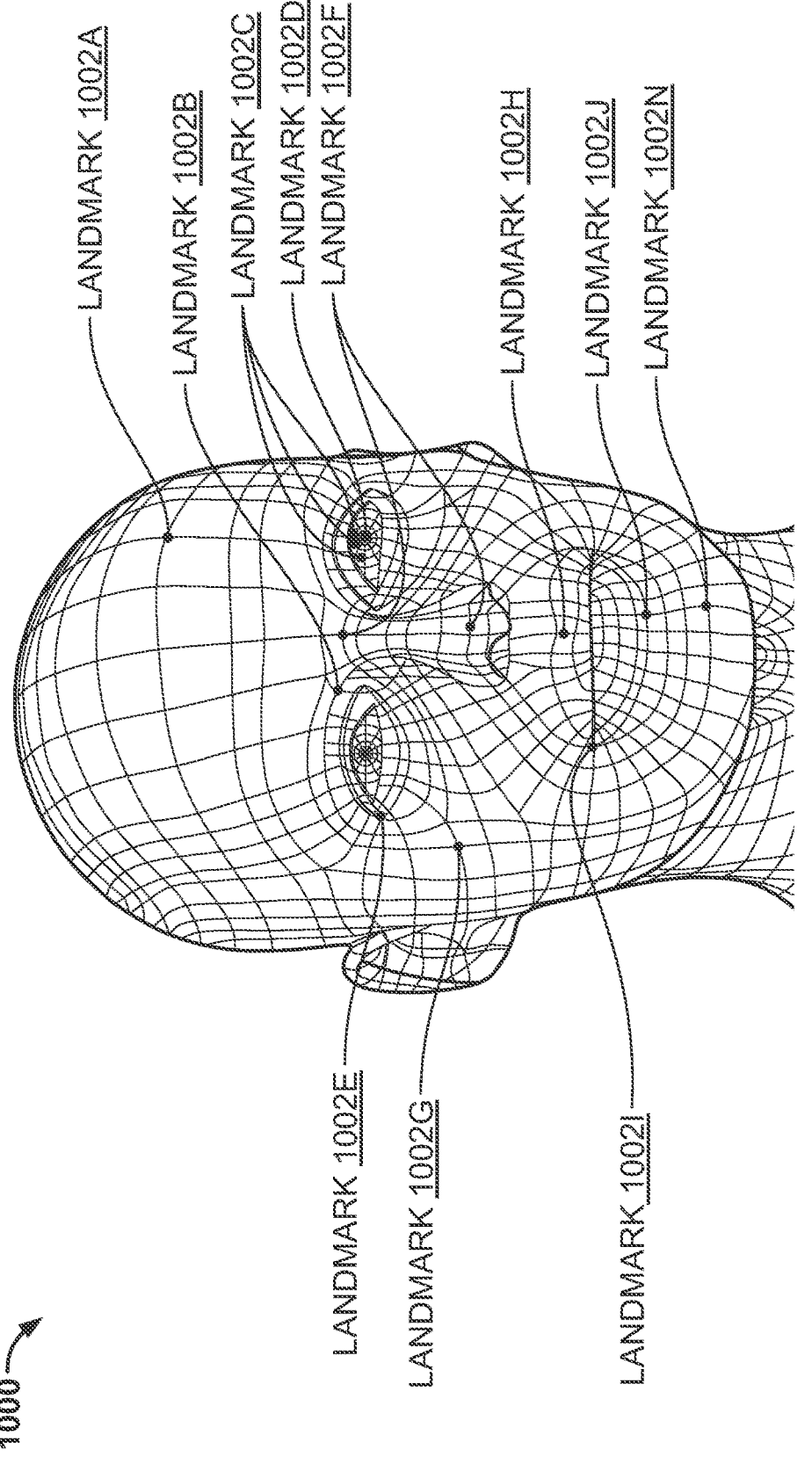
FIG. 10 depicts an example 3D model of the face of a subject, in accordance with aspects of the disclosure.

FIG. 10 depicts an example of a 3D model 1000 of a face of a subject, in accordance with aspects of the disclosure. In some embodiments, 3D model 1000 (e.g., rendered 3D model) may, for the sake of illustration and not limitation, correspond to image 902 of FIG. 9.

3D model data 916 may be used to generate, render, or modify the 3D model 1000 to represent the subject's face. Landmarks 1002A-N of 3D model 1000 may correspond to and be represented by 3D landmark data 912 of FIG. 9. As noted herein, landmarks can correspond to features such as facial features. For example, landmark 1002F can correspond to the bridge of the nose. Landmark 1002C can correspond to the lash line of the left eye. Landmark 1002D can correspond to the center point of the pupil of the left eye, and so forth.

In some embodiments, 3D model 1000 may correspond to various types of 3D modeling techniques. For example, in an embodiment, 3D model 1000 may be a mathematical model. In some embodiments, a mathematical model can include a parametric model where landmarks 1002A-N and other 3D features may be represented by mathematical functions such as one or more of points, lines, arcs, Bezier curves, functional manifolds, and so on. In another embodiment, 3D model 1000 may be a mesh model, a point cloud model, or similar model comprising multiple objects such as vertices, lines, and faces to represent the subject's face. Landmarks 1002A-N may correspond to one or more vertices, one or more lines, one or more faces, or sets thereof. In some embodiments, landmarks 1002A-N may share or overlap geometry. For example, two overlapping landmarks may share vertices, lines, etc. In another embodiment, 3D model 1000 may be an ML model, such as a neural radiance field model trained to produce 2D views of the subject's face from multiple positions in 3D space. Landmarks 1002A-N may correspond to weights, convolutional filters, or other aspects of the ML model (which can be captured in corresponding 3D model data). In another embodiment, 3D model 1000 may comprise multiple model representations, such as a parametric representation combined with a mesh representation or similar.

In an embodiment, 3D model 1000 may be a morphological model. A morphological model can represent the shape and structure of objects (e.g., human faces) using morphological data. In some embodiments, morphological data can describe the form and structural relationships between geometry (e.g., vertices, lines, planes and/or landmarks) of the model and enables manipulation of the geometry based on those relationships. In some embodiments, a morphological model may include a template model (e.g., 3D template model) of a human face. The template model may be initialized with template 3D model values (e.g., template landmark data) reflecting average values (e.g., average positions, sizes, colors, etc.) for an object, such as a human face. The template 3D model values may be derived from a representative collection of objects, such as human faces or features thereof. In some embodiments, the template model can be used as a reference model that can be compared to values representing a subject's unique face. In some embodiments, the comparison can generate difference information (e.g., metric) reflecting differences (e.g., deltas or deviations) between the template 3D model values, and in particular the template landmark data, and values representing corresponding points and/or facial features of the subject's face. The difference information can be stored as part of 3D landmark data 912. To generate the 3D model of the subject's face, conversion system 920 may adjust the template model based on the difference information corresponding to a particular subject, which can contribute to computational efficiency in generating a 3D model. In some embodiments, a morphological model can be used with a PCA model to generate a 3D model, as described further below.

Figure 11A:
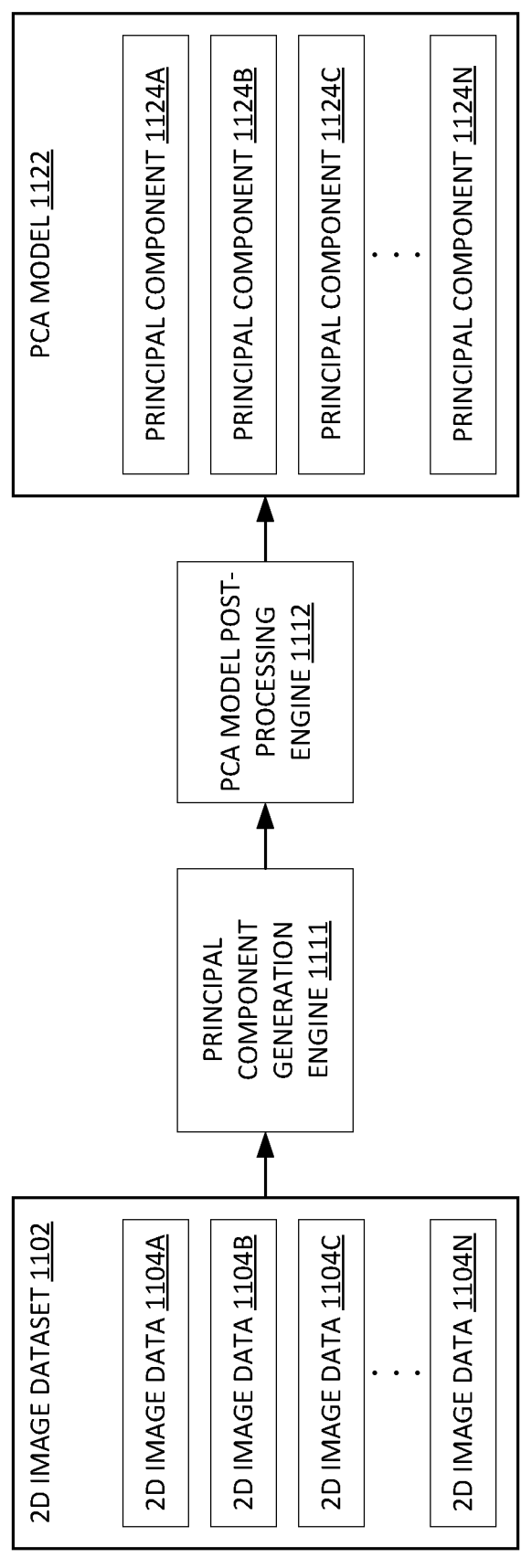
FIG. 11A is an example pipeline block diagram for a principal component analysis (PCA) model generation architecture to train a PCA model of principal components, in accordance with aspects of the disclosure.
Figure 11B:
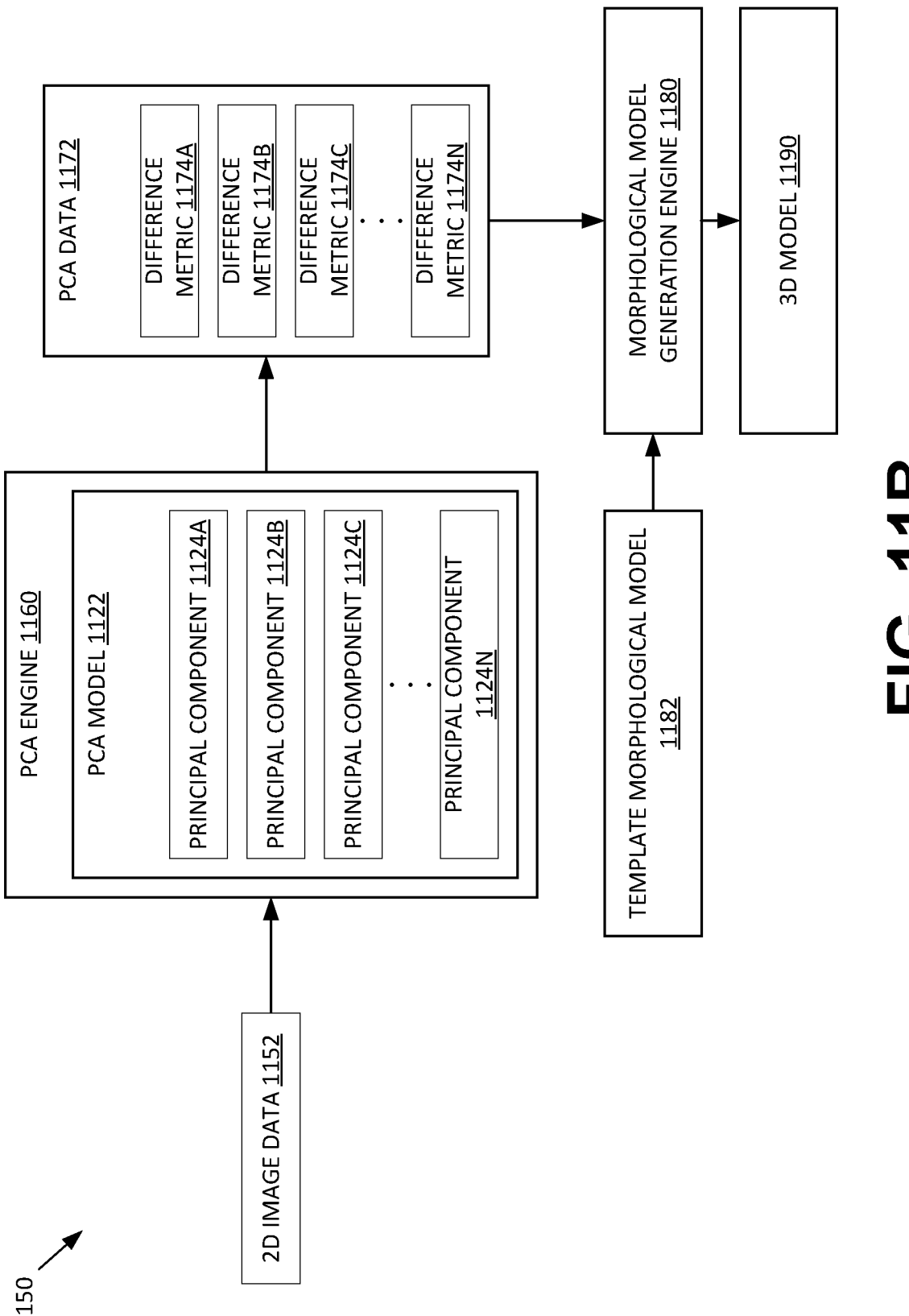
FIG. 11B is an example pipeline block diagram for generating a 3D model from 2D image data using a trained PCA model and a morphological model, in accordance with aspects of the disclosure.

FIG. 11A is an example pipeline block diagram of an architecture 1100 for a principal component analysis (PCA) model generation architecture to train a PCA model of principal components, in accordance with some embodiments. FIG. 11B is an example pipeline block diagram of a 3D model generation architecture 1150 for generating a 3D model from 2D image data using a trained PCA model and a morphological model.

In some embodiments, PCA can refer to a technique that can be used to transform a dataset into a new set of dimensions (principal components). The principal components may include linear combinations of original data features in the dataset. The combinations can be derived to capture variance (e.g., maximum variance) in the dataset.

The principal components may be orthogonal (e.g., uncorrelated) and ranked according to the variance. In some embodiments, the resulting principal components can form, at least in part, a trained PCA model based on the dataset (the training data). The trained PCA model can be used to characterize or transform other data into respective principal components by projecting the other data onto the principal components of the trained PCA model. In some embodiments, PCA techniques can be used to transform features (e.g., facial features) of the original data, such as 2D image data, into a new set of principal components, which may be used to generate the 3D models and perform other analyses on the 2D image data.

Referring to FIG. 11A, architecture 1100 includes 2D image dataset 1102, principal component generation engine 1111, PCA model postprocessing engine 1112, and PCA model 1122. In some embodiments, 2D image dataset 1102 includes one or more 2D image data 1104A-N each corresponding to a respective 2D image. In some embodiments, each of 2D image data 1104A-N may correspond to a 2D image of a human face, such as image 902 of FIG. 9. In some embodiments, 2D image dataset 1102 may be derived from a training set of 2D images of human faces, which may be manually or automatically curated. In some embodiments, and as described with reference to FIG. 9, the data of 2D image dataset 1102 may be preprocessed with various techniques to change resolutions, adjust color depths, prune undesirable image data, or similar.

In some embodiments, PCA model 1122 includes one or more principal components 1124A-N each associated with a feature, such as 2D facial feature. In some embodiments, a principal component of principal components 1124A-N may correspond to a human-derived facial feature, such as eye color, inner eye distance, eye angle, jaw shape, or similar. As described above, a human-derived facial feature can refer to a physical characteristic or element that is part of a human face and that naturally occurs on an individual's face and can be assessed or recognized by a human eye (e.g., human perception). In some embodiments, a principal component of principal components 1124A-N may correspond to a computer-derived facial feature, such as a correlation between multiple human-derived facial features (e.g., a correlation between inner eye distance and jaw shape), non-human derived facial features, or a combination thereof.

In some embodiments, a principal component of principal components 1124A-N may correspond to a computer-derived facial feature. A computer-derived facial feature can refer to attributes or information about an individual's face that is extracted, analyzed, or recognized by a computer (e.g., processing device implementing digital image processing). A computer-derived facial feature may not be assessed or recognized by a human eye. In some embodiments, the computer-derived facial feature is generated by an algorithm (e.g., PCA model, machine learning model, etc.). In some embodiments, the computer-derived facial feature is generated by an algorithm without human intervention. In some embodiments, the principal components of a trained PCA model 1122 (including principal components corresponding to human-derived and/or computer-derived features) may represent an average or template set of facial features based on the variance of facial features present in 2D image dataset 1102. A difference (e.g., difference metric) between an individual subject's facial feature and the principal component template can thus be expressed as a weight (e.g., a multiplier or a difference) of the corresponding principal component (e.g., the facial features is stronger/weaker than average as indicated by a larger/smaller weight or a positive/negative weight), as described below with reference to FIG. 11B.

In some embodiments, PCA model 1122 can be generated or trained by one or more of principal component generation engine 1111 or PCA model postprocessing engine 1112. In some embodiments, principal components 1124A-N may be derived from 2D image dataset 1102 using PCA training techniques. In some embodiments, 2D image dataset 1102 may be modified to elicit select principal components. In some embodiments, 2D image dataset 1102 may be modified to elicit principal components corresponding to human-derived facial features. For example, a dataset representing human faces may be manually or automatically chosen (e.g., by preprocessing engine 906) to encourage identification of specific human-derived facial features. A feedback loop may be used with multiple generation cycles in principal component generation engine 1111 to refine the dataset and/or resulting principal components. In some embodiments, the principal components may be selected, modified, pruned, or a combination thereof to retain principal components corresponding to one or criteria such as human-derived facial features. For example, principal components corresponding to computer-derived features may be manually or automatically removed (e.g., by PCA model postprocessing engine 1112 or postprocessing engine 910) to obtain PCA model 1122. In another example, principal components associated with different 2D image datasets (e.g., 2D image dataset 1102) may be combined to form a composite PCA model (e.g., a PCA model 1122) corresponding to human-derived facial features, where principal components 1124A-N of the composite model may not necessarily be orthogonal (e.g., uncorrelated) to each other as would be expected in a set of principal components derived from a single dataset.

Referring to FIG. 11B, 3D model generation architecture 1150 includes 2D image data 1152, PCA engine 1160, PCA data 1172, morphological model generation engine 1180, template morphological model 1182, and 3D model 1190. In some embodiments, 2D image data 1152 may correspond to an image of a scene or object, such as a subject's face (e.g., image 902 of FIG. 9). In some embodiments, PCA engine 1160 includes PCA model 1122 of FIG. 11A, with each principal component 1124A-N corresponding to a facial feature as previously described. In some embodiments, PCA engine 1160 can be used to transform or project the 2D image data 1152 into the facial feature eigenspace of PCA model 1122 (or non-eigenspace for a composite PCA model, such as a PCA model 1122 as previously described) to generate PCA data 1172. PCA engine 1160 may perform a set of operations (e.g., a set of dot product operations) to perform the projection. In some embodiments, PCA engine 1160 may correspond to conversion system 920 of FIG. 9.

In some embodiments, PCA data 1172 may include difference metrics 1174A-N (also referred to as "difference information" herein) representing the projection of 2D image data 1152 over each of principal components 1124A-N. A difference metric of difference metrics 1174A-N may correspond to a deviation (or delta, weight, strength, prominence, or other metric) of a facial feature of 2D image data 1152 from an average or template value represented by the corresponding principal component of principal components 1124A-N. For example, difference metric 1174A may represent a deviation of the subject's inner eye distance from the average distance within the images associated with 2D image dataset 1102. As previously described, difference metrics 1174A-N may correspond to a multiplier, difference, or other operation with respect to the template facial features represented by principal components 1124A-N.

In some embodiments, template morphological model 1182 may correspond to a generic 3D model of an object, such as a human face (e.g., 3D model 914 of FIG. 9). The 3D landmark data of the generic 3D model can each correspond to a principal component of principal components 1124A-N and an average or template value associated with the corresponding principal component. In some embodiments, template morphological model 1182 may be generated or configured (e.g., manually, or automatically) based on principal components 1124A-N such that each landmark represents the average facial feature of the corresponding principal component. In some embodiments, each landmark may correspond to one or more vertices, lines, faces, or other geometry of the model associated with the landmark's facial feature, and landmarks may share geometry. Template morphological model 1182 may further be configured such that a landmark may be modified (e.g., morphed) based on a difference metric of PCA data 1172. For example, a landmark may be associated with a control variable that modifies the landmark to increase or decrease the prominence (or other metric) of the corresponding facial feature. The geometry associated with the landmark will be modified as a result. In an example, a vertex of template morphological model 1182 located at the inner corner of the eye may be associated with both an inner eye distance landmark (corresponding to an inner eye distance facial feature) and an eye angle landmark (corresponding to an eye angle facial feature). Morphing the control variables of either landmark may change the coordinates of the vertex.

In some embodiments, PCA data 1172 and template morphological model 1182 may be provided as input to morphological model generation engine 1180 for generation of 3D model 1190. 3D model 1190 can be similar to 3D model 914 of FIG. 9, unless otherwise described. Morphological model generation engine 1180 may use difference metrics 1174A-N of PCA data 1172 to modify the corresponding landmarks of template morphological model 1182 to generate in 3D model 1190 that is representative of the subject's face. For example, a control variables of template morphological model 1182 may be multiplied by or added to respective ones of difference metrics 1174A-N to accurately represent the subject's unique facial features in 3D model 1190.

FIG. 12A illustrates a flow diagram of an example of a method 1200 for training a PCA model, in accordance with aspects of the disclosure. FIG. 12B illustrates a flow diagram of an example of a method 1220 for using a trained PCA model, in accordance with aspects of the disclosure. Methods 1200 and 1220 may be performed by processing logic that may comprise hardware (e.g., circuitry, dedicated logic, etc.), computer-readable instructions such as software or firmware (e.g., run on a general-purpose computing system or a dedicated machine), or a combination thereof. Methods 1200 and 1220 may also be associated with sets of instructions stored on a non-transitory computer-readable medium (e.g., magnetic, or optical disk, etc.). The instructions, when executed by a processing device, may cause the processing device to perform operations comprising the blocks of methods 1200 and 1220. In an embodiment, methods 1200 and 1220 are performed by system 100A or system 100B of FIGS. 1A-B. In an embodiment, blocks of a particular method depicted in FIGS. 11A-B can be performed simultaneously or in different orders than depicted. Various embodiments may include additional blocks not depicted in FIGS. 11A-B or a subset of blocks depicted in FIGS. 11A-B.

Referring to FIG. 12A, at block 1202, processing logic identifies 2D image data, which may correspond to images of human faces. For example, processing logic may identify the 2D image data 903 corresponding to one or more images 902. The 2D images of human faces may be images of a training set, which may be manually or automatically curated.

At block 1204, the processing logic preprocesses the 2D image data. For example, preprocessing engine 906 may select 2D image data to elicit human-derived principal components corresponding to human-derived facial features as described above with reference to FIG. 11. Other preprocessing may occur at block 1204, such as normalizing the 2D image data, cropping the 2D image data to consistent dimensions, augmenting the 2D image data to generate additional training data, etc.

At block 1206, the processing logic trains a PCA model with principal component analysis techniques using the 2D image data from the previous blocks. In some embodiments, the resulting principal components of the trained PCA model may correspond to human-derived facial features or computer-derived facial features or a combination thereof. In an embodiment, blocks 1204-1206 may be repeated in a loop to achieve desired principal components (e.g., corresponding to human-derived facial features) as described above with reference to FIGS. 10A-B.

At block 1208, processing logic refines the principal components of the PCA model. For example, postprocessing engine 910 may prune or modify non-human-derived principal components or may combine human-derived components from different training blocks (e.g., each block 1206 associated with a different training set of 2D image data).

Referring to FIG. 12B, at block 1222, processing logic preprocesses input 2D image data (e.g., corresponding to an image of a subject's face). For example, preprocessing engine 906 may normalize the input 2D image data, flatten it to a vector, or perform other preprocessing operations.

At block 1224, processing logic provides the preprocessed 2D image data as input to the trained PCA model.

At block 1226, processing logic obtains an output of the PCA model corresponding to weights of the principal components. For example, in blocks 1224 and 1226, the preprocessed input 2D image data may be projected onto the eigenspace defined by the principal components, and the weights indicating the deviation of the input 2D image data from the training set (e.g., difference metrics) may be obtained from the projection.

At block 1228, the processing logic modifies landmarks of a 3D model (e.g., a morphological model of a template face) based on the output of the PCA model. For example, landmarks 1002A-N of 3D model 1000 may be modified based on a deviation (e.g., difference metrics) from the template model indicated by the weights obtained at block 1226.

Figure 13:
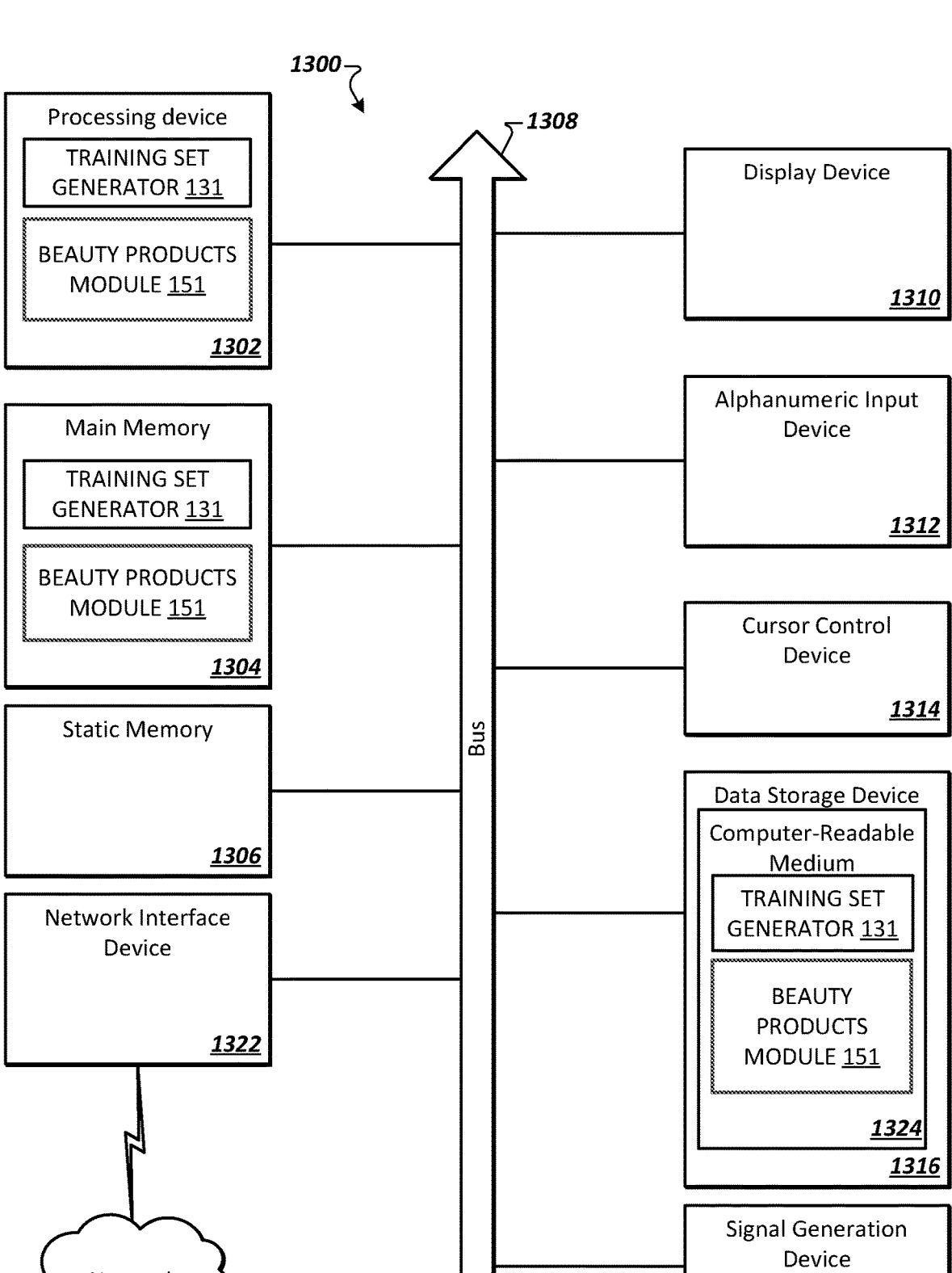
FIG. 13 is a block diagram illustrating an exemplary computer system in accordance with aspects of the disclosure.

FIG. 13 is a block diagram illustrating an exemplary computer system, system 1300, in accordance with aspects of the disclosure. The system 1300 executes one or more sets of instructions that cause the machine to perform any one or more of the methodologies discussed herein. Set of instructions, instructions, and the like can refer to instructions that, when executed system 1300, cause the system 1300 to perform one or more operations of training set generator 131 or beauty products module 151. The machine can operate in the capacity of a server or a client device in client-server network environment, or as a peer machine in a peer-to-peer (or distributed) network environment. The machine can be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The system 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a data storage device 1316, which communicate with each other via a bus 1308.

The processing device 1302 represents one or more general-purpose processing devices such as a microprocessor, central processing unit, or the like. More particularly, the processing device 1302 can be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 1302 can also be one or more special-purpose processing devices such as an application specific integrated circuit (ASIC), a field programmable gate array (FPGA), a digital signal processor (DSP), network processor, or the like. The processing device 1302 is configured to execute instructions of the system 100A or system 100B and the training set generator 131 or beauty products module 151 for performing the operations discussed herein.

The system 1300 can further include a network interface device 1322 that provides communication with other machines over a network 1318, such as a local area network (LAN), an intranet, an extranet, or the Internet. The system 1300 also can include a display device 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker).

The data storage device 1316 can include a computer-readable storage medium 1324 on which is stored the sets of instructions of the system 100A or system 100B and of training set generator 131 or of beauty products module 151 embodying any one or more of the methodologies or functions described herein. The computer-readable storage medium 1324 can be a non-transitory computer-readable storage medium. The sets of instructions of the system 100A or system 100B and of training set generator 131 or of beauty products module 151 can also reside, completely or at least partially, within the main memory 1304 and/or within the processing device 1302 during execution thereof by the system 1300, the main memory 1304 and the processing device 1302 also constituting computer-readable storage media. The sets of instructions can further be transmitted or received over the network 1318 via the network interface device 1322.

While the example of the computer-readable storage medium 1324 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding, or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure can be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating," "providing," "obtaining," "identifying," "determining," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus can be specially constructed for the required purposes, or it can include a general purpose computer selectively activated or reconfigured by a computer program stored in the computer. Such a computer program can be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims can generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and cannot necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure can, therefore, be determined with reference to the appended claims, along with the full scope of equivalents to which such claims are entitled.

What is claimed is:

1. A method for using a trained machine learning model using information pertaining to a human face, comprising:
providing to the trained machine learning model a first input comprising two-dimensional (2D) image data representing a 2D image of a face of a subject;
providing to the trained machine learning model, a second input comprising information identifying a three-dimensional (3D) model of the face of the subject corresponding to the 2D image of the face of the subject;
generating, using the trained machine learning model, one or more outputs identifying (i) a plurality of facial features represented in the 2D image, (ii) a level of confidence that the plurality of facial features correspond to one or more actual facial features of the subject represented in the 2D image, (iii) an indication of first variation information representing differences between the plurality of facial features represented in the 2D image and one or more target facial features of a target face corresponding to a beauty target, (iv) a level of confidence that the first variation information accurately reflects the differences between the plurality of facial features represented in the 2D images and the one or more target facial features of the target face corresponding to the beauty target, (v) an indication of one or more landmarks of the 3D model, (vi) a level of confidence that the one or more landmarks of the 3D model correspond to the plurality of facial features represented in the 2D image, (vii) an indication of second variation information identifying differences between the one or more landmarks of the 3D model and one or more target landmarks of a target 3D model corresponding to the beauty target, and (viii) a level of confidence that the second variation information reflects the differences between the one or more landmarks of the 3D model and the one or more target landmarks of the target 3D model corresponding to the beauty target; and
selecting, among a plurality of beauty products, a first beauty product based on the first variation information, and the second variation information.

2. The method of claim 1, wherein the first variation information describes differences between first relationships and first target relationships, wherein the first relationships are between the plurality of facial features represented in the 2D image of the face of the subject, and wherein the first target relationships are between the one or more target facial features of the target face corresponding to the beauty target.

3. The method of claim 1, further comprising:
determining whether the level of confidence that the first variation information accurately reflects the differences between the plurality of facial features represented in the 2D images and the one or more target facial features of the target face corresponding to the beauty target satisfies a threshold level of confidence; and
responsive to determining that the level of confidence satisfies the threshold level of confidence, providing, to a client device, an indication of the first variation information.

4. The method of claim 1, further comprising:
receiving an indication of a user selection of the beauty target among a plurality of beauty targets; and
providing to the trained machine learning model a third input comprising information identifying the beauty target selected among the plurality of beauty targets.

5. The method of claim 1, wherein the second variation information describes differences between second relationships and second target relationships, wherein the second relationships are between the one or more landmarks of the 3D model, and wherein the second target relationships are between the one or more target landmarks of the target 3D model corresponding to the beauty target.

6. The method of claim 1, further comprising:
determining whether the level of confidence that the second variation information accurately reflects the differences between the one or more landmarks of the 3D model and the one or more target landmarks of the target 3D model corresponding to the beauty target satisfies a threshold level of confidence; and
responsive to determining that the level of confidence satisfies the threshold level of confidence, providing, to a client device, an indication of the second variation information.

7. The method of claim 1, wherein the second variation information describes differences between geometric data and target geometric data, the target geometric data based on the one or more landmarks of the 3D model, and the target geometric data based on the one or more target landmarks of the target 3D model corresponding to the beauty target.

8. The method of claim 1, further comprising:

providing, to a client device, a first notification identifying the first beauty product.

9. The method of claim 8, further comprising:

providing, to the client device, a second notification identifying instructions on using the first beauty product to reduce the differences between the plurality of facial features represented in the 2D images and the one or more target facial features of the target face corresponding to the beauty target.

10. A system comprising:

a memory; and one or more processing devices communicatively coupled to the memory, the one or more processing devices configured to:

provide to a trained machine learning model a first input comprising two-dimensional (2D) image data representing a 2D image of a face of a subject;

provide to the trained machine learning model, a second input comprising information identifying a three-dimensional (3D) model of the face of the subject corresponding to the 2D image of the face of the subject;

generate, with the trained machine learning model, one or more outputs identifying (i) a plurality of facial features represented in the 2D image, (ii) a level of confidence that the plurality of facial features correspond to one or more actual facial features of the subject represented in the 2D image, (iii) an indication of first variation information representing differences between the plurality of facial features represented in the 2D image and one or more target facial features of a target face corresponding to a beauty target, (iv) a level of confidence that the first variation information accurately reflects the differences between the plurality of facial features represented in the 2D images and the one or more target facial features of the target face corresponding to the beauty target, (v) an indication of one or more landmarks of the 3D model, (vi) a level of confidence that the one or more landmarks of the 3D model correspond to the plurality of facial features represented in the 2D image, (vii) an indication of second variation information identifying differences between the one or more landmarks of the 3D model and one or more target landmarks of a target 3D model corresponding to the beauty target, and (viii) a level of confidence that the second variation information reflects the differences between the one or more landmarks of the 3D model and the one or more target landmarks of the target 3D model corresponding to the beauty target; and select, among a plurality of beauty products, a first beauty product based on the first variation information, and the second variation information.

11. The system of claim 10, wherein the first variation information describes differences between first relationships and first target relationships, wherein the first relationships are between the plurality of facial features represented in the 2D image of the face of the subject, and wherein the first target relationships are between the one or more target facial features of the target face corresponding to the beauty target.

12. The system of claim 10, the one or more processing devices further configured to:

determine whether the level of confidence that the first variation information accurately reflects the differences between the plurality of facial features represented in the 2D images and the one or more target facial features of the target face corresponding to the beauty target satisfies a threshold level of confidence; and responsive to determining that the level of confidence satisfies the threshold level of confidence, provide, to a client device, an indication of the first variation information.

13. The system of claim 10, the one or more processing devices further configured to:

receive an indication of a user selection of the beauty target among a plurality of beauty targets; and provide to the trained machine learning model a third input comprising information identifying the beauty target selected among the plurality of beauty targets.

14. The system of claim 10, wherein the second variation information describes differences between second relationships and second target relationships, wherein the second relationships are between the one or more landmarks of the 3D model, and wherein the second target relationships are between the one or more target landmarks of the target 3D model corresponding to the beauty target.

15. The system of claim 10, the one or more processing devices further configured to:

determine whether the level of confidence that the second variation information accurately reflects the differences between the one or more landmarks of the 3D model and the one or more target landmarks of the target 3D model corresponding to the beauty target satisfies a threshold level of confidence; and responsive to determining that the level of confidence satisfies the threshold level of confidence, provide, to a client device, an indication of the second variation information.

16. The system of claim 10, wherein the second variation information describes differences between geometric data and target geometric data, the target geometric data based on the one or more landmarks of the 3D model, and the target geometric data based on the one or more target landmarks of the target 3D model corresponding to the beauty target.

17. The system of claim 10, the one or more processing devices further configured to:

provide, to a client device, a first notification identifying the first beauty product.

18. The system of claim 17, the one or more processing devices further configured to:

provide, to the client device, a second notification identifying instructions on using the first beauty product to reduce the differences between the plurality of facial features represented in the 2D images and the one or more target facial features of the target face corresponding to the beauty target.

19. A non-transitory computer-readable storage medium storing instructions that, when executed by one or more processing devices, cause the one or more processing devices to perform operations comprising:

providing to a trained machine learning model a first input comprising two-dimensional (2D) image data representing a 2D image of a face of a subject;

providing to the trained machine learning model, a second input comprising information identifying a three-dimensional (3D) model of the face of the subject corresponding to the 2D image of the face of the subject;

generating, using the trained machine learning model, one or more outputs identifying (i) a plurality of facial features represented in the 2D image, (ii) a level of confidence that the plurality of facial features correspond to one or more actual facial features of the subject represented in the 2D image, (iii) an indication of first variation information representing differences between the plurality of facial features represented in the 2D image and one or more target facial features of a target face corresponding to a beauty target, (iv) a level of confidence that the first variation information accurately reflects the differences between the plurality of facial features represented in the 2D images and the one or more target facial features of the target face corresponding to the beauty target, (v) an indication of one or more landmarks of the 3D model, (vi) a level of confidence that the one or more landmarks of the 3D model correspond to the plurality of facial features represented in the 2D image, (vii) an indication of second variation information identifying differences between the one or more landmarks of the 3D model and one or more target landmarks of a target 3D model corresponding to the beauty target, and (viii) a level of confidence that the second variation information reflects the differences between the one or more land-marks of the 3D model and the one or more target landmarks of the target 3D model corresponding to the beauty target; and selecting, among a plurality of beauty products, a first beauty product based on the first variation information, and the second variation information.

20. The non-transitory computer-readable storage medium of claim 19, wherein the first variation information describes differences between first relationships and first target relationships, wherein the first relationships are between the plurality of facial features represented in the 2D image of the face of the subject, and wherein the first target relationships are between the one or more target facial features of the target face corresponding to the beauty target.

21. The non-transitory computer-readable storage medium of claim 19, the operations further comprising:

determining whether the level of confidence that the first variation information accurately reflects the differences between the plurality of facial features represented in the 2D images and the one or more target facial features of the target face corresponding to the beauty target satisfies a threshold level of confidence; and responsive to determining that the level of confidence satisfies the threshold level of confidence, providing, to a client device, an indication of the first variation information.

22. The non-transitory computer-readable storage medium of claim 19, wherein the second variation information describes differences between second relationships and second target relationships, wherein the second relationships are between the one or more landmarks of the 3D model, and wherein the second target relationships are between the one or more target landmarks of the target 3D model corresponding to the beauty target.

23. The non-transitory computer-readable storage medium of claim 19, the operations further comprising:

determining whether the level of confidence that the second variation information accurately reflects the differences between the one or more landmarks of the 3D model and the one or more target landmarks of the target 3D model corresponding to the beauty target satisfies a threshold level of confidence; and responsive to determining that the level of confidence satisfies the threshold level of confidence, providing, to a client device, an indication of the second variation information.

24. The non-transitory computer-readable storage medium of claim 19, wherein the second variation information describes differences between geometric data and target geometric data, the target geometric data based on the one or more landmarks of the 3D model, and the target geometric data based on the one or more target landmarks of the target 3D model corresponding to the beauty target.

* * * * *